(12) United States Patent
Smart et al.

(10) Patent No.: US 9,293,773 B2
(45) Date of Patent: Mar. 22, 2016

(54) ELECTROLYTES FOR WIDE OPERATING TEMPERATURE LITHIUM-ION CELLS

(75) Inventors: Marshall C. Smart, Studio City, CA (US); Ratnakumar V. Bugga, Arcadia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1075 days.

(21) Appl. No.: 13/161,387

(22) Filed: Jun. 15, 2011

(65) Prior Publication Data
US 2012/0007560 A1  Jan. 12, 2012

Related U.S. Application Data

(63) Continuation-in-part of application No. 12/419,473, filed on Apr. 7, 2009, now Pat. No. 8,920,981.

(60) Provisional application No. 61/123,441, filed on Apr. 8, 2008, provisional application No. 61/354,907, filed on Jun. 15, 2010, provisional application No. 61/355,056, filed on Jun. 15, 2010, provisional application No. 61/355,080, filed on Jun. 15, 2010.

(51) Int. Cl.

| | | |
|---|---|---|
| H01M 6/16 | (2006.01) |
| H01M 10/0568 | (2010.01) |
| H01M 10/0569 | (2010.01) |
| H01M 10/0525 | (2010.01) |
| H01M 10/0567 | (2010.01) |
| H01M 4/133 | (2010.01) |
| H01M 4/505 | (2010.01) |
| H01M 4/52 | (2010.01) |
| H01M 4/525 | (2010.01) |
| H01M 4/583 | (2010.01) |
| H01M 4/131 | (2010.01) |

(52) U.S. Cl.
CPC .......... *H01M 6/164* (2013.01); *H01M 10/0568* (2013.01); *H01M 10/0569* (2013.01); *H01M 4/131* (2013.01); *H01M 4/133* (2013.01); *H01M 4/505* (2013.01); *H01M 4/52* (2013.01); *H01M 4/525* (2013.01); *H01M 4/583* (2013.01); *H01M 6/166* (2013.01); *H01M 6/168* (2013.01); *H01M 10/0525* (2013.01); *H01M 10/0567* (2013.01); *H01M 2300/004* (2013.01); *H01M 2300/0042* (2013.01); *Y02E 60/122* (2013.01); *Y10T 29/49108* (2015.01)

(58) Field of Classification Search
CPC ..... H01M 6/164; H01M 6/166; H01M 6/168; H01M 10/0525; H01M 10/0569; H01M 10/0568; H01M 10/0567; H01M 4/131; H01M 4/133; H01M 4/505; H01M 4/52; H01M 4/525; H01M 4/583; H01M 2004/027; H01M 2004/028; H01M 2300/0042; H01M 2300/004; Y02E 60/122

USPC .............. 429/330, 331, 199, 332, 307, 231.1, 429/231.3, 231.8, 231.5, 231.95; 252/62.2
See application file for complete search history.

(56) References Cited

U.S. PATENT DOCUMENTS

| | | |
|---|---|---|
| 4,052,539 A | 10/1977 | Shropshire et al. |
| 5,256,504 A | 10/1993 | Okuno et al. |
| 5,352,548 A | 10/1994 | Fujimoto et al. |
| 5,478,673 A | 12/1995 | Funatsu |
| 6,306,540 B1 | 10/2001 | Hiroi et al. |
| 6,399,255 B2 | 6/2002 | Herreyre et al. |
| 6,489,055 B1 | 12/2002 | Ichihashi et al. |
| 6,492,064 B1 | 12/2002 | Smart et al. |
| 7,722,985 B2 | 5/2010 | Siret et al. |
| 8,920,981 B2 | 12/2014 | Smart et al. |
| 2002/0009651 A1 | 1/2002 | Barker et al. |
| 2003/0157413 A1 | 8/2003 | Chen et al. |
| 2004/0072079 A1 | 4/2004 | Hashimoto et al. |
| 2006/0115739 A1* | 6/2006 | Yamaguchi et al. .......... 429/330 |
| 2006/0154116 A1* | 7/2006 | Siret et al. ................. 429/1 |
| 2008/0305401 A1 | 12/2008 | Smart et al. |
| 2009/0253046 A1 | 10/2009 | Smart et al. |
| 2010/0047695 A1 | 2/2010 | Smart et al. |
| 2010/0062346 A1 | 3/2010 | Lucht et al. |
| 2010/0273065 A1 | 10/2010 | Lee et al. |
| 2010/0279168 A1* | 11/2010 | Lee et al. .................. 429/163 |
| 2011/0117446 A1 | 5/2011 | Lucht et al. |
| 2012/0009485 A1* | 1/2012 | Xu et al. .................. 429/336 |

FOREIGN PATENT DOCUMENTS

| | | |
|---|---|---|
| EP | 0 548 449 | 7/1996 |
| JP | 09-017446 | 1/1997 |
| WO | WO 2008/109802 | 9/2008 |
| WO | WO 2009/084928 | * 7/2009 |

OTHER PUBLICATIONS

Office Action corresponding to U.S. Appl. No. 12/419,473, mailed May 16, 2013.
Office Action corresponding to U.S. Appl. No. 12/419,473, mailed Feb. 3, 2014.
Office Action corresponding to U.S. Appl. No. 12/419,473, mailed Jul. 1, 2013.
Office Action corresponding to U.S. Appl. No. 12/419,473, mailed Mar. 19, 2012.
Office Action corresponding to U.S. Appl. No. 12/419,473, mailed Oct. 12, 2011.
Smart et al. (1999) "Electrolytes for Low Temperature Lithium-Ion Batteries Based on Mixtures of Aliphatic Carbonates," *J. Electrochem. Soc.* 146:486.

(Continued)

*Primary Examiner* — Laura Weiner
(74) *Attorney, Agent, or Firm* — Lathrop & Gage LLP

(57) ABSTRACT

Provided herein are electrolytes for lithium-ion electrochemical cells, electrochemical cells employing the electrolytes, methods of making the electrochemical cells and methods of using the electrochemical cells over a wide temperature range. Included are electrolyte compositions comprising a lithium salt, a cyclic carbonate, a non-cyclic carbonate, and a linear ester and optionally comprising one or more additives.

13 Claims, 42 Drawing Sheets

(56) References Cited

OTHER PUBLICATIONS

Smart et al. (2003) "Improved Low Temperature Performance of Lithium Ion Cells with Quaternary Carbonate-Based Electolytes," *J. Power Sources*. 119-121:349-358.

Smart et al. (Jun. 2001) "Lithium Alkoxide Electrolyte Additives for Lithium-Ion Cells," *Nasa Tech Briefs*. 25:6 (from JPL New Technology Report NPO-20607).

Smart et al. (Sep. 23, 2011) "Use of Additives to Improve Performance of Methyl Butyrate-Based Lithium-Ion Electrolytes," *Nasa Tech Briefs*. (New Technology Report NPO-47537).

Smart et al. (Mar. 1, 2013) "Improved Wide Operating Temperature Range of Li-Ion Cells," *Nasa Tech Briefs*. (New Technology Report NPO-47538).

Allen et al. (Sep. 22, 2006) "Low Temperature Performance of Nanophase $Li_4Ti_5O_{12}$," *J. Power Sources* 159(2):1340-1345.

Aurbach et al. (Feb. 15, 2002) "On the Use of Vinylene Carbonate (VC) as an Additive to Electrolyte Solutions for Li-Ion Batteries," *Electrochim. Acta* 47(9):1423-1439.

Botte et al. (Jul. 2001) "Thermal Stability of $LiPF_6$-EC:EMC Electrolyte for Lithium Ion Batteries," *J. Power Sources* 97-98:570-575.

Campion et al. (2004) "Suppression of Toxic Compounds Produced in the Decomposition of Lithium-Ion Battery Electrolytes," *Electrochem. Solid-State Lett.* 7(7):A194-A197.

Campion et al. (2005) "Thermal Decomposition of $LiPF_6$-Based Electrolytes for Lithium-Ion Batteries," *J. Electrochem. Soc.* 152:A2327-A2334.

Choi et al. (Oct. 27, 2006) "Effect of Fluoroethylene Carbonate Additive on Interfacial Properties of Silicon Thin-Film Electrode," *J. Power Sources* 161(2):1254-1259.

Colbow et al. (May 16, 1989) "Structure and Electrochemistry of the Spinel Oxides $LiTi_2O_4$ and $Li_{43}Ti_{53}O_4$," *J Power Sources* 26(3-4):397-402.

Herreyre et al. (Jul. 2001) "New Li-In Electrolytes for Low Temperature Applications," *J. Power Sources* 97-98:576-580.

Jehoulet et al. (1997) "Influence of the Solvent Composition on the Passivation Mechanism of the Carbon Electrode in Lithium-Ion Prismatic Cells," In; *Batteries for Portable Applications and Electric Vehicles*, Holmes et al. Eds., Electrochemical Society Proceedings 97-18:974-985.

Li et al. (2005) "Additives for Stabilizing $LiPF_6$-Based Electrolytes Against Thermal Decomposition," *J. Electrochem. Soc.* 152:A1361-A1365.

McMillan et al. (Sep. 1999) "Fluoroethylene carbonate Electrolyte and its Use n Lithium Ion Batteries with Graphite Anodes," *J. Power Sources* 81-82:20-26.

Mogi et al. (2002) "Effects of Some Organic Additives on Lithium Deposition in Propylene Carbonate" *J. Electrochem. Soc.* 149(12):A1578-A1583.

Ohta et al. (Mar. 1995) "Relationship Between Carbonaceous Materials and Electrolyte in Secondary Lithium-Ion Batteries," *J. Power Sources* 54(1):6-10.

Sazhin et al. (Apr. 2000) "Performance of Li-Ion Cells with New Electrolytes Conceived for Low-Temperature Applications," *J. Power Sources* 87(1-2):112-117.

Seel et al. (2000) "Electrochemical Intercalation of $PF_6$ into Graphite," *J. Electrochem. Soc.* 147(3):892-898.

Shiao et al. (Apr. 2000) "Low Temperature Electrolytes for Li-Ion PVDF Cells," *J. Power Sources* 87(1-2):167-173.

Smart et al. (Jul. 1996) "Development of Electrolytes for Low Temperature Rechargeable Lithium-ion Cells" *Proc. 37th Power Sources Conf.* 1996: 239-242.

Smart et al. (Jan. 1, 2000) "Update on Electrolytes for Low-Temperature Lithium Cells" *NASA Tech Briefs* 24(1):56.

Smart et al. (Jun. 1, 2001) "Ethyl Methyl Carbonate as a Cosolvent for Lithium-Ion Cells: A low freezing temperature and low viscosity contribute to low-temperature performance" *NASA Tech Briefs* 25(6):53.

Smart et al. (Jun. 1, 2001) "Aliphatic Ester Electrolyte Additives for Lithium-Ion Cells: Higher-molecular-weight esters show promise for extending lower temperature limits" *NASA Tech Briefs* 25(6):53.

Smart et al. (2002) "Use of Organic Esters as Cosolvents in Electrolytes for Lithium-Ion Batteries with Improved Low Temperature Performance," *J. Electrochem Soc.* 149(4):A361-A370.

Smart et al. (2002) "The Effect of Electrolyte Additives Upon the Kinetics of Lithium Intercalation/De-Intercalation at Low Temperatures," Ext. Abst. 202nd Electrochemical Society Meeting, Salt Lake City, Utah, Oct. 20-25, Abstract # 183.

Smart et al. (Jan. 1, 2003) "Low-EC-Content Electrolytes for Low Temperature Li-Ion Cells" *NASA Tech Briefs* 27(1):46.

Smart et al. (Dec. 1, 2005) "Ester-Based Electrolytes for Low-Temperature Li-Ion Cells" *NASA Tech Briefs* 29(12):59.

Smart et al. (Web Release Nov. 17, 2006) "Gel Polymer Electrolyte Lithium-Ion Cells with Improved Low Temperature Performance," *J. Power Sources* 165(2):535-543.

Smart et al. (2006) "Mixed Salt/Ester Electrolytes for Low Temperature Li+ Cells," NPO 42862.

Smart et al. (2007) "Li-Ion Electrolytes Containing Ester Co-Solvents for Wide Operating Temperature Range," *212th Meeting of the Electrochemical Society*, Washington D.C., Oct. 7-12.

Smart et al. (Apr. 1, 2008) "Optimized Carbonate and Ester-Based Li-Ion Electrolytes," *NASA Tech Briefs* 32(4):56.

Smart et al. (Web Release Jun. 6, 2008) "Electrochemical Characteristics of MCMB and $LiNi_xCo_{1-x}O_2$ Electrodes from Cells Containing Electrolytes with Stabilizing Additives and Exposed to High Temperature," *J. Electrochem. Soc.* 155:A557-A568.

Smart et al. (Oct 1, 2008) "DMAC and NMP as Electrolyte Additives for Li-Ion Cells" *NASA Tech Briefs* 32(10):91.

Smart et al. (2008) "Assessment of Various Low Temperature Electrolytes in Prototype Li-Ion Cells Developed for ESMD Applications," *6th International Energy Conversion Engineering Conference (IECEC)* Cleveland, OH, Jul. 28-30.

Smart et al. (2008) "Li-Ion Electrolytes Containing Ester Co-Solvents for Wide Operating Temperature Range," *ECS Trans.* 11(29):99.

Smart et al. (2008) "Electrolytes for Wide Operating Temperature Range Li-Ion Cells," *Lithium Mobile Power 2008 Conference*, Las Vegas, Nevada, Dec. 8.

Smart et al. (Oct. 2009) "The Effect of Electrolyte Additives Upon the Lithium Kinetics of Li-Ion Cells Containing MCMB and $LiNi_xCo_{1-x}O_2$ Electrodes and Exposed to High Temperatures," *ECS Trans.* 25(36):37-48.

Smart et al. (Oct. 2009) "Performance Demonstration of MCMB-$LiNiCoO_2$ Cells Containing Electrolytes Designed for Wide Operating Temperature Range," *ECS Trans.* 25(36):273-282.

Smart et al. (Feb. 1, 2010) "Improved Low Temperature performance of Li-Ion Cells using New Electrolytes" *NASA Tech Briefs* 34(2):47.

Smart et al. (Jun. 7, 2010) "Development of Novel Electrolytes for Use in High Energy Lithium-Ion Batteries with Wide Opening Temperature Range," *2010 DOE Annual Merit Review* Washington D.C., http://www1.eere.energy.gov/vehiclesandfuels/pdfs/merit_review_2010_ electrochemical_storage/es026_smart_2010_o.pdf accessed Feb. 13, 2012.

Smart et al. (Jun. 16, 2010) "Performance of Wide Operating Temperature Range Electrolytes in Quallion Prototype Li-Ion Cells," *44th Power Sources Conference*, Las Vegas, NV, pp. 191-194.

Smart et al. (Oct. 13, 2010) "Improved Wide Operating Temperature Range of MCMB-$Li_{1+x}(Co_{1/3}Ni_{1/3}Mn_{1/3})_{1-x}O_2$ Cells with Methyl Butyrate-Based Electrolytes," Abstract 580, *218th Meeting of the Electrochemical Society*, Las Vegas, NV.

Smart et al. (Oct. 26, 2010) "Lithium-Ion Electrolytes Containing Ester Cosolvents for Improved Low Temperature Performance," *J. Electrochem. Soc.* 157(12):A1361-A1374.

Smart et al. (May 9, 2011) "Electrolytes for Use in High Energy Lithium-Ion Batteries with Wide Operating Temperature Range," *2011 DOE Annual Merit Review*, Washington D.C., http://www1.eere.energy.gov/vehiclesandfuels/pdfs/merit_review_2011/electrochemical_storage/es026_smart_2011_p.pdf accessed Feb. 13, 2012.

(56) References Cited

OTHER PUBLICATIONS

Smart et al. (Oct. 1, 2011) "Li-Ion Cells Employing Electrolytes with Methyl Propionate and Ethyl Butyrate Co-Solvents" *Nasa Tech. Briefs* 35(10):47.

Vollmer et all. (2004) "Reduction Mechanisms of Ethylene, Propylene, and Vinylethylene Carbonates," *J. Electrochem Soc.* 151(1):A178-A183.

Notice of Allowance dated Aug. 29, 2014, for parent U.S. Appl. No. 12/419,473.

* cited by examiner

ELECTROLYTES FOR WIDE OPERATING TEMPERATURE LITHIUM-ION CELLS

CROSS-REFERENCE TO RELATED APPLICATIONS

This application claims the benefit of U.S. Provisional Patent Application Nos. 61/354,907, 61/355,056, and 61/355,080, all filed Jun. 15, 2010 and this application is a continuation-in-part of U.S. patent application Ser. No. 12/419,473, filed Apr. 7, 2009, now U.S. Pat. No. 8,920,981 issued Dec. 30, 2014, which claims the benefit of U.S. Provisional Patent Application No. 61/123,441, filed Apr. 8, 2008. Each of these applications is incorporated by reference in its entirety to the extent not inconsistent with the disclosure herein.

STATEMENT REGARDING FEDERALLY SPONSORED RESEARCH OR DEVELOPMENT

The invention described herein was made in the performance of work under a NASA contract, and is subject to the provisions of Public Law 96-517 (35 USC 202) in which the Contractor has elected to retain title.

BACKGROUND

This invention is in the field of electrochemical devices, and relates generally to electrolytes for extending the operating temperature range of lithium-ion electrochemical cells. Electrolyte compositions, electrochemical cells employing the electrolyte compositions, and methods of making and using the electrochemical cells are provided.

A number of technical barriers associated with the development of Li-ion rechargeable batteries have been identified, including their narrow operating temperature range, limited life, and poor abuse tolerance. For this reason, there is an interest in the development of advanced electrolytes which will improve the performance of batteries over a wide range of temperatures (−30 to +60° C.) and lead to long life characteristics (5,000 cycles over a 10-year life span). There is also interest in improving the high voltage stability of electrolyte systems to enable the operation of up to 5V with high specific energy cathode materials.

A number of future NASA missions and terrestrial applications, such as plug-in hybrid electric vehicles (PHEVs), require rechargeable batteries that can operate over a wide temperature range (−60 to +60° C.) and provide good life characteristics. For example, future NASA missions aimed at exploring Mars and the outer planets will require rechargeable batteries that can operate at low temperatures to satisfy the requirements of various machinery, including landers, rovers, and penetrators. Currently, state-of-the-art lithium-ion systems demonstrate operability over a temperature range from −30° C. to +40° C.; however, the rate capability at lower temperatures is poor due to poor electrolyte conductivity, poor lithium intercalation kinetics over the electrode surface layers, and poor ionic diffusion in the electrode bulk. In addition, the low temperature performance deteriorates rapidly once the cell has been exposed to high temperatures. However, improved rate capability of lithium-ion systems is desired at these very low temperatures (−30° to −70° C.), as well as good tolerance to warm temperatures.

Several factors can influence the low temperature performance of lithium-ion cells, including: (a) lithium ion mobility in the electrolyte solution (electrolyte conductivity), (b) interfacial characteristics (permittivity of ions through the solid electrolyte interphase layer, or "SEI" layer), (c) inherent properties of the electroactive materials (such as diffusion characteristics), and (d) cell design properties (such as electrode thickness, separator porosity, separator wetting properties, etc.). Of these parameters, the electrolyte-induced properties can be the most dominant, in that sufficient conductivity is a necessary condition for good performance at low temperatures. In designing electrolytes with high conductivity at low temperatures, it is desirable that the solvents possess a combination of several properties, such as: high dielectric constant, low viscosity, adequate coordination behavior, as well as appropriate liquid ranges and salt solubilities in the medium.

Reported all-carbonate based electrolyte compositions for lithium ion cells include an electrolyte formulation comprising $LiPF_6$ dissolved in a ternary, equi-proportion mixture of ethylene carbonate (EC), dimethyl carbonate (DMC), and diethyl carbonate (DEC) (1:1:1 vol %); this electrolyte was demonstrated to provide long life over a wide temperature range (−30° to +40° C.) (Smart et al., NASA Technical Report (NTR) NPO-20407 (Jan. 14, 1998) and U.S. Pat. No. 6,492,064). Further improvement of the low temperature performance (i.e., below −30° C.), was reported with a quaternary electrolyte formulation comprising 1.0 M $LiPF_6$ EC+DEC+DMC+EMC (1:1:1:2 v/v) (Smart et al., NTR NPO-20605 (Nov. 5, 1998)). Subsequent development led to the identification of a number of low EC-content ternary and quaternary solvent blend electrolytes, which have enabled excellent performance down to −50° C. (Smart et al., NTR NPO-30226 (Apr. 5, 2001).

Low-melting, low-viscosity co-solvents have also been included in electrolyte mixtures. Smart et al., NTR NPO-19983 (Jul. 3, 1996) and NTR NPO-20601 (Oct. 28, 1998 have described the use of low viscosity and low melting point ester-based co-solvents, including methyl formate (MF), methyl acetate (MA), ethyl acetate (EA), ethyl propionate (EP), and ethyl butyrate (EB), in multi-component electrolyte formulations The work reported in NTR NPO-19983 involved the following types of solutions: 0.50 M $LiPF_6$ in EC+DEC+methyl acetate (15:35:50 v/v/%), 0.50 M $LiPF_6$ in EC+DEC+methyl formate (15:35:50 v/v/%), 0.50 M $LiPF_6$ in PC+DEC+methyl acetate (15:35:50 v/v/%), 0.50 M $LiPF_6$ in PC+DEC+methyl formate (15:35:50 v/v/%), The work reported in NTR NPO-20601 involved the following types of solutions: 1.00 M $LiPF_6$ in EC+DEC+DMC+ester (1:1:1:1 v/v %), where the ester=MA, EA, EP, or EB. Electrolytes were also investigated which incorporate large proportions of ester co-solvents (up to 80% by volume) which have been demonstrated to have excellent performance at very low temperatures, in a number of systems (M. C. Smart, B. V. Ratnakumar, A. Behar, L. D. Whitcanack, J.-S. Yu, M. Alamgir, "Gel Polymer Electrolyte Lithium-Ion Cells with Improved Low Temperature Performance", *J. Power Sources,* 165 (2), 535-543 (2007) and NPO-41097 (May 14, 2007). Smart et al., NTR NPO-41097 (May 14, 2007) have reported multi-component electrolytes of the following composition: 1.0 M $LiPF_6$ in ethylene carbonate (EC)+ethyl methyl carbonate (EMC)+X (1:1:8 v/v %) (where X=methyl butyrate (MB), ethyl butyrate (EB), methyl propionate (MP), and ethyl valerate (EV)). The performance of this latter group of electrolytes enabled performance down to very low temperatures (i.e., −50 to −70° C.). Smart et al., J. Electrochem. Soc., 149(4), A361-A370 (2002) have reported that the higher molecular weight esters (e.g., ethyl propionate and ethyl butyrate) resulted in both improved low temperature performance and good stability at ambient temperatures. Excellent performance was obtained down to −40° C. with electrolytes comprising the following formulations: (a) 1.0 M $LiPF_6$ EC+DEC+DMC+ethyl butyrate (EB) (1:1:1:1 v/v %) and (b) 1.0 M LiPF$_6$ EC+DEC+DMC+ethyl proprionate (EP) (1:1:1:1 v/v %). In contrast, although electrolytes containing methyl acetate and ethyl acetate (low molecular weight esters) were shown to result in high conductivity at low temperatures and good cell performance at low temperature initially, their high reactivity toward the anode led to continued cell degradation and poor long term performance.

Another group of electrolytes was developed in which the EC-content was fixed at 20% and the ester co-solvent at 20%, A number of ester co-solvents, namely methyl propionate (MP), ethyl propionate (EP), methyl butyrate (MB), ethyl butyrate (EB), propyl butyrate (PB), and butyl butyrate (BB), were included in multi-component electrolytes of the following composition: 1.0 M LiPF$_6$ in ethylene carbonate (EC)+ ethyl methyl carbonate (EMC)+X (20:60:20 v/v %) [where X=ester co-solvent] (Smart et al., NTR NPO-44974 (Mar. 9, 2007)). Other compositions reported include 1.20M LiPF$_6$ in EC+EMC+MP (20:20:60 v/v %) and 1.20M LiPF$_6$ in EC+EMC+EB (20:20:60 v/v %), which were demonstrated to operate well over a wide temperature range in MCMB-LiNiCoAlO$_2$ and Li$_4$Ti$_5$O$_{12}$—LiNiCoAlO$_2$ prototype cells. (Smart et al., NTR NPO-46976, Mar. 13, 2009) In other more recent work, methyl butyrate-based electrolytes were demonstrated to have good performance in 2.2Ah LiFePO$_4$-based cells, most notably excellent power capability at low temperatures (i.e., −20° C. to −40° C.) (Smart et al., NTR NPO-46180 (May 2, 2008)).

Other ester-containing electrolyte compositions include those reported by A. Ohta, H. Koshina, H. Okuno, and H. Murai, *J. Power Sources,* 54 (1), 6-10, 1995): a) 1.5 M LiPF$_6$ in EC+DEC+MA (1:2:2), b) 1.5 M LiPF$_6$ in EC+DEC+MP (1:2:2), and c) 1.5 M LiPF$_6$ in EC+DEC+EP (1:2:2). Although promising performance was reported, the incorporation of a large proportion of diethyl carbonate (DEC) is not preferred due to the undesirable effects that this solvent has upon the surface films of carbon anodes. Electrolytes containing ethyl acetate (EA) and methyl butyrate (MB) have also been reported (Herreyre et al., J. Power Sources, 97-98, 576 (2001) and U.S. Pat. No. 6,399,255). More specifically, the following electrolyte formulations were reported: a) 1.0 M LiPF$_6$ in EC+DMC+MA, b) 1.0 M LiPF$_6$ in EC+DMC+MB, c) 1.0 M LiPF$_6$ in EC+PC+MB and d) 1.0 M LiPF$_6$ in EC+DMC+EA. Good low temperature performance with the methyl butyrate-based electrolyte was reported. Other researchers (Shiao et al., J. Power Sources, 87, 167-173 (2000)) have investigated the use of methyl acetate and ethyl acetate in ternary mixtures with and without blending with toluene in an attempt to obtain improved performance to temperatures as low as −50° C. Other reports (Sazhin et al., J. Power Sources, 87, 112-117 (2000)) have involved the investigation of the performance of a number of electrolyte formulations at low temperatures, including the following: a) 1.0 M LiPF$_6$ in EC+EMC+EA (30:30:40), b) 1.0 M LiPF$_6$ in EC+DMC+MA (30:35:35), c) 1.0 M LiPF$_6$ in EC+DEC+EP (30:35:35), and d) 1.0 M LiPF$_6$ in EC+EMC+EP (30:30:40). Although good performance was demonstrated at −20° C., the performance attributes at temperatures below −20° C. were not investigated.

Electrolyte additives have also been included in electrolyte compositions. Vinylene carbonate (VC) has been reported to be an effective additive in improving the high temperature cycle life and storage characteristics (G. G. Botte, R. E. White, and Z. Zhang, *J. Power Sources,* 97-98, 570 (2001); C. Jehoulet, P. Biensan, J. M. Bodet, M. Broussely, C. Moteau, C. Tessier-Lescourret, Proc. Electrochem. Soc. 97-18 (Batteries for Portable Electric Vehicles), The Electrochemical Society Inc., Pennington, N.J. (1997), pp. 974-985; D. Aurbach, K. Gamolsky, B. Markovsky, Y. Gofer, M. Schmidt, and U. Heider, *Electrochim. Acta,* 47 (9), 1423-1439 (2002)). It is generally held that VC sacrificially polymerizes on the electrode surfaces, producing protective films preventing further electrolyte reaction at the interface. Although the bulk of the studies have focused upon its effect during the formation process upon the SEI of the carbon electrode, it is acknowledged that it influences the nature of the films on the cathode also (M. C. Smart, B. L. Lucht, and B. V. Ratnakumar, "Electrochemical characteristics of MCMB and LiNi$_x$Co$_{1-x}$O$_2$ electrodes from cells containing electrolytes with stabilizing additives and exposed to high temperature", *J. Electrochem. Soc.* 155, A557 (2008); M. Fujimoto, M. Takahashi, K. Nishio (Sanyo), U.S. Pat. No. 5,352,548, Oct. 4, 1994).

Amine and coworkers have also described electrolyte formulations based on the use of vinyl ethylene carbonate with propylene carbonate-based electrolytes and demonstrated their resilience to temperatures as high as 50° C. (M. C. Smart, B. V. Ratnakumar, K. Chin, W. West, and S. Surampudi, "The Effect of Electrolyte Additives Upon the Kinetics of Lithium Intercalation/De-Intercalation at Low Temperatures" Ext. Abst. 202nd Electrochemical Society Meeting, Salt Lake City, Utah, October 20-25, 2002 (Abstract #183); J. M Vollmer, L. A. Curtiss, D. R. Vissers, and K. Amine, *J. Electrochem. Soc.,* 151 (1), A178-A183 (2004)).

Lewis base electrolyte additives namely dimethyl acetamide (DMAC) and N-methylpyrollidone (NMP) have been investigated as stabilizing agents (C.-H., Chen, Y. E. Hyung, D. R. Vissers, and K. Amine., US Patent Application, 20030157413 (Aug. 21, 2003); C. L. Campion, W. Li, W. E. Euler, B. L. Lucht, B. Ravdel, J. DiCarlo, R. Gitzendanner, and K. M. Abraham, *Electrochem. Solid-State Lett.,* 7, A194 (2004); C. L. Campion, W. Li and B. L. Lucht, *J. Electrochem. Soc.,* 152, A2327 (2005); W. Li, C. L. Campion, B. L. Lucht, B. Ravdel, J. DiCarlo and K. M. Abraham, *J. Electrochem. Soc.,* 152, A1361 (2005)). Good performance has been demonstrated for 1.0 M LiPF$_6$ EC+DEC+DMC (1:1:1 v/v %) solutions with these additives after being subjected to high temperature storage (M. C. Smart, B. L. Lucht, and B. V. Ratnakumar, "The use of electrolyte additives to improve the high temperature resilience of Li-ion cells", NTR NPO-44805 (Jan. 16, 2007); M. C. Smart, B. L. Lucht, and B. V. Ratnakumar, "Electrochemical characteristics of MCMB and LiNi$_x$Co$_{1-x}$O$_2$ electrodes from cells containing electrolytes with stabilizing additives and exposed to high temperature", *J. Electrochem. Soc.* 155, A557 (2008)).

Mono-fluoroethylene carbonate has also been investigated in electrolyte solutions comprising FEC+EC+PC (1:3.5:3.5) primarily to prevent the exfoliation of graphite anode electrodes when used in the presence of propylene carbonate (PC) (R. McMillan, H. Slegr, Z. X. Shu, and W. Wang, *J. Power Sources,* 81-82, 20-26 (1999)). In a similar type of study, FEC was added to LiClO$_4$ dissolved in PC and the lithium deposition characteristics were investigated ((R. Mogi, M. Inaba, S.-K. Jeong, Y. Iriyama, T. Abe, and Z. Ogumi, J. Electrochem. Soc., 149 (2), A1578-A1583 (2002)). FEC has also been studied in 1.30M LiPF$_6$ solutions of EC+DEC (30:70) to improve the efficiency of Li/Si thin-film cells (N.-S. Choi, K. H. Yew, K. Y. Lee, M. Sung, H. Kim, S.-S. Kim, *J. Power Sources,* 161, 1254-1259 (2006)).

SUMMARY OF THE INVENTION

In one aspect, the present invention provides novel electrolyte compositions comprising a lithium salt, a cyclic carbonate, a non-cyclic carbonate, and a linear ester and optionally comprising one or more additives. The electrolytes of the present invention are useful in lithium ion electrochemical cells and can enable the electrochemical cells to operate over wide temperature ranges (e.g., −60° C. to +60° C.). These high performance electrolytes are capable of providing useful performance attributes when incorporated in electrochemical cells, such as specific capacities and rate capabilities higher than those of conventional state-of-the-art lithium-ion batteries. For example, the present invention provides electrolytes that can enable electrochemical cells capable of exhibiting cell voltages greater than or equal to 4.2 V. In addition, electrolytes of the present invention can enable electrochemical cells having a large cycle life and exhibiting good discharge stability upon cycling In another aspect, the present invention provides electrochemical cells including the electrolyte compositions of the invention. Lithium ion electrochemical cells of the invention are capable of good electrical power source performance over a wide temperature range (e.g., between −60° C. and +60° C.), high specific energies, useful discharge rate capabilities and good cycle life. Electrochemical cells of the present invention are versatile and include primary and secondary cells useful for a range of applications including use in extraterrestrial systems, military equipment and electric vehicles. Electrochemical cells of the present invention also can exhibit enhanced temperature tolerance relative to conventional state-of-the-art lithium-ion batteries. For example, electrolytes and electrochemical cells of the present invention extend the operating temperature of lithium-ion electrochemical cells to below −40° C.

In one aspect, the lithium ion electrochemical cells of the invention are capable of providing good electrical power performance at −60° C. In an embodiment, the cell provides a discharge energy of at least 20 Wh/kg, 40 Wh/kg or 60 Wh/kg at a discharge rates from C/5 to C/20 at −60° C. In another embodiment, the cell provides a discharge energy at −60° C. which is at least 20%, 35%, or 50% of its discharge energy at room temperature (e.g. 23° C.) at a discharge rate from C/5 to C/20.

Also disclosed are methods of making electrochemical cells employing the electrolytes and methods of discharging the electrochemical cells. In an embodiment, the invention can provide a method of generating an electrical current wherein the cell provides a discharge energy of at least 20 Wh/kg, 40 Wh/kg or 60 Wh/kg at a discharge rate from C/5 to C/20 at −60° C. or provides at least 20%, 35%, or 50% of its discharge energy at room temperature (e.g. 23° C.) at a discharge rate from C/5 to C/20.

In an aspect, for example, provided is an electrolyte for use in an electrochemical cell, the electrolyte comprising a mixture of: 10-40% by volume cyclic carbonate; 10-50% by volume non-cyclic carbonate; 20-80% by volume linear ester; and a lithium salt. In an embodiment, the electrolyte comprises 15-25% by volume cyclic carbonate; 15-25% by volume non-cyclic carbonate; 50-70% by volume linear ester; and a lithium salt. In one embodiment, the electrolyte comprises 20% by volume cyclic carbonate; 20% by volume non-cyclic carbonate; 60% by volume linear ester; and a lithium salt. In any of these embodiments, the cyclic carbonate may be ethylene carbonate (EC), mono-fluoroethylene carbonate (FEC) or combinations thereof; the non-cyclic carbonate may be ethyl methyl carbonate (EMC), dimethyl carbonate (DMC), diethyl carbonate (DEC), methyl propyl carbonate (MPC) or combinations thereof; the linear ester may be selected from: methyl propionate (MP); ethyl propionate (EP); methyl butyrate (MB); ethyl butyrate (EB); propyl butyrate (PB); butyl butyrate (BB); or a combination thereof; and the lithium salt may be selected from the group consisting of lithium hexafluorophosphate (LiPF$_6$), lithium tetrafluoroborate (LiBF$_4$), lithium bis(oxalato) borate (LiBOB), lithium difluoro(oxalato) borate (LiDFOB), lithium tetrafluoro(oxalato) phosphate (LiTFOP), lithium hexafluoroarsenate (LiAsF$_6$), lithium perchlorate (LiClO$_4$), lithium trifluoromethanesulfonate (LiCF$_3$SO$_3$), lithium bistrifluoromethanesulfonate sulfonyl imide (LiN(SO$_2$CF$_3$)$_2$), lithium dinitramide (LiDNA) and combinations thereof. In one embodiment, the cyclic carbonate is ethylene carbonate (EC), the non-cyclic carbonate is ethyl methyl carbonate (EMC) and the linear ester is selected from: methyl propionate; ethyl propionate; methyl butyrate; ethyl butyrate; propyl butyrate; butyl butyrate; or a combination thereof.

In an aspect, for example, provided is an electrolyte for use in an electrochemical cell, the electrolyte comprising a mixture of: 10-40% by volume cyclic carbonate; 10-50% by volume non-cyclic carbonate; 20-80% by volume linear ester; and an additive selected from: mono-fluoroethylene carbonate (FEC); lithium oxalate; lithium bis(oxalato)borate (LiBOB); vinylene carbonate (VC); or a combination thereof. In another embodiment, the additive may be selected from mono-fluoroethylene carbonate (FEC); lithium oxalate; lithium bis(oxalato)borate (LiBOB); lithium difluoro(oxalato) borate (LiDFOB), lithium tetrafluoro(oxalato) phosphate (LiTFOP), vinylene carbonate (VC); vinylethylene carbonate (VEC or 4-vinyl-1,3-dioxolane-2-one) or a combination thereof In an aspect, for example, provided is an electrolyte for use in an electrochemical cell, the electrolyte comprising a mixture of: 10-40% by volume cyclic carbonate, wherein the cyclic carbonate is mono-fluoroethylene carbonate (FEC) or a combination of FEC and a non-fluorinated cyclic carbonate; 10-50% by volume non-cyclic carbonate; 20-80% by volume non-fluorinated linear ester; and a lithium salt in a concentration from −0.5M to 1.5M. In an embodiment, the lithium salt may be selected from lithium hexafluorophosphate (LiPF$_6$), lithium tetrafluoroborate (LiBF$_4$), lithium difluoro(oxalato) borate (LiDFOB), lithium tetrafluoro(oxalato) phosphate (LiTFOP), lithium hexafluoroarsenate (LiAsF$_6$), lithium perchlorate (LiClO$_4$), lithium trifluoromethanesulfonate (LiCF$_3$SO$_3$), lithium bistrifluoromethanesulfonate sulfonyl imide (LiN(SO$_2$CF$_3$)$_2$), lithium dinitramide (LiDNA) or combinations thereof. In an embodiment, the lithium salt comprises LiPF$_6$. In an embodiment, the electrolyte further comprises an additive selected from: (i) lithium oxalate; (ii) lithium bis(oxalato)borate (LiBOB); (iii) vinylene carbonate (VC); or (vi) a combination of (i), (ii) and/or (iii).

In an aspect, for example, provided is an electrolyte for use in an electrochemical cell, the electrolyte comprising a mixture of: 10-40% by volume cyclic carbonate, wherein the cyclic carbonate is a non-fluorinated cyclic carbonate, mono-fluoroethylene carbonate (FEC) or a combination thereof; 10-50% by volume non-cyclic carbonate; 20-80% by volume linear ester; a lithium salt in a concentration from −0.5M to 1.5M. In an embodiment, the lithium salt may be selected from lithium hexafluorophosphate (LiPF$_6$), lithium tetrafluoroborate (LiBF$_4$), lithium difluoro(oxalato) borate (LiDFOB), lithium tetrafluoro(oxalato) phosphate (LiTFOP), lithium hexafluoroarsenate (LiAsF$_6$), lithium perchlorate (LiClO$_4$), lithium trifluoromethanesulfonate (LiCF$_3$SO$_3$), lithium bistrifluoromethanesulfonate sulfonyl imide (LiN(SO$_2$CF$_3$)$_2$), lithium dinitramide (LiDNA) or combinations thereof; and lithium oxalate. In an embodiment, the lithium salt comprises LiPF$_6$. In an embodiment, the electrolyte further comprises an additive selected from: (i) lithium bis(oxalato)borate (LiBOB); (ii) vinylene carbonate (VC); or (v) a combination of (i), and/or (ii). In an aspect, the cyclic carbonate, the non-cyclic carbonate and the linear ester are present in a combined total volume of 100 vol % and the lithium oxalate is present at a concentration between 0.5-3 vol % relative to the total volume.

In an aspect, for example, provided is an electrolyte for use in an electrochemical cell, the electrolyte comprising a mixture of: 10-40% by volume cyclic carbonate, wherein the cyclic carbonate is a non-fluorinated cyclic carbonate, mono-fluoroethylene carbonate (FEC) or a combination thereof; 10-50% by volume non-cyclic carbonate; 20-80% by volume linear ester; a lithium salt in a concentration from −0.5M to 1.5M. In an embodiment, the lithium salt may be selected from lithium hexafluorophosphate ($LiPF_6$), lithium tetrafluoroborate ($LiBF_4$), lithium difluoro(oxalato) borate (LiDFOB), lithium tetrafluoro(oxalato) phosphate (LiTFOP), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), lithium dinitramide (LiDNA) or combinations thereof. In an embodiment, the lithium salt comprises $LiPF_6$ and dimethyl acetamide (DMAc). In an embodiment, the electrolyte further comprises an additive selected from: (i) lithium oxalate; (ii) lithium bis(oxalato)borate (LiBOB); (iii) vinylene carbonate (VC); (iv) N-methylpyrollidinone (NMP); or (v) a combination of (i), (ii), (iii) and/or (iv). In an aspect, the cyclic carbonate, the non-cyclic carbonate and the linear ester are present in a combined total volume of 100 vol % and the dimethyl acetamide (DMAc) is present at a concentration between 0.5-10 vol % or 0.5-3 vol % relative to the total volume.

In an aspect, for example, provided is an electrolyte for use in an electrochemical cell, the electrolyte comprising a mixture of: 10-40% by volume cyclic carbonate, wherein the cyclic carbonate is a non-fluorinated saturated cyclic carbonate, mono-fluoroethylene carbonate (FEC) or a combination thereof; 10-50% by volume non-cyclic carbonate; 20-80% by volume linear ester; a lithium salt in a concentration from −0.5M to 1.5M. In an embodiment, the lithium salt may be selected from lithium hexafluorophosphate ($LiPF_6$), lithium tetrafluoroborate ($LiBF_4$), lithium difluoro(oxalato) borate (LiDFOB), lithium tetrafluoro(oxalato) phosphate (LiTFOP), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), lithium dinitramide (LiDNA) or combinations thereof; and lithium bis(oxalato)borate (LiBOB), wherein the electrolyte does not include a fluorinated ester. In an embodiment, the lithium salt comprises $LiPF_6$. In an embodiment, the electrolyte further comprises an additive selected from: (i) lithium oxalate; (ii) dimethyl acetamide (DMAc); (iii) vinylene carbonate (VC); (iv) N-methylpyrollidinone (NMP); or (v) a combination of (i), (ii), (iii) and/or (iv). In an aspect, the LiBOB is present in a concentration from 0.05 M to 0.25 M.

In some embodiments, an electrolyte mixture comprises 15-30% by volume of the cyclic carbonate, 10-50% by volume of the non-cyclic carbonate, 40-70% by volume of the linear ester and, optionally, one or more additives. In one embodiment, an electrolyte mixture comprises 20% by volume of the cyclic carbonate, 20% by volume of the non-cyclic carbonate, 60% by volume of the linear ester and, optionally, one or more additives.

In some embodiments, for example, the non-fluorinated cyclic carbonate is ethylene carbonate (EC); the non-cyclic carbonate is selected from ethyl methyl carbonate (EMC), dimethyl carbonate (DMC), diethyl carbonate (DEC), methyl propyl carbonate (MPC) or combinations thereof; the linear ester is a non-fluorinated linear ester; and/or the linear ester is selected from: (i) methyl propionate; (ii) ethyl propionate; (iii) methyl butyrate; (iv) ethyl butyrate; (v) propyl butyrate; (vi) butyl butyrate; or (vii) a combination of (i), (ii), (iii), (iv), (v) and/or (vi). In some embodiments, at least two linear esters are present, a first linear ester having a low viscosity and a second linear ester having a high viscosity.

In an aspect, for example, provided is a method of making an electrochemical cell comprising the steps of providing a cathode, providing an anode, and providing an electrolyte of the invention between the cathode and the anode.

In an aspect, for example, an electrochemical cell comprises an anode, a cathode, and an electrolyte of the present invention provided between the anode and the cathode. Active materials for the electrodes of the electrochemical cells include lithium ion host materials capable of accommodating lithium ions from the electrolyte during discharge and charging of the electrochemical cells. In this context, accommodation of lithium ions includes insertion of lithium ions into the host material, intercalation of lithium ions into the host material and/or reaction of lithium ions with the host material. Accommodation includes alloy formation reactions, surface reaction and/or bulk reactions with the host material. Use of lithium ion host materials that are capable of reversibly exchanging lithium ions with the electrolyte without significant degradation of the lithium ion host material upon cycling is preferred for secondary lithium ion batteries of the present invention. In some embodiments, the cathode comprises a material selected from $LiCoO_2$, $LiMn_2O_4$, $LiMPO_4$ (M=Fe, Co, Mn), $LiNiCoAlO_2$, $LiNi_{0.33}Co_{0.33}Mn_{0.33}O_2$, $LiNiCoO_2$, $LiNi_{0.8}Co_{0.2}O_2$, $Li(Li_{0.17}Ni_{0.25}Mn_{0.58})O_2$, layered-layered composite $LiNiCoMnO_2$ or $LiNi_{0.5}Mn_{1.5}O_4$. In some embodiments, the anode comprises a carbon-based material or a material selected from natural graphite, synthetic graphite, hard carbon, mesocarbon microbeads (MCMB), silicon-carbon composites, lithium titanate ($Li_4Ti_5O_{12}$), lithium metal and combinations thereof. The carbon-based material may be a pure or doped carbonaceous material, and may be amorphous, semi-crystalline, crystalline, or a mixture thereof. In some embodiments, electrochemical cells of the invention have standard cell voltages equal to or greater than 4.3 V. In some embodiments, cathodes may be charged to potentials of 4.6V to 4.8V. In such high voltage cells, the anode may be carbon-based and the cathode may be selected from a layered-layered composite of $LiNiCoMnO_2$, $LiNi_{0.5}Mn_{1.5}O_4$ or $LiNi_{0.33}Co_{0.33}Mn_{0.33}O_2$. In some embodiments, electrochemical cells of the invention operate at temperatures between −20° C. and −60° C.

Cathodes operating at high potentials may benefit from the presence of electrolyte additives that lead to protective surface layers on the cathode (especially LiBOB). Due to the presence of fluorination, electrolytes that possess FEC may also have inherently greater electrochemical stability at high potentials. Thus, the use of FEC and LiBOB in conjunction may provide desirable effects with high voltage systems.

In an aspect, for example, provided is an electrochemical cell comprising an anode devoid of an electrochemically active carbon compound; a cathode comprising a material selected from the group consisting of $LiCoO_2$, $LiMn_2O_4$, $LiMPO_4$ (M=Fe, Co, Mn), $LiNiCoAlO_2$, $LiNi_{0.33}Co_{0.33}Mn_{0.33}O_2$, $LiNiCoO_2$, $LiNi_{0.8}Co_{0.2}O_2$, $Li(Li_{0.17}Ni_{0.25}Mn_{0.58})O_2$, layered-layered composite $LiNiCoMnO_2$ and $LiNi_{0.5}Mn_{1.5}O_4$; and an electrolyte provided between the anode and the cathode, the electrolyte comprising a mixture of: 15-30% by volume of a saturated cyclic carbonate selected from the group consisting of ethylene carbonate (EC), mono-fluoroethylene carbonate (FEC) and combinations thereof; 10-50% by volume of a non-cyclic carbonate selected from the group consisting of ethyl methyl carbonate (EMC), dimethyl carbonate (DMC), diethyl carbonate (DEC), methyl propyl carbonate (MPC) and combinations thereof; 40-70% by volume linear ester selected from the group consisting of: (i) methyl propionate; (ii) ethyl propionate; (iii) methyl butyrate; (iv) ethyl butyrate; (v) propyl butyrate; (vi) butyl butyrate; and (vii) a combination of (i), (ii), (iii), (iv), (v) and/or (vi); a lithium salt in a concentration from 0.8 M to 1.4 M, the lithium salt selected from the group consisting of lithium hexafluorophosphate ($LiPF_6$), lithium tetrafluoroborate ($LiBF_4$), lithium bis(oxalato) borate (LiBOB), lithium difluoro(oxalato) borate (LiDFOB), lithium tetrafluoro(oxalato) phosphate (LiTFOP), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), lithium dinitramide (LiDNA) and combinations thereof; and 0.5-5% or 1.5-2.5% by volume vinylene carbonate.

Electrochemical cells of these aspects are useful generally for extraterrestrial and vehicle applications that require batteries to be discharged, and optionally charged, under challenging temperature conditions (e.g., between −60° C. and +60° C.).

In an aspect, for example, provided is a method of generating an electrical current, the method comprising the steps of providing an electrochemical cell containing an anode, a cathode, and an electrolyte of the present invention provided between the anode and the cathode, the cell being in a charged state; and discharging the electrochemical cell.

A variety of compounds are useful as the additive component(s) of the present electrolytes, including but not limited to mono-fluoroethylene carbonate (FEC); lithium oxalate; lithium bis(oxalato)borate (LiBOB); lithium difluoro(oxalato) borate (LiDFOB), lithium tetrafluoro(oxalato) phosphate (LiTFOP), vinylene carbonate (VC); vinylethylene carbonate (VEC or 4-vinyl-1,3-dioxolane-2-one) and combinations thereof. In other embodiments, dimethyl acetate (DMAc) and/or N-methylpyrollidinone (NMP) may be included in the electrolyte composition. Additives can be useful for suppressing, or eliminating, degradation of electrochemical cell components (e.g., electrodes). In some embodiments, for example, the additive itself may chemically decompose on an electrode surface to form a protective solid electrolyte interphase (SEI). According to this aspect, therefore, the additive functions as a sacrificial compound so as to protect the electrode material. Alternatively, in other embodiments, the additive may serve to complex an autocatalytic decomposition product of the electrolyte. According to this aspect, therefore, the additive functions as a sequestering agent. Additives in electrolytes of the present invention can be useful for: (i) producing desirable, protective solid electrolyte interphase (SEI) layers on the electrode surfaces (anode and/or cathode), (ii) enhancing the lithium kinetics at the interfacial regions of the electrodes, (iii) sequestering reactive decomposition species and (iv) providing enhanced safety.

As discussed above, the mechanisms by which the various additives impart a beneficial effect upon cell performance can differ. In the inventive electrolyte compositions described herein, experimental results indicate that VC and FEC can contribute to SEI formation. VEC is also expected to contribute to film formation. LiBOB is believed to participate in film formation at both electrodes and can be especially beneficial at the cathode, but also functions as an electrolyte salt contributing to the ionic conductivity of the media. Lithium difluoro(oxalato) borate (LiDFOB) and lithium tetrafluoro(oxalato) phosphate (LiTFOP), which are related in structure to LiBOB, are expected to function similarly. Lithium oxalate is believed to complex any deleterious $PF_5$ that may be generated due to the decomposition of $LiPF_6$ (either thermally or by contact with water), and may participate in formation of desirable surface films. Dimethyl acetate (DMAc) or N-methylpyrollidinone (NMP) would also be expected to function as complexing agents. Based on the different mechanisms of providing desirable effects, mixtures of additives may be especially beneficial.

In the present work, it was found that in some situations additives improved the performance of the electrochemical cells at temperatures above room temperature (vs. similar electrochemical cells without additives). An unintended benefit to the low temperature discharge rate capability was observed with the use of several electrolyte additives, resulting in greater discharge capacity and operating voltage (i.e., decreased polarization effects). It was ascertained that this was due to increased lithium kinetics at the electrodes, due to the formation of desirable surface films (especially at the cathode, which is most often the limiting electrode). This enhancement was observed to be system dependent (i.e., for $LiNiCoO_2$ the following trend was observed: LiBOB>VC>lithium oxalate>FEC; whereas for $LiNiCoAlO_2$ the trend was: VC>FEC>lithium oxalate>LiBOB). Based on these results, it is believed that combinations of additives may further improve the enhanced kinetics since the benefit manifested itself differently at anode and cathode (i.e., LiBOB and VC enhanced the kinetics at the cathode, whereas FEC and lithium oxalate enhanced the kinetics at the anode).

It was also observed that some electrolyte additives led to better performance than others if charging at high rates at low temperatures is required of the cell (i.e., to avoid the possibility of lithium plating which degrades life). VC and LiBOB were identified as being undesirable due to observed lithium plating with high rate, low temperature charging, whereas FEC and lithium oxalate were more desired.

The concentrations and physical properties of the additives are important parameters for supporting a range of electrochemical cell functionalities. In some embodiments, the additive is present in a concentration less than or equal to 40 vol %, and optionally in some embodiments less than or equal to 20 vol %, and optionally in some embodiments less than or equal to 10 vol %, and optionally in some embodiments less than or equal to 5 vol %, and optionally in some embodiments less than or equal to 2.5 vol %. In some embodiments, the additive has a concentration selected over the range of 0.5 vol % to 40 vol %, optionally for some application selected over the range of 0.5 vol % to 20 vol %, optionally for some applications selected over the range of 0.5 vol % to 10 vol %, optionally for some applications selected over the range of 0.5 vol % to 5 vol %, and optionally for some embodiments selected over the range of 0.5 vol % to 3 vol %, and optionally for some embodiments selected over the range of 1.5 vol % to 2.5 vol %. When a component is present in substantial amounts (e.g. 10% or greater or 20% or greater), it may also be viewed as a co-solvent. Alternatively, in some embodiments, the concentration of the additive may be expressed in terms of molarity and may be selected over the range of 0.05 M to 0.25 M, optionally in some embodiments selected over the range of 0.1 M to 0.15 M.

Without wishing to be bound by any particular theory, there may be discussion herein of beliefs or understandings of underlying principles relating to the compositions, devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
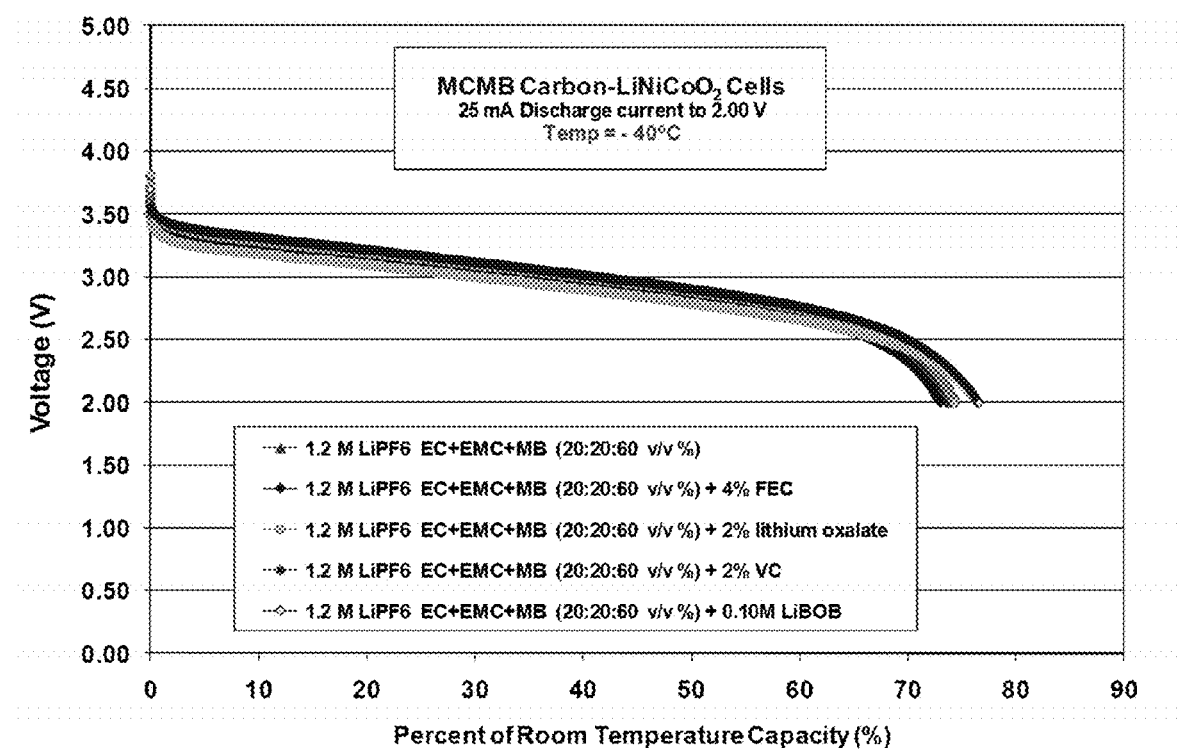
FIG. 1 shows the discharge capacity (Ah) of MCMB-LiNiCoO$_2$ lithium-ion cells containing various methyl butyrate-based electrolytes at −40° C. using a C/16 discharge rate.

In general, the terms and phrases used herein have their art-recognized meaning, which can be found by reference to standard texts, journal references and contexts known to those skilled in the art. The following definitions are provided to clarify their specific use in the context of the invention.

"Standard electrode potential") (E°) refers to the electrode potential when concentrations of solutes are 1 M, gas pressures are 1 atm and the temperature is 25 degrees Celsius. As used herein standard electrode potentials are measured relative to a standard hydrogen electrode.

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours kg$^{-1}$.

The term "discharge rate" refers to the current at which an electrochemical cell is discharged. Discharge current can be expressed in units of ampere-hours. Alternatively, discharge current can be normalized to the rated capacity of the electrochemical cell, and expressed as C/(X·t), wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science. By convention, the anode in a rechargeable cell is the electrode which functions as the negative electrode during discharge.

"Electrode potential" refers to a voltage, usually measured against a reference electrode, due to the presence of chemical species at different oxidation (valence) states within or in contact with the electrode.

"Electrolyte" refers to an ionic conductor which can be in the solid state, the liquid state (most common) or more rarely a gas (e.g., plasma).

"Additive", as used herein, refers to a compound or combination of compounds that acts as a sacrificial agent or a sequestering agent to improve performance of an electrochemical cell. Typically, additives serve to increase conductivity of an electrolyte and/or protect one or more electrode materials from substantial degradation.

"Cation" refers to a positively charged ion, and "anion" refers to a negatively charged ion.

"Viscosity" refers to a liquid's resistance to flow.

Electrolytes of the present invention have the general formula: Li-salt+cyclic carbonate+non-cyclic carbonate+linear ester. In one particular embodiment, electrolytes of the present invention have the formula: Li-salt+EC and/or FEC+EMC+linear ester, where the linear ester is MP, MB and/or EB.

Cyclic carbonates useful for the present invention include non-fluorinated carbonates, fluorinated carbonates, and combinations thereof. Useful non-fluorinated carbonates include ethylene carbonate (EC). Useful fluorinated carbonates include mono-fluoroethylene carbonate (FEC).

Non-cyclic carbonates useful for the present invention include asymmetric alkyl carbonates. In an embodiment, the asymmetric alkyl carbonate is ethyl methyl carbonate (EMC). In another embodiment, non-cyclic carbonate may be ethyl methyl carbonate (EMC), dimethyl carbonate (DMC), diethyl carbonate (DEC), methyl propyl carbonate (MPC) or combinations thereof.

Linear esters useful in the present invention include alkyl esters. In an embodiment, the alkyl ester has the general formula R' COOR", where R' and R" are, independently, $C_1$-$C_{10}$ aliphatic, especially $C_1$-$C_{10}$ alkyl, including branched, straight chain, and cycloaliphatic. In an embodiment, R' and R" are, independently, $C_1$-$C_{10}$ especially $C_1$-$C_4$ alkyl. In an embodiment, the linear ester is selected from: methyl propionate (MP); ethyl propionate (EP); methyl butyrate (MB); ethyl butyrate (EB); propyl butyrate (PB); butyl butyrate (BB); or a combination thereof. In an embodiment, the linear ester is a "low viscosity ester" having a relatively low viscosity. The low viscosity ester has a low molecular weight, which can contribute to good mobility and high conductivity, especially at low temperatures. In an embodiment, a low viscosity ester displays a viscosity less than 0.70 cP at 25° C. Suitable low viscosity esters include, but are not limited to, methyl propionate and methyl butyrate. In another embodiment, linear ester is a "high viscosity ester" having a relatively high viscosity and molecular weight. In an embodiment, the high molecular weight esters display viscosities greater than 0.70 cP at 25° C. and boiling points >110° C. The high viscosity ester possesses a higher boiling point and lower vapor pressure than the low viscosity ester, thereby providing enhanced resilience to high temperatures. Suitable high viscosity esters include, but are not limited to, propyl butyrate and butyl butyrate. In one embodiment an electrolyte comprises two esters, a low viscosity ester and a high viscosity ester. In different embodiments, the proportions (by volume) of the high and low viscosity esters may be 50:50, 25:75 to 75:25 or 10:90 to 90:10. For higher temperature applications, it may be preferred to use a greater proportion of the high viscosity ester.

In the present work, MP-based electrolytes were observed to provide higher rate capability (especially at lower temperatures), whereas MB-based electrolytes provided somewhat higher temperature resilience. The high temperature resilience and life characteristics (both cycle and calendar life) are further enhanced by the addition of electrolyte additives, where the desired additive can vary depending upon electrode couple (most notably the cathode material). In general, both MP-based and MB-based electrolytes work well with $LiNiCoAlO_2$, $LiNiCoO_2$, $LiCoO_2$, $LiMn_2O_4$, and $LiMPO_4$-based systems.

Lithium salts may both impart conductivity and contribute to solid electrode interphase (SEI) layer formation. In an embodiment, the lithium salt may be selected from the group consisting of lithium hexafluorophosphate ($LiPF_6$), lithium tetrafluoroborate ($LiBF_4$), lithium bis(oxalato) borate (LiBOB), lithium difluoro(oxalato) borate (LiDFOB), lithium tetrafluoro(oxalato) phosphate (LiTFOP), lithium hexafluoroarsenate ($LiAsF_6$), lithium perchlorate ($LiClO_4$), lithium trifluoromethanesulfonate ($LiCF_3SO_3$), lithium bistrifluoromethanesulfonate sulfonyl imide ($LiN(SO_2CF_3)_2$), lithium dinitramide (LiDNA) and combinations thereof. In an embodiment, the lithium salt comprises $LiPF_6$. In an embodiment, the electrolyte may contain a first lithium salt which is present in relatively high concentration and a second lithium salt which is present in relatively low concentration. In an embodiment, this second lithium salt may be viewed as an additive. In an embodiment, the additive salt may be selected from lithium bis(oxalato)borate (LiBOB); lithium difluoro (oxalato) borate (LiDFOB), lithium tetrafluoro(oxalato) phosphate (LiTFOP), or combinations thereof.

Electrolyte components for the present electrolytes were selected based on a number of selection criteria. For example, components of the present electrolytes display a high conductivity, e.g., 1 mS cm$^{-1}$ from −60 to 40° C., and low melting point, e.g., −60 to 75° C., so that the components remain conductive and liquid over a wide temperature range. Components of the present electrolytes are also selected for good electrochemical stability over a wide voltage window, e.g., 0 to 4.5 V, good chemical and thermal stability, good compatibility with the chosen electrode couple, good SEI characteristics on the electrode, facile lithium intercalation/de-intercalation kinetics, low flammability, and low toxicity. Tables 1-4 show exemplary electrolyte components and concentrations, electrolyte compositions and ratios, additive combinations, and electrode and electrolyte combinations.

TABLE 1

Exemplary electrolyte components and concentration ranges.

| Component | Broader Range | Narrower Range(s) |
|---|---|---|
| Lithium Salt | 0.5M-1.5M | 0.8M-1.25M |
| lithium hexafluorophosphate ($LiPF_6$) | 0.5M-1.4M | 0.8M-1.2M |
| lithium bis(oxalato)borate (LiBOB) | 0M-0.25M | 0.05M-0.25M 0.1M-0.15M |
| lithium tetrafluoroborate ($LiBF_4$) | 0M-0.25M | 0.05M-0.25M 0.1M-0.15M |
| lithium difluoro(oxalato) borate (LiDFOB) | 0M-0.25M | 0.05M-0.25M 0.1M-0.15M |
| lithium tetrafluoro(oxalato) phosphate (LiTFOP) | 0M-0.25M | 0.05M-0.25M 0.1M-0.15M |
| lithium dinitramide (LiDNA) | 0M-0.25M | 0.05M-0.25M 0.1M-0.15M |
| Cyclic Carbonate | 10 vol %-40 vol % | 15 vol %-30 vol % |
| ethylene carbonate (EC) | 0 vol %-40 vol % | 0 vol %-25 vol % |
| mono-fluoroethylene carbonate (FEC) | 0 vol %-40 vol % | 1 vol %-40 vol % 2 vol %-20 vol % |
| Non-Cyclic Carbonate | 10 vol %-50 vol % | 15 vol %-30 vol % |

TABLE 1-continued

Exemplary electrolyte components and concentration ranges.

| Component | Broader Range | Narrower Range(s) |
|---|---|---|
| ethyl methyl carbonate (EMC) | 10 vol %-50 vol % | 15 vol %-30 vol % |
| dimethyl carbonate (DMC) | 10 vol %-50 vol % | 15 vol %-30 vol % |
| diethyl carbonate (DEC) | 10 vol %-50 vol % | 15 vol %-30 vol % |
| methyl propyl carbonate (MPC) | 10 vol %-50 vol % | 15 vol %-30 vol % |
| Ester of Carboxylic Acid | 20 vol %-80 vol % | 40 vol %-70 vol % |
| methyl propionate (MP) | 20 vol %-80 vol % | 40 vol %-70 vol % |
| ethyl propionate (EP) | 20 vol %-80 vol % | 40 vol %-70 vol % |
| ethyl butyrate (EB) | 20 vol %-80 vol % | 40 vol %-70 vol % |
| methyl butyrate (MB) | 20 vol %-80 vol % | 40 vol %-70 vol % |
| propyl butyrate (PB) | 20 vol %-80 vol % | 40 vol %-70 vol % |
| butyl butyrate (BB) | 20 vol %-80 vol % | 40 vol %-70 vol % |
| Additives | | |
| lithium oxalate ($Li_2C_2O_4$) | 0 vol %-3 vol % | 0.5 vol %-3 vol % |
| vinylene carbonate (VC) | 0 vol %-5 vol % | 0.5 vol %-5 vol % 1.5 vol %-2.5 vol % |
| dimethyl acetate (DMAc) | 0 vol %-10 vol % | 0.5 vol %-10 vol % 1 vol %-3 vol % |
| N-methyl pyrollidinone (NMP) | 0 vol %-10 vol % | 0.5 vol %-10 vol % 1 vol %-3 vol % |

TABLE 2

Exemplary electrolyte compositions and ratios.

| Electrolyte Compositions | Ratio (vol %) |
|---|---|
| EC:EMC:ester | 20:20:60 |
| EC:EMC:MP | 20:20:60 |
| EC:EMC:MB | 20:20:60 |
| EC:EMC:EB | 20:20:60 |
| EC:FEC:EMC:MP | 10:10:20:60 |
| FEC:EMC:MP | 20:20:60 |

TABLE 3

Exemplary additive combinations.

VC/LiBOB
FEC/LiBOB
lithium oxalate/FEC
lithium oxalate/LiBOB
FEC/LiBOB
FEC/VC

TABLE 4

Exemplary electrode and electrolyte combinations.

| Cathode/Anode | Electrolyte |
|---|---|
| $LiMPO_4$/ (MCMB, graphite) M = Fe, Co, Mn | EC:EMC:MB (20:20:60 vol %) + 4% FEC<br>EC:EMC:MB (20:20:60 vol %) + 2% VC |
| $LiNiCoAlO_2$/carbon (MCMB, graphite) | 1.20M $LiPF_6$ EC:EMC:MP (20:20:60 vol %)<br>1.20M $LiPF_6$ EC:EMC:EB (20:20:60 vol %)<br>1.20M $LiPF_6$ EC:FEC:EMC:MP (10:10:20:60 vol %)<br>1.20M $LiPF_6$ FEC:EMC:MP (20:20:60 vol %)<br>1.20M $LiPF_6$ EC:EMC:MP (20:20:60 vol %) + 4% FEC<br>1.20M $LiPF_6$ EC:EMC:MP (20:20:60 vol %) + 2% VC<br>1.20M $LiPF_6$ EC:EMC:MP (20:20:60 vol %) + 0.1M LiBOB<br>1.20M $LiPF_6$ EC:EMC:MP (20:20:60 vol %) + lithium oxalate |

TABLE 4-continued

Exemplary electrode and electrolyte combinations.

| Cathode/Anode | Electrolyte |
|---|---|
| $LiNi_{0.33}Co_{0.33}Mn_{0.33}O_2$/ carbon | 1.00M $LiPF_6$ + 0.10M LiBOB EC:EMC:MB (20:20:60 vol %) |
| | 1.20M $LiPF_6$ EC:EMC:MB (20:20:60 vol %) + 4% FEC |
| | 1.20M $LiPF_6$ EC:EMC:MB (20:20:60 vol %) + 2% VC |
| | 1.20M $LiPF_6$ EC:EMC:MB (20:20:60 vol %) + lithium oxalate |
| $LiNiCoO_2$/carbon (MCMB) | 1.20M $LiPF_6$ EC:EMC:MP (20:20:60 vol %) |
| | 1.20M $LiPF_6$ EC:EMC:MB (20:20:60 vol %) |
| $LiNi_{0.8}Co_{0.2}O_2$/ carbon | 1.20M $LiPF_6$ EC:EMC:MB (20:20:60 vol %) + 4% FEC |
| $LiCoO_2$/ (MCMB, graphite) | 1.20M $LiPF_6$ EC:EMC:MB (20:20:60 vol %) + 2% VC |
| $LiMn_2O_4$/ (MCMB, graphite) | 1.20M $LiPF_6$ EC:EMC:MB (20:20:60 vol %) + 0.1M LiBOB |
| | 1.20M $LiPF_6$ EC:EMC:MB (20:20:60 vol %) + lithium oxalate |
| $Li(Li_{0.17}Ni_{0.25}Mn_{0.58})O_2$/ Li metal or carbon-based anodes | 1.00M $LiPF_6$ + 0.10M LiBOB EC:EMC:MB (20:20:60 vol %) |
| | 1.20M $LiPF_6$ EC:EMC:MB (20:20:60 vol %) + 4% FEC |
| | 1.20M $LiPF_6$ EC:EMC:MB (20:20:60 vol %) + 2% VC |
| layered-layered composite $LiNiCoMnO_2$/ carbon-based | 1.00M $LiPF_6$ + 0.10M LiBOB EC:EMC:MB (20:20:60 vol %) |
| | 1.20M $LiPF_6$ EC:EMC:MB (20:20:60 vol %) + 4% FEC |
| | 1.20M $LiPF_6$ EC:EMC:MB (20:20:60 vol %) + 2% VC |
| $LiNi_{0.5}Mn_{1.5}O_4$/ $Li_4Ti_5O_{12}$ or carbon-based anodes | 1.00M $LiPF_6$ + 0.10M LiBOB EC:EMC:MB (20:20:60 vol %) |
| | 1.20M $LiPF_6$ EC:EMC:MB (20:20:60 vol %) |
| | 1.20M $LiPF_6$ EC:EMC:MB (20:20:60 vol %) + 4% FEC |
| | 1.20M $LiPF_6$ EC:EMC:MB (20:20:60 vol %) + 2% VC |

The invention may be further understood by the following non-limiting examples.

Example 1

Methyl Butyrate-Based Electrolyte Solutions Containing Additives MCMB-$LiNiCoO_2$ cells In the current study, we demonstrated improved performance of Li-ion cells with methyl butyrate-based electrolytes, including:

1) 1.0 M $LiPF_6$ EC+EMC+MB (20:20:60 v/v %)
2) 1.0 M $LiPF_6$ EC+EMC+MB (20:20:60 v/v %)+2% FEC
3) 1.0 M $LiPF_6$ EC+EMC+MB (20:20:60 v/v %)+4% FEC
4) 1.4 M $LiPF_6$ EC+EMC+MB (20:20:60 v/v %)+lithium oxalate
5) 1.0 M $LiPF_6$ EC+EMC+MB (20:20:60 v/v %)+2% VC
6) 1.0 M $LiPF_6$ EC+EMC+MB (20:20:60 v/v %)+0.10M LiBOB Lithium-ion cells, comprising MCMB carbon anodes and $LiNi_{0.8}Co_{0.2}O_2$ cathodes, were utilized to study the electrolytes. These cells served to verify and demonstrate the reversibility, low temperature performance, and electrochemical aspects of each electrode as determined from a number of electrochemical characterization techniques.

Formation Characteristics

As illustrated in Table 5, good performance characteristics of the cells containing the methyl butyrate-based electrolytes with and without the use of electrolyte additives were observed, as judged from the coulombic efficiency on the first cycle (being an indication of the inherent stability and the electrode film forming process) and the cumulative irreversible capacity losses. As displayed, the cell containing the mono-fluoroethylene carbonate as an additive was observed to have notably low irreversible capacity loss over the first five cycles and much higher coulombic efficiency on the first cycle. These results suggest that very desirable solid electrolyte interphase (SEI) layers are being formed on the electrode (especially on the carbon anode).

TABLE 5

Summary of the formation characteristics of MCMB-$LiNiCoO_2$ cells with various additive-containing electrolytes.

| Electrolyte Type | Charge Capacity (Ah) 1st Cycle | Discharge Capacity (Ah) 1st Cycle | Irreverisible Capacity (1st Cycle) | Couloumbic Efficiency (1st Cyle) | Charge Capacity (Ah) 5th Cycle | Reversible Capacity (Ah) 5th Cycle | Cummulative Irreverisible Capacity (1st-5th Cycle) | Couloumbic Efficiency (5th Cycle) |
|---|---|---|---|---|---|---|---|---|
| 1.2M $LiPF_6$ EC + EMC + MB (20:20:60 v/v %) | 0.4791 | 0.4071 | 0.072 | 84.96 | 0.4104 | 0.3973 | 0.1326 | 96.80 |
| 1.2M $LiPF_6$ EC + EMC + MB (20:20:60 v/v %) + 4% FEC | 0.4619 | 0.3998 | 0.062 | 86.55 | 0.3831 | 0.3825 | 0.0726 | 99.83 |
| 1.2M $LiPF_6$ EC + EMC + MB (20:20:60 v/v %) + lithium oxalate | 0.4571 | 0.3935 | 0.064 | 86.10 | 0.3927 | 0.3850 | 0.1011 | 98.05 |
| 1.2M $LiPF_6$ EC + EMC + MB (20:20:60 v/v %) + 2% VC | 0.4711 | 0.3938 | 0.077 | 83.59 | 0.3939 | 0.3868 | 0.1153 | 98.20 |
| 1.2M $LiPF_6$ EC + EMC + MB (20:20:60 v/v %) + 0.10M LiBOB | 0.3856 | 0.3196 | 0.066 | 82.87 | 0.4054 | 0.3969 | 0.1123 | 97.92 |

Discharge Characteristics

Figure 3:
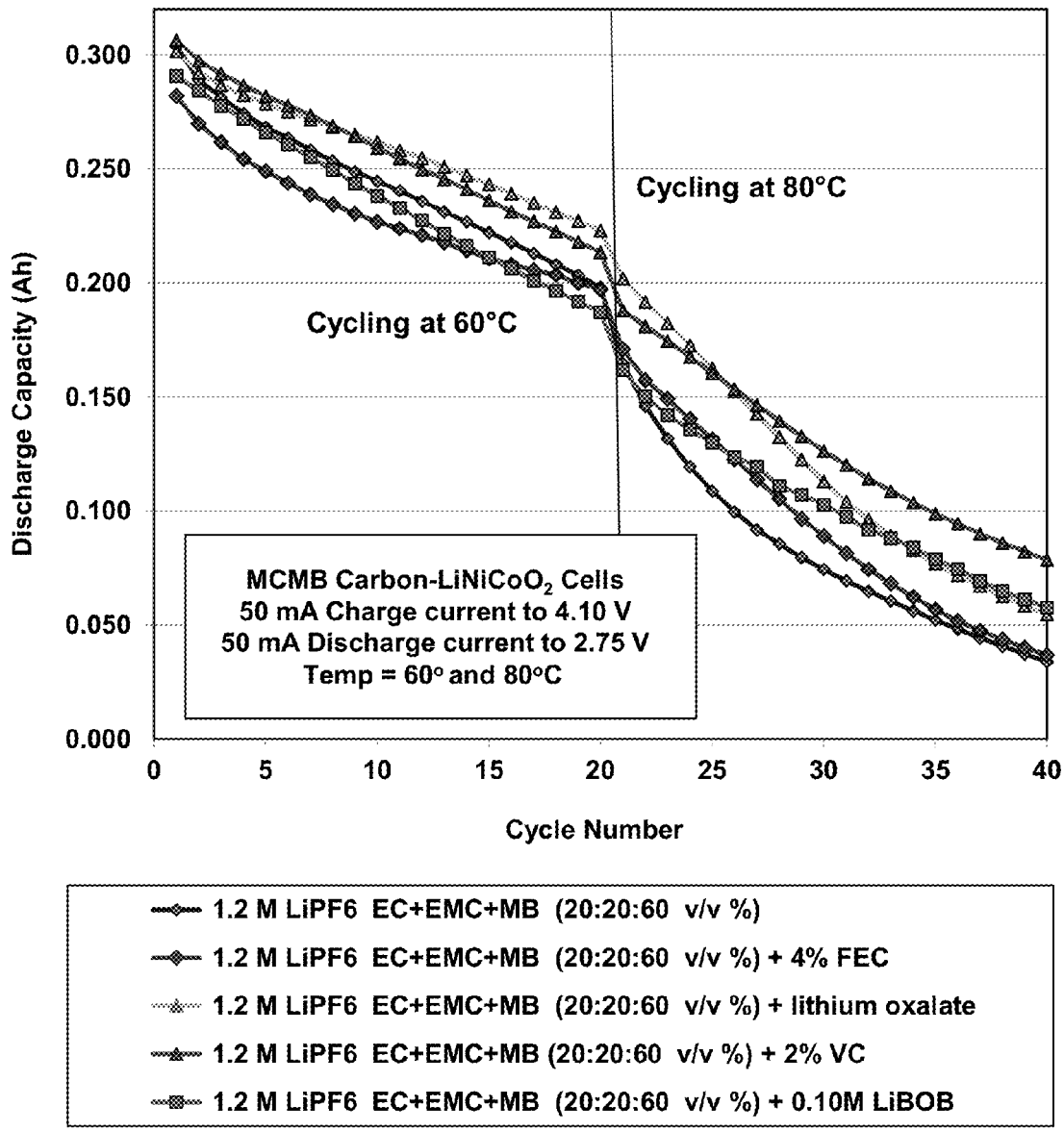
FIG. 3 shows the cycling characteristics of experimental MCMB-LiNiCoO$_2$ lithium-ion cells containing various methyl butyrate-based electrolytes at high temperatures (60° C. and 80° C.).

After performing the formation cycling, the cells were subjected to systematic discharge rate characterization testing over a wide temperature range. These tests included charging the cells at ambient temperature and then soaking the cells for at least four hours prior to discharging at the desired temperatures. The results of these studies are summarized in Table 6.

determine their high temperature resilience. This consisted of performing 20 cycles at 60° C., followed by electrochemical characterization, which was in turn followed by performing an additional 20 cycles at 80° C. As illustrated in FIG. 3, the cells containing the VC and lithium oxalate additives displayed the best capacity retention after being subjected to cycling at 60° C. This trend followed for the most part after being subjected to cycling at 80° C., with the cell containing

TABLE 6

Summary of the discharge characteristics of MCMB-LiNiCoO$_2$ cells containing various electrolytes over a wide temperature range (−50 to +23° C.). Cells were charged at 20° C.

| Electrolyte Type | | 1.2 M LiPF6 EC + EMC + MB (20:20:60 v/v %) | | 1.2 M LiPF6 EC + EMC + MB (20:20:60 v/v %) + 4% FEC | | 1.2 M LiPF6 EC + EMC + MB (20:20:60 v/v %) + 2% lithium oxalate | | 1.2 M LiPF6 EC + EMC+ MB (20:20:60 v/v %) + 2% VC | | 1.2 M LiPF6 EC + EMC + MB (20:20:60 v/v%) + 0.10 M LiBOB | |
|---|---|---|---|---|---|---|---|---|---|---|---|
| Temperature | Current (mA) | Capacity (Ahr) | Percent (%) | Capacity (Ahr) | Percent (%) | Capacity (Ahr) | Percent (%) | Capacity (Ahr) | Percent (%) | Capacity (Ahr) | Percent (%) |
| 23° C. | 25 mA | 0.3973 | 100.00 | 0.3825 | 100.00 | 0.3850 | 100.00 | 0.3868 | 100.00 | 0.3969 | 102.62 |
| 0° C. | 25 mA | 0.3514 | 88.46 | 0.3355 | 87.71 | 0.3431 | 89.12 | 0.3558 | 91.98 | 0.3549 | 89.40 |
|  | 50 mA | 0.3484 | 87.70 | 0.3300 | 86.29 | 0.3384 | 87.90 | 0.3534 | 91.37 | 0.3503 | 88.26 |
|  | 100 mA | 0.3376 | 84.99 | 0.3177 | 83.06 | 0.3269 | 84.91 | 0.3432 | 88.72 | 0.3409 | 85.87 |
|  | 150 mA | 0.3269 | 82.27 | 0.3048 | 79.70 | 0.3178 | 82.55 | 0.3329 | 86.06 | 0.3296 | 83.03 |
| −20° C. | 25 mA | 0.3438 | 86.53 | 0.3236 | 84.60 | 0.3299 | 85.70 | 0.3484 | 90.06 | 0.3502 | 88.23 |
|  | 50 mA | 0.3226 | 81.19 | 0.3022 | 79.01 | 0.3104 | 80.64 | 0.3285 | 84.92 | 0.3268 | 82.32 |
|  | 100 mA | 0.3051 | 76.79 | 0.2842 | 74.30 | 0.2967 | 77.05 | 0.3140 | 81.19 | 0.3149 | 79.32 |
|  | 150 mA | 0.2906 | 73.14 | 0.2714 | 70.96 | 0.2863 | 74.36 | 0.3011 | 77.84 | 0.3016 | 75.97 |
| −30° C. | 25 mA | 0.3179 | 80.01 | 0.3001 | 78.46 | 0.3030 | 78.71 | 0.3230 | 83.51 | 0.3289 | 82.86 |
|  | 50 mA | 0.2990 | 75.27 | 0.2808 | 73.43 | 0.2930 | 76.11 | 0.3090 | 79.88 | 0.3113 | 78.44 |
|  | 100 mA | 0.2704 | 68.07 | 0.2535 | 66.28 | 0.2730 | 70.91 | 0.2873 | 74.29 | 0.2879 | 72.52 |
|  | 150 mA | 0.2233 | 56.20 | 0.2095 | 54.78 | 0.2502 | 65.00 | 0.2642 | 68.31 | 0.2604 | 65.60 |
| −40° C. | 25 mA | 0.2938 | 73.95 | 0.2792 | 73.00 | 0.2861 | 74.32 | 0.2956 | 76.43 | 0.3038 | 76.53 |
|  | 50 mA | 0.2348 | 59.10 | 0.2355 | 61.57 | 0.2530 | 65.71 | 0.2634 | 68.09 | 0.2660 | 67.01 |
|  | 100 mA | 0.0823 | 20.71 | 0.1690 | 44.18 | 0.1709 | 44.39 | 0.2608 | 53.48 | 0.2106 | 53.04 |
|  | 150 mA | 0.0501 | 12.60 | 0.0388 | 10.14 | 0.0606 | 15.74 | 0.1104 | 28.54 | 0.0705 | 17.76 |
| −50° C. | 25 mA | 0.0709 | 17.83 | 0.0497 | 12.99 | 0.0939 | 24.40 | 0.1031 | 26.66 | 0.1694 | 42.69 |
|  | 50 mA | 0.0463 | 11.64 | 0.0310 | 8.11 | 0.0532 | 13.83 | 0.0450 | 11.63 | 0.0396 | 9.97 |
|  | 100 mA | 0.0203 | 5.12 | 0.0104 | 2.72 | 0.0285 | 7.41 | 0.0107 | 2.76 | 0.0167 | 4.21 |

Since the rationale of adding the electrolyte additives was to improve the high temperature resilience, it is significant that the discharge rate capability is somewhat comparable for all of the formulations investigated. This suggests that the electrolyte additives are not having a negative impact upon the cell impedance, limiting the low temperature performance. For example, as displayed in FIG. 1, when the cells were discharged at ~C/16 discharge rate at −40° C. very comparable performance of the electrolyte without any additives (the baseline formulation) and those with additives was obtained, with approximately 75% of the room temperature capacity being delivered.

Figure 2:
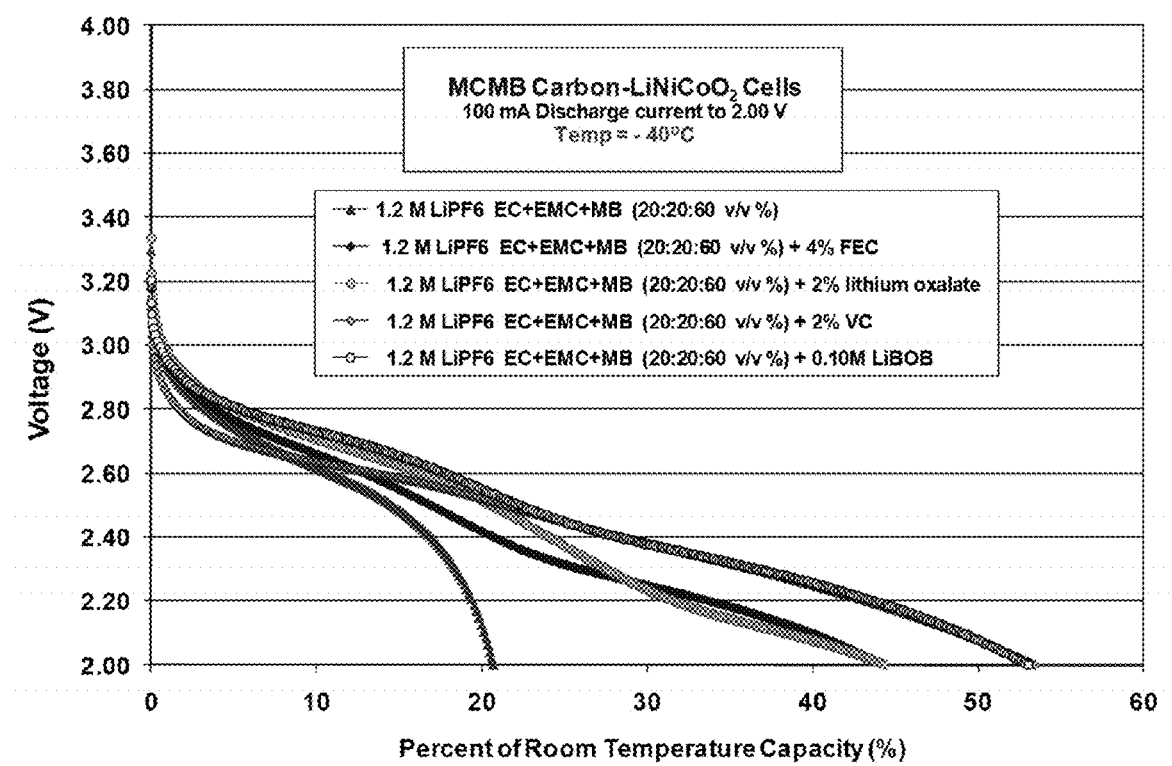
FIG. 2 shows the discharge capacity (Ah) of MCMB-LiNiCoO$_2$ lithium-ion cells containing various methyl butyrate-based electrolytes at −40° C. using a C/4 discharge rate.

In contrast, in many cases the cells containing the electrolyte additives actually deliver better performance than the baseline formulation under many conditions. As shown in FIG. 2, more differentiation of the cells can be observed under high rate conditions at low temperature (i.e., using a C/4 discharge rate at −40° C.). As illustrated, the cells containing LiBOB, VC, FEC, and lithium oxalate all outperformed the baseline formulation containing no additive. These results suggest that the lithium intercalation/de-intercalation kinetics are more favorable with the cells containing the electrolyte additives, presumably due to preferable SEI formation characteristics. In order to decipher the influence of the electrolyte additives upon the kinetics of the respective electrodes, detailed electrochemical characterization of the cells was performed, as described below.

After performing the rate characterization testing, cycling tests at high temperatures were performed on the cells to the VC additive displaying the best performance. It is likely that somewhat different capacity fade mechanisms may be present for the two temperatures, and that the mode of degradation may be different for the various electrolyte formulations (i.e., the performance characteristics of the anode and cathode may degrade at different rates depending upon the electrolyte type).

Electrochemical Characteristics

It is believed that the improved rate capability at low temperatures of Li-ion cells that utilized these ester-based solutions is primarily due to improved mass transfer characteristics in the electrolyte (higher ionic conductivity) and facile kinetics of lithium intercalation/de-intercalation at the interface due to favorable film formation behavior at the electrode surfaces. To enhance this understanding, as well as the impact that the electrolyte additives have upon these factors, we assessed the electrochemical characteristics of the systems using a number of techniques, including Tafel polarization measurements, Electrochemical Impedance Spectroscopy (EIS), and linear micro-polarization measurements.

Figure 4:
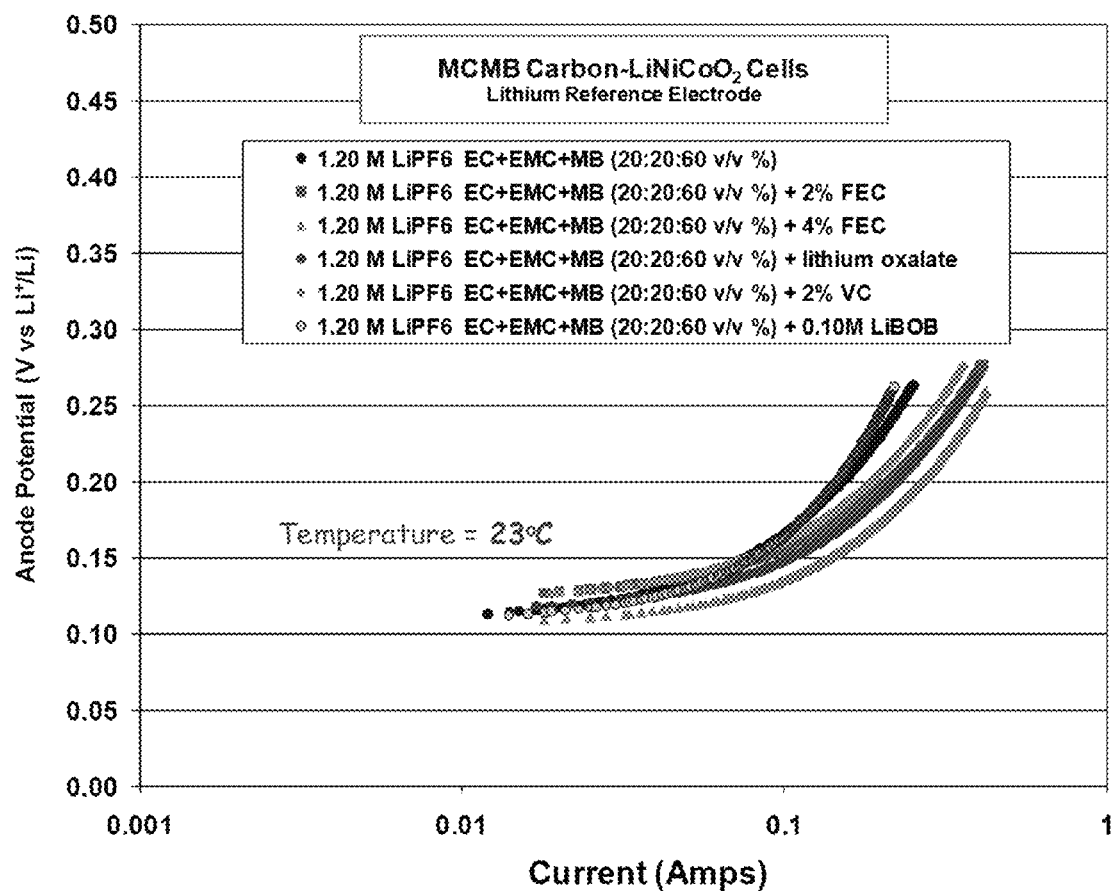
FIG. 4 shows Tafel polarization measurement of MCMB electrodes from MCMB-LiNiCoO$_2$ cells containing various methyl butyrate-based electrolytes at 23° C.

To determine the lithiation/de-lithiation kinetics of the anodes and the cathodes of the various systems, Tafel polarization measurements of the MCMB-Li$_x$Ni$_y$Co$_{1-y}$O$_2$ cells were performed. The measurements were conducted on the cells while they were in a full state of charge (SOC) (OCV=>4.07V) before and after each storage period. In all of these Tafel plots, there are distinct charge-transfer controlled regimes, where the overpotential increases linearly with log (I). The effect of mass transfer seems to be relatively insignificant which allows one to obtain kinetic parameters, such as the exchange current and the transfer coefficients. As illustrated in FIG. 4, with the exception of the cell containing LiBOB, improved lithium de-intercalation kinetics (i.e. higher limiting currents) were observed for the anodes in contact with the electrolytes possessing the electrolytes additives compared to the baseline formulation, suggesting that a desirable surface film has formed in these cases.

Figure 5:
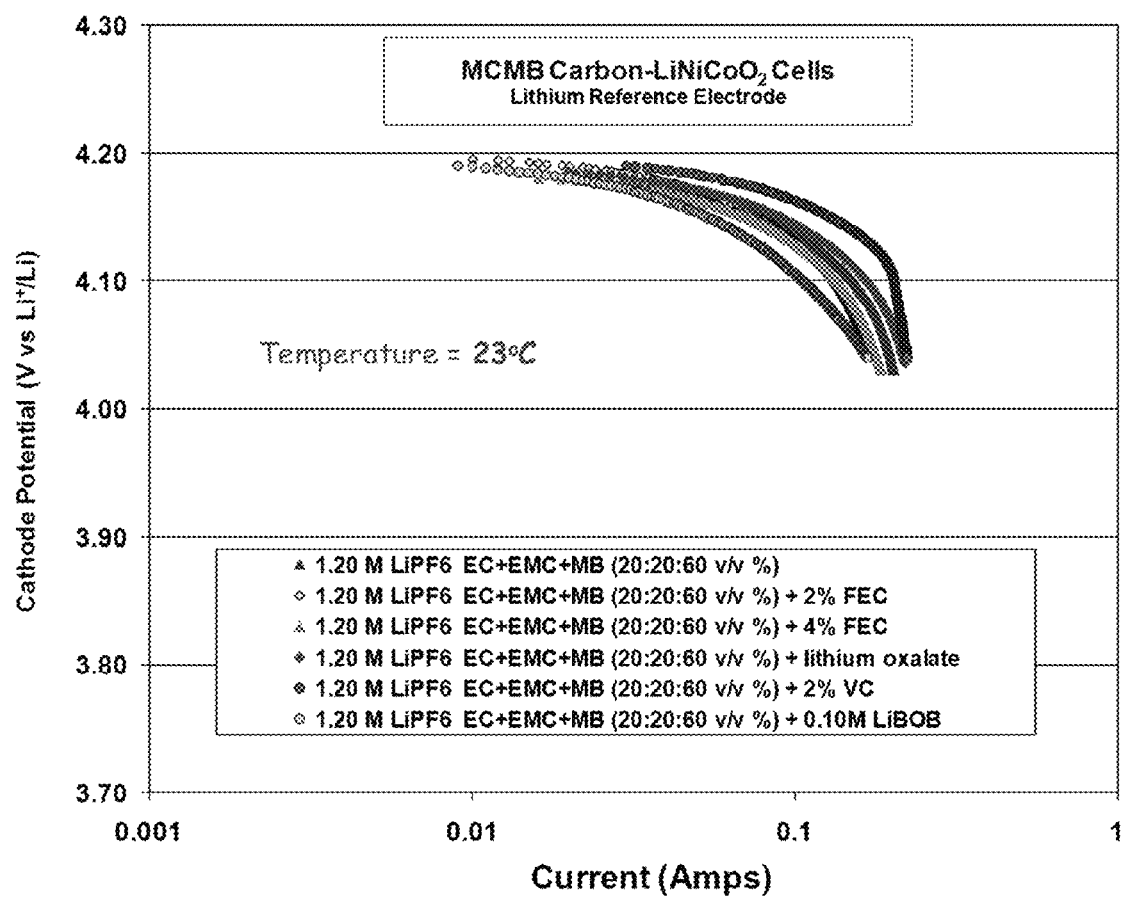
FIG. 5 shows Tafel polarization measurement of LiNiCoO$_2$ electrodes from MCMB-LiNiCoO$_2$ cells containing various methyl butyrate-based electrolytes at 23° C.

As illustrated in FIG. 5, in which the Tafel polarization measurements have been performed on the $LiNiCoO_2$ cathodes at room temperature, the cell containing the VC and lithium oxalate electrolyte additives displayed enhanced lithium kinetics (i.e., higher limiting current densities) compared to the baseline formulation. This observation, namely that VC has a beneficial effect upon the nature of the SEI layer on the cathode and the corresponding lithium kinetics, has been observed in our previous studies involving different solvent mixtures.

Figure 6:
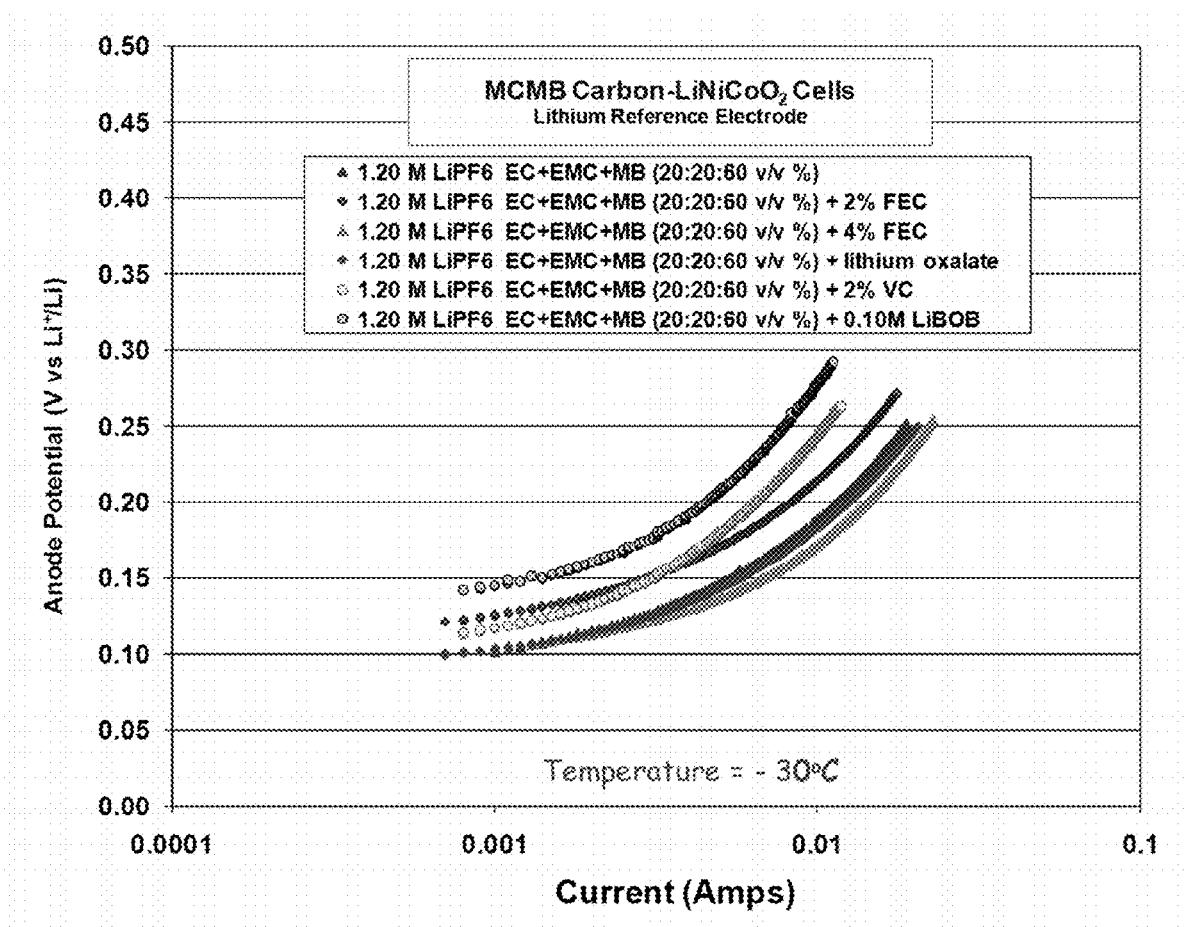
FIG. 6 shows Tafel polarization measurement of MCMB electrodes from MCMB-LiNiCoO$_2$ cells containing various methyl butyrate-based electrolytes at −30° C.
Figure 7:
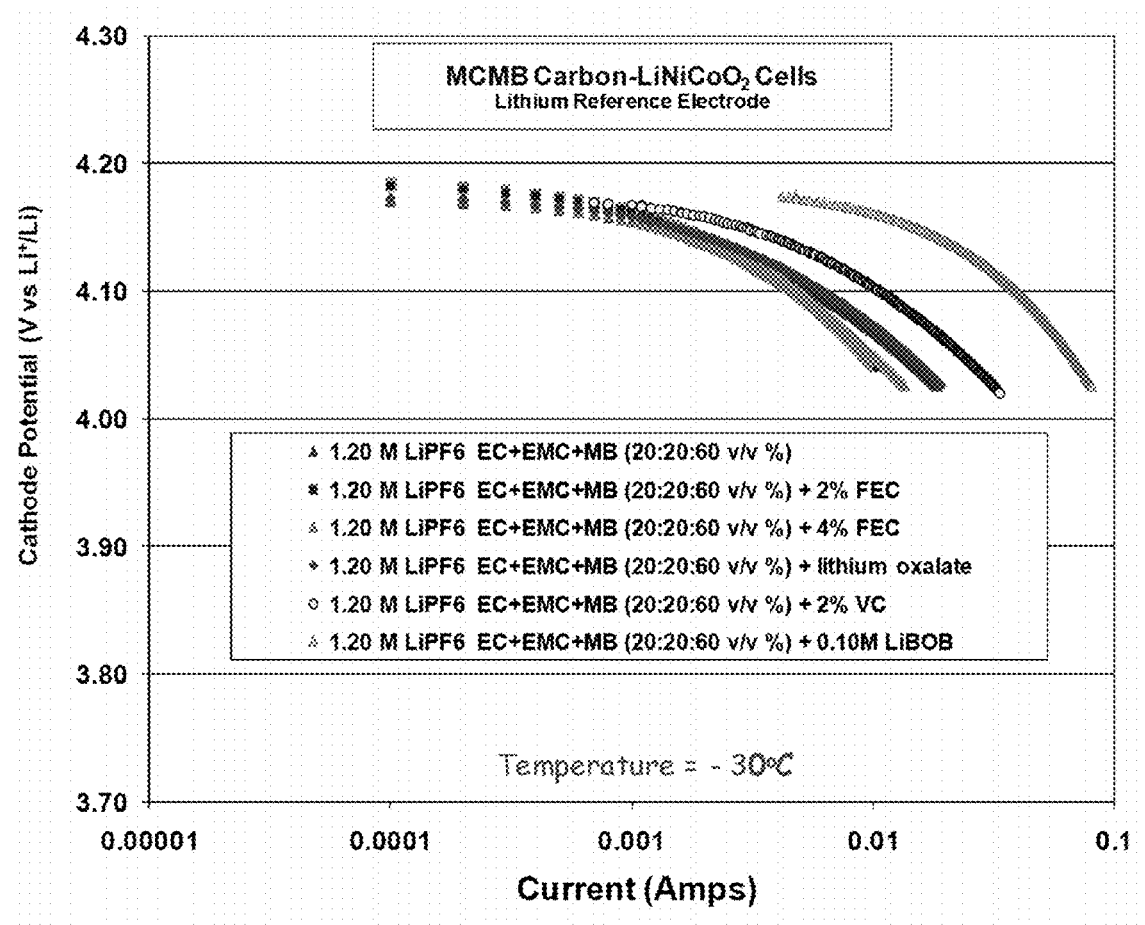
FIG. 7 shows Tafel polarization measurement of LiNiCoO$_2$ electrodes from MCMB-LiNiCoO$_2$ cells containing various methyl butyrate-based electrolytes at −30° C.

Generally, the trends with regard to the observed lithium kinetics and how they depend upon electrolyte type tend to track well with temperature. For example, when the Tafel measurements were performed on the MCMB anodes at low temperature, as displayed in FIG. 6, the cells containing the FEC and lithium oxalate additives delivered somewhat improved performance over the baseline formulation. However, when the $LiNiCoO_2$ cathodes were measured at −30° C., as shown in FIG. 7, a different trend was observed compared to that displayed at 20° C., with the cells containing LiBOB and VC delivering significantly better performance.

Figure 8:
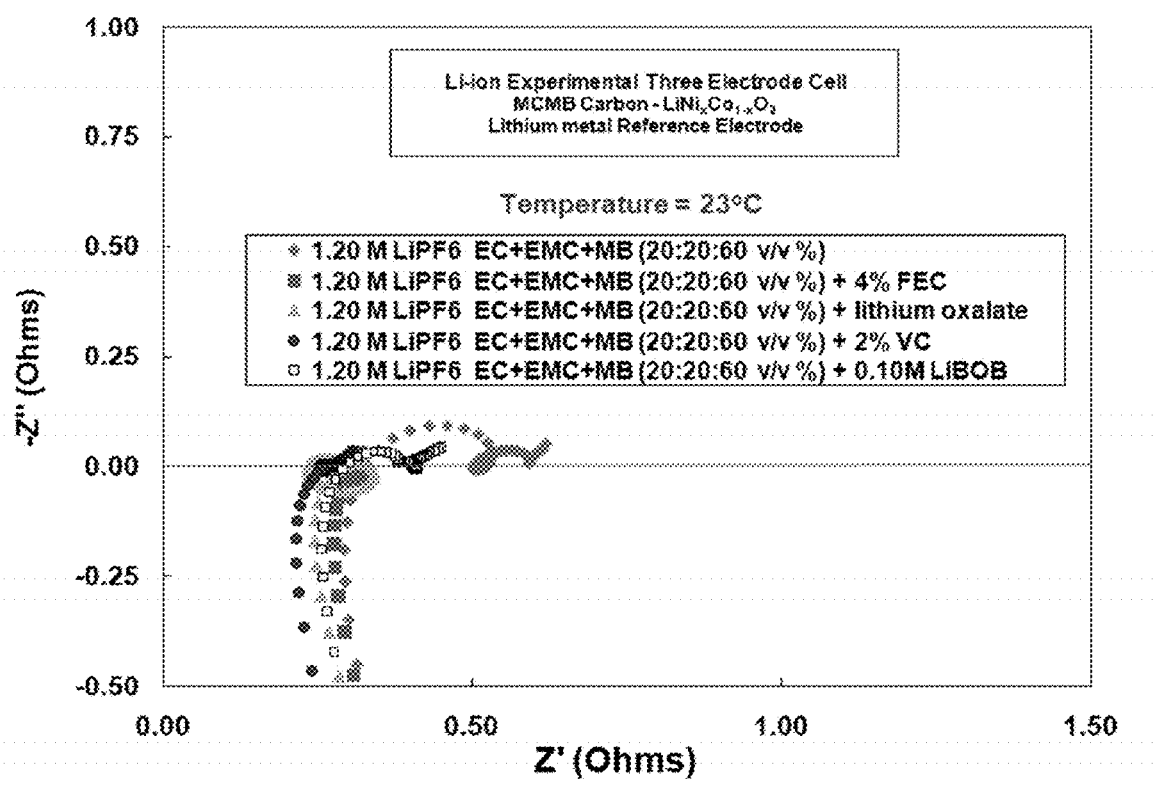
FIG. 8 shows EIS measurements performed on MCMB electrodes from MCMB-LiNiCoO$_2$ cells containing various methyl butyrate-based electrolytes. The measurements were performed after the cells were subjected to high temperature cycling (60-80° C.).
Figure 9:
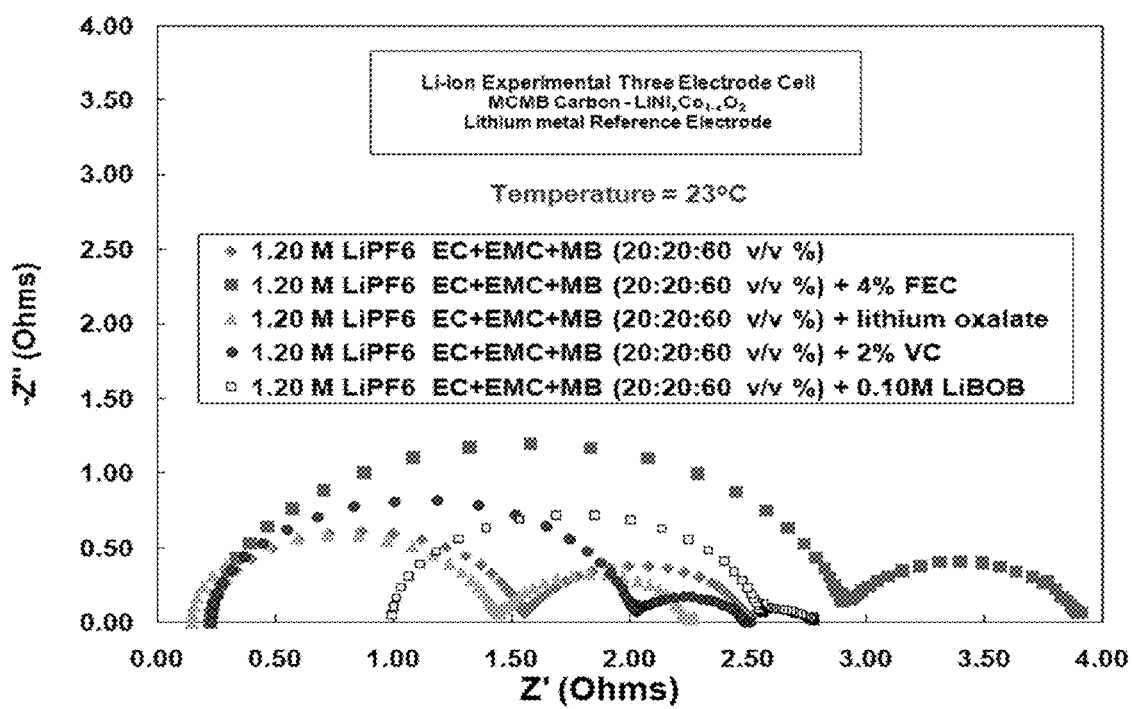
FIG. 9 shows EIS measurements performed on LiNiCoO$_2$ electrodes from MCMB-LiNiCoO$_2$ cells containing various methyl butyrate-based electrolytes. The measurements were performed after the cells were subjected to high temperature cycling (60-80° C.).
Figure 10:
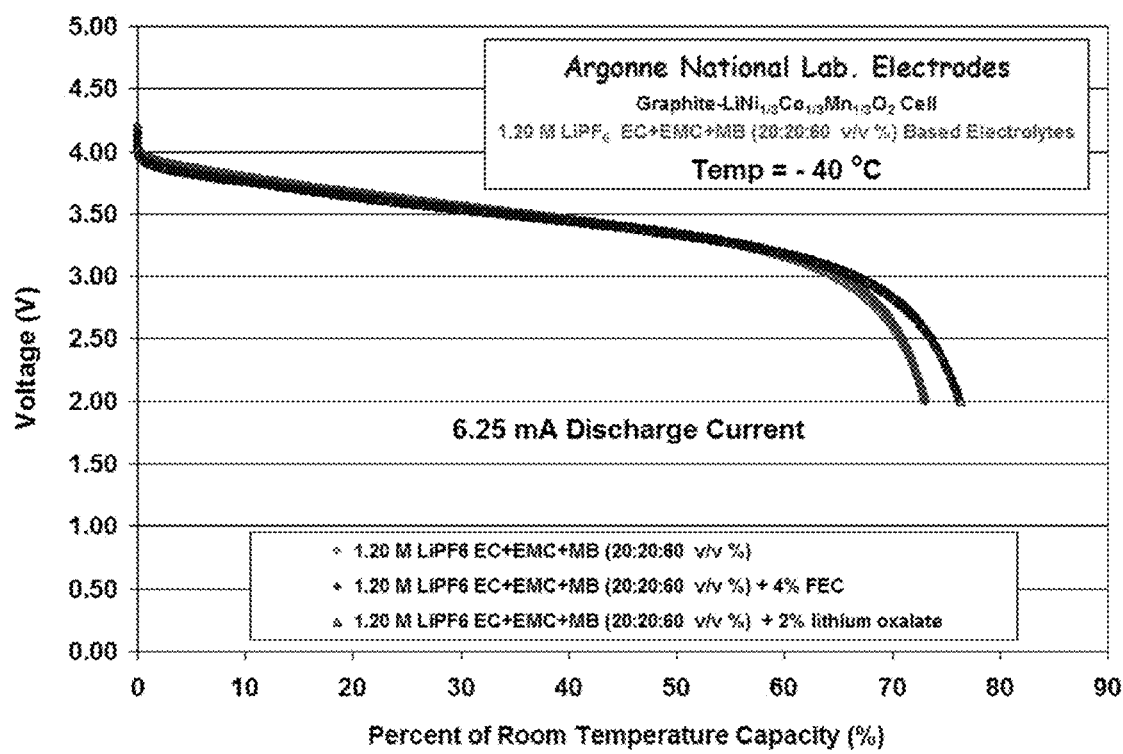
FIG. 10 shows discharge characteristics at −40° C. and 6.25 mA of cells containing methyl butyrate-based electrolytes.
Figure 11:
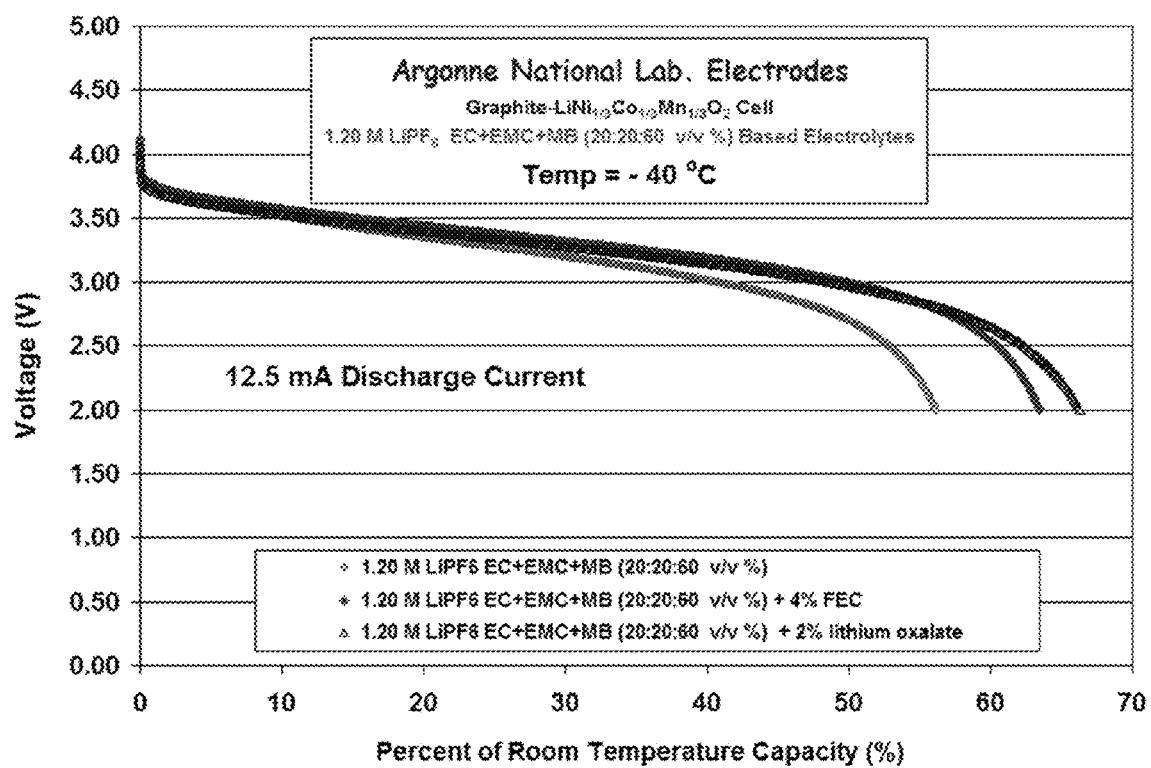
FIG. 11 shows discharge characteristics at −40° C. and 12.5 mA of cells containing methyl butyrate-based electrolytes.
Figure 12:
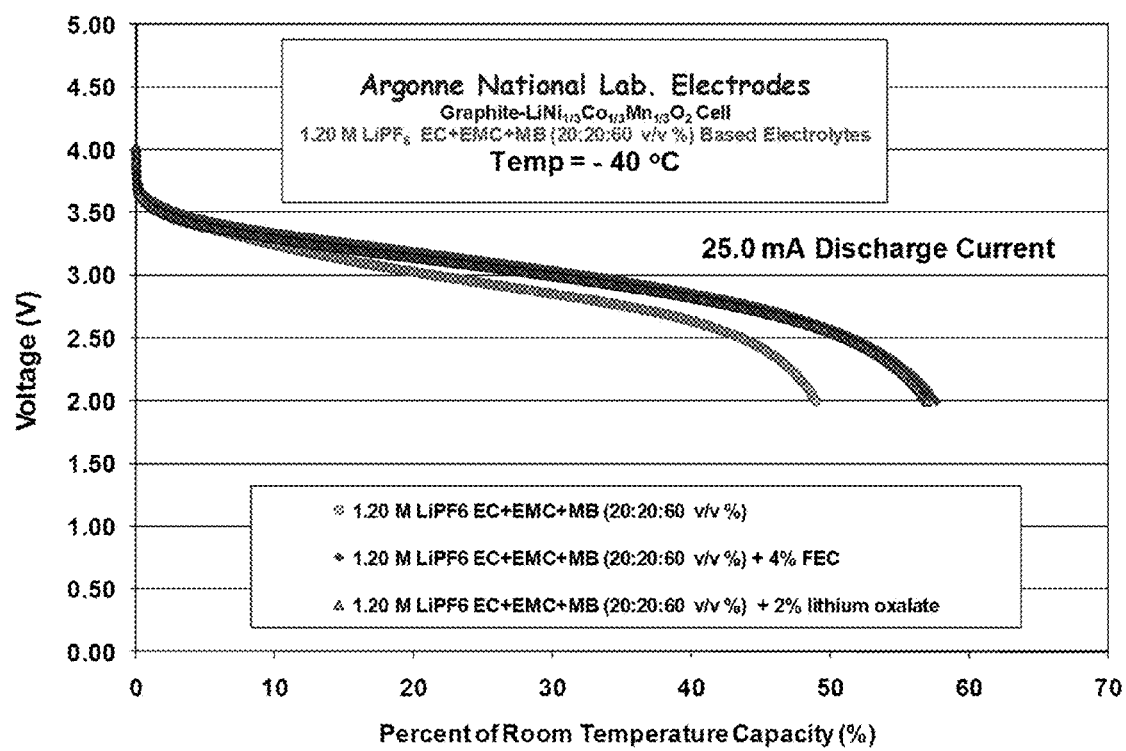
FIG. 12 shows discharge characteristics at −40° C. and 25.0 mA of cells containing methyl butyrate-based electrolytes.
Figure 13:
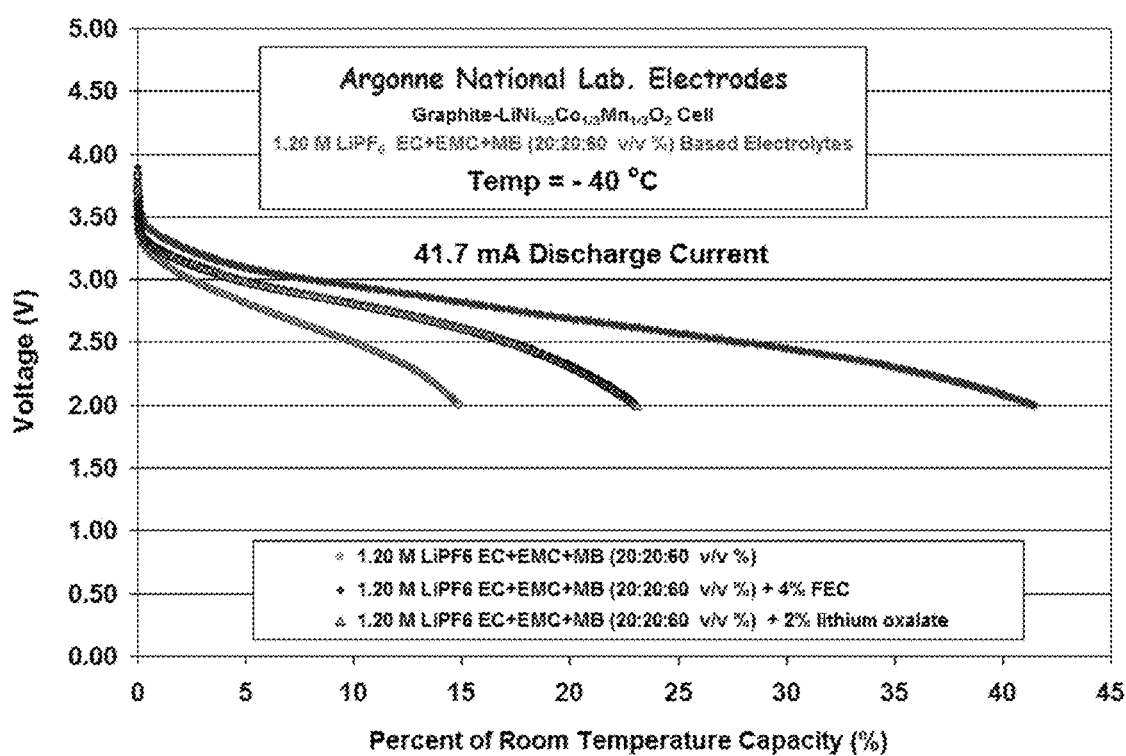
FIG. 13 shows discharge characteristics at −40° C. and 41.7 mA of cells containing methyl butyrate-based electrolytes.

After cycling the MCMB-LiNiCoO2 cells at high temperature, EIS measurements were performed on both the MCMB anodes and the LiNiCoO2 cathodes to determine the effect of the additive. As shown in FIG. 8, all of the additives evaluated appeared to result in lower film and charge transfer resistances at the anodes after being subjected to high temperatures, suggesting that protective surface films have been formed. With respect to the cathodes (FIG. 9), the EIS measurements indicate that the cell containing the electrolyte with lithium oxalate resulted in the best performance with the lowest film and charge transfer resistance.

Graphite $LiNi_{1/3}Co_{1/3}Mn_{1/3}O_2$ Cells

In addition to evaluating the technology in MCMB-$LiNi_{0.8}Co_{0.2}O_2$ cells, selected electrolytes were also evaluated in graphite-$LiNi_{1/3}Co_{1/3}Mn_{1/3}O_2$ experimental Li-ion cells (cell chemistry developed by Argonne National Lab). The electrolytes selected for evaluation included: (1) 1.20M $LiPF_6$ in EC+EMC+MB (20:20:60 v/v %), (2) 1.20M $LiPF_6$ in EC+EMC+MB (20:20:60 v/v %)+4% FEC, and (3) 1.20M $LiPF_6$ in EC+EMC+MB (20:20:60 v/v %)+lithium oxalate. As illustrated in Table 7, good performance was obtained with these electrolytes over a wide temperature range.

TABLE 7

Summary of the discharge characteristics of graphite - $LiNi_{1/3}Co_{1/3}Mn_{1/3}O_2$ cells containing various electrolytes over a wide temperature range (−60 to +23° C.). Cells were charged at 20° C.

| Temperature (° C.) | Current (mA) | Rate | 1.20M LiPF6 in EC + EMC + MB (20:20:60 v/v %) | | 1.20M LiPF6 in EC + EMC + MB (20:20:60 v/v %) + 4% FEC | | 1.20M LiPF6 in EC + EMC + MB (20:20:60 v/v %) + 2% lithium oxalate | |
|---|---|---|---|---|---|---|---|---|
| | | | Capacity (Ah) | Percent (%) | Capacity (Ah) | Percent (%) | Capacity (Ah) | Percent (%) |
| 23° C. | 25.00 | C/5 | 0.10655 | 100.00 | 0.11486 | 100.00 | 0.10794 | 100.00 |
| −20° C. | 6.25 | C/16 | 0.07743 | 72.67 | 0.09486 | 82.59 | 0.09734 | 90.18 |
| | 8.33 | C/12 | 0.07191 | 67.49 | 0.09237 | 80.42 | 0.09607 | 89.00 |
| | 12.50 | C/8 | 0.06533 | 61.31 | 0.08757 | 76.24 | 0.09084 | 84.16 |
| | 25.00 | C/4 | 0.06143 | 57.65 | 0.08334 | 72.56 | 0.08515 | 78.89 |
| | 41.67 | 0.42 C | 0.05703 | 53.53 | 0.07851 | 68.35 | 0.07858 | 72.80 |
| | 62.50 | 0.63 C | 0.04341 | 40.74 | 0.07153 | 62.28 | 0.07216 | 66.85 |
| −40° C. | 6.25 | C/16 | 0.07796 | 73.17 | 0.08384 | 73.00 | 0.08243 | 76.37 |
| | 8.33 | C/12 | 0.05455 | 51.19 | 0.07379 | 64.24 | 0.06930 | 64.21 |
| | 12.50 | C/8 | 0.05985 | 56.17 | 0.07287 | 63.44 | 0.07160 | 66.33 |
| | 25.00 | C/4 | 0.05212 | 48.92 | 0.06611 | 57.56 | 0.06146 | 56.94 |
| | 41.67 | 0.42 C | 0.01584 | 14.87 | 0.04761 | 41.45 | 0.02495 | 23.12 |
| | 62.50 | 0.63 C | 0.00854 | 8.02 | 0.02444 | 21.28 | 0.01410 | 13.06 |
| −50° C. | 6.25 | C/16 | 0.03944 | 37.01 | 0.06311 | 54.95 | 0.04852 | 44.95 |
| | 8.33 | C/12 | 0.03098 | 29.07 | 0.06107 | 53.17 | 0.04824 | 44.69 |
| | 12.50 | C/8 | 0.02135 | 20.04 | 0.05437 | 47.33 | 0.04157 | 38.51 |
| | 25.00 | C/4 | 0.00766 | 7.19 | 0.03567 | 31.06 | 0.02348 | 21.75 |
| | 41.67 | 0.42 C | 0.00312 | 2.93 | 0.00796 | 6.93 | 0.00555 | 5.14 |
| −60° C. | 6.25 | C/16 | 0.00827 | 7.76 | 0.02632 | 22.91 | 0.01275 | 11.81 |
| | 8.33 | C/12 | 0.00399 | 3.74 | 0.00878 | 7.65 | 0.01411 | 13.07 |
| | 12.50 | C/8 | 0.00162 | 1.52 | 0.00315 | 2.74 | 0.00792 | 7.33 |

As displayed in Table 7, the incorporation of the electrolyte additives, namely mono-fluoroethylene carbonate and lithium oxalate, further improved the low temperature capabilities over the baseline formulation. It should also be noted that all of these formulations dramatically outperform state-of-the-art all-carbonate based electrolytes under these conditions.

FIGS. 10 through 13 show discharge characteristics of graphite-$LiNi_{0.33}Co_{0.33}Mn_{0.33}O_2$ cells containing the MB-based electrolyte at −40° C. using a discharge current of 6.25 mA, 12.5 mA, 25 mA and 41.7 mA, respectively.

Figure 14:
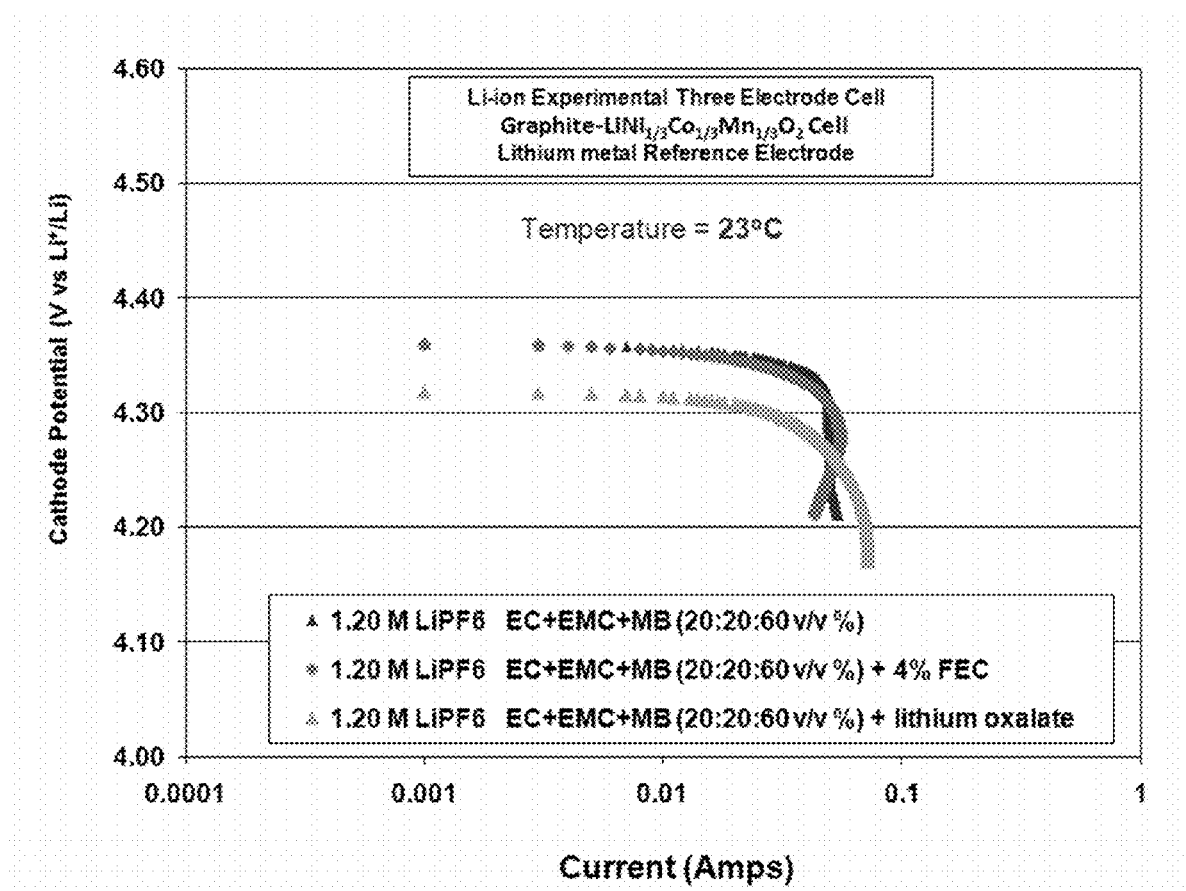
FIG. 14 shows Tafel polarization measurements of cells containing methyl butyrate-based electrolytes.
Figure 15:
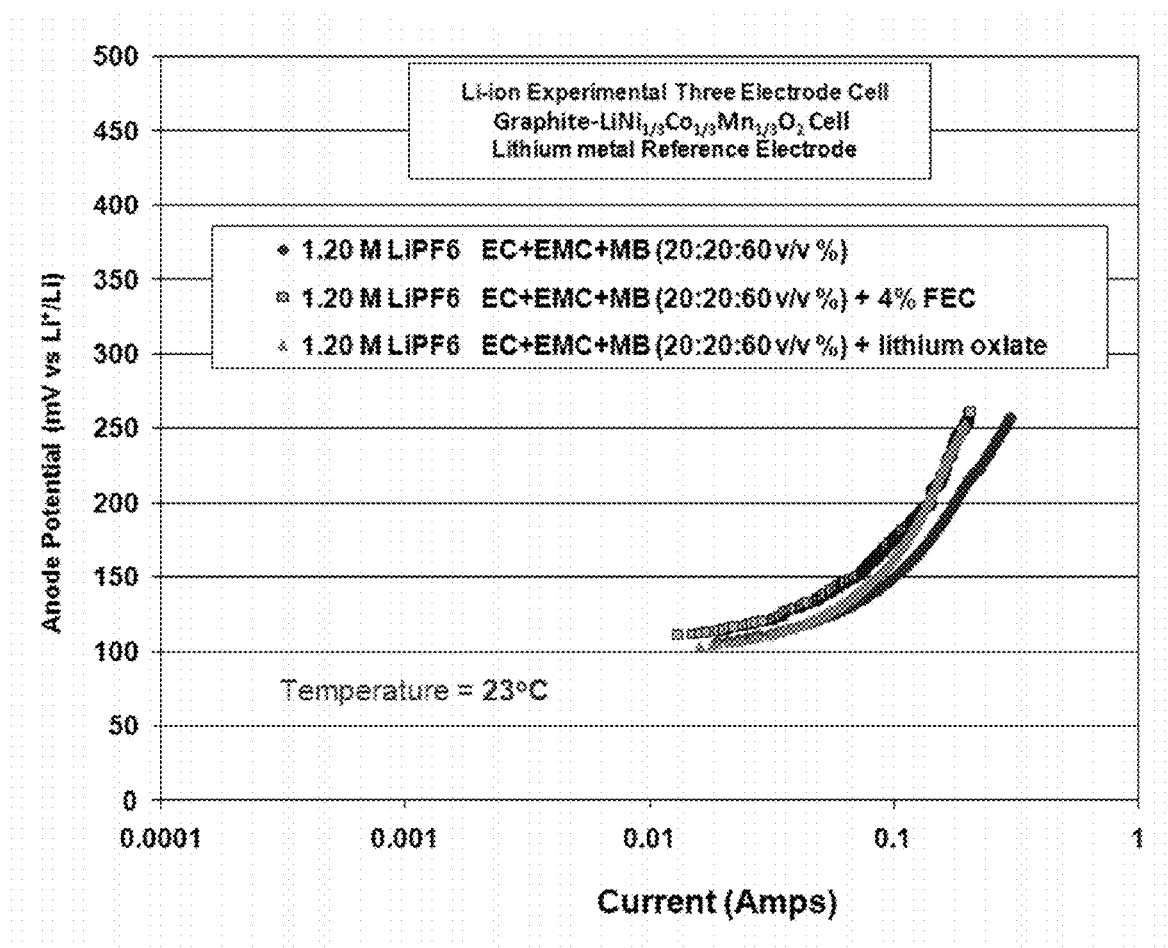
FIG. 15 shows Tafel polarization measurements of cells containing methyl butyrate-based electrolytes.
Figure 16:
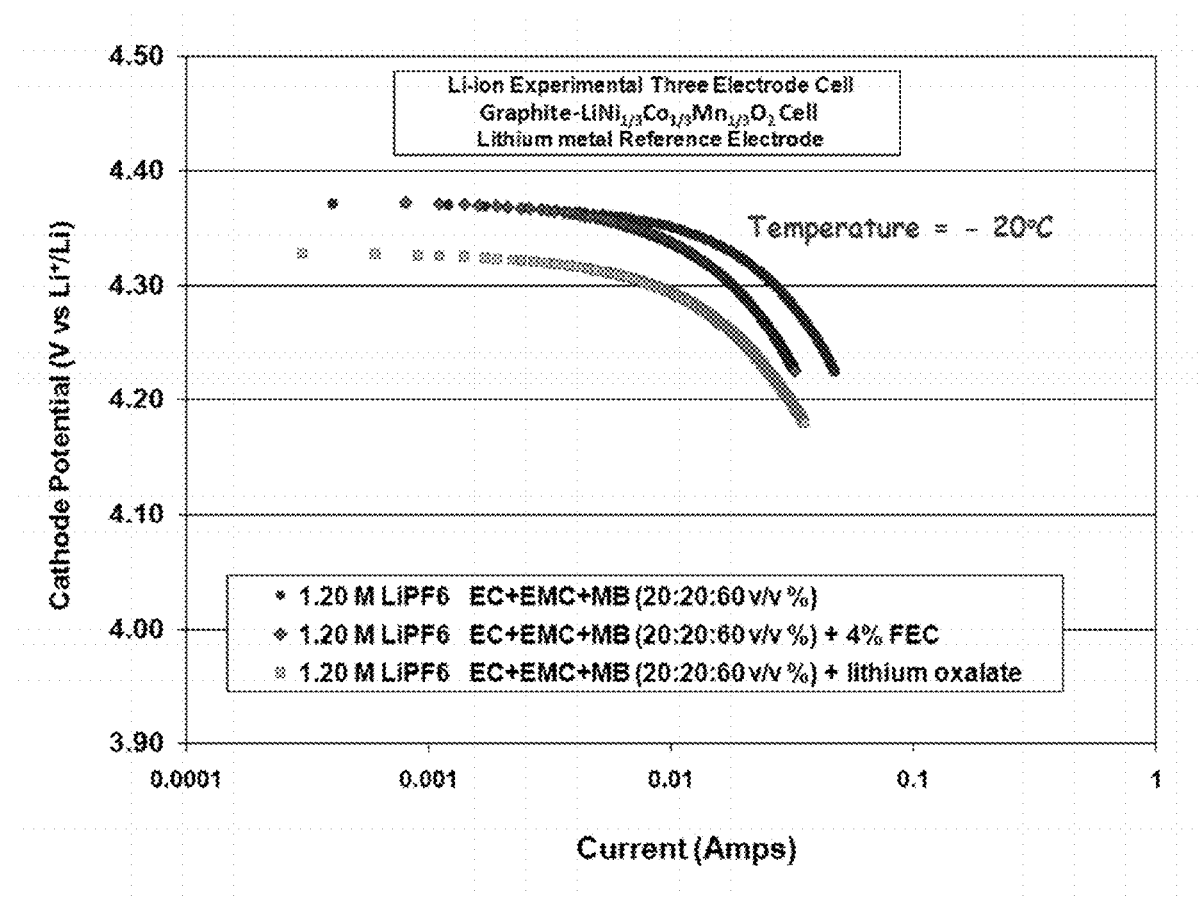
FIG. 16 shows Tafel polarization measurements of cells containing methyl butyrate-based electrolytes at −20° C.
Figure 17:
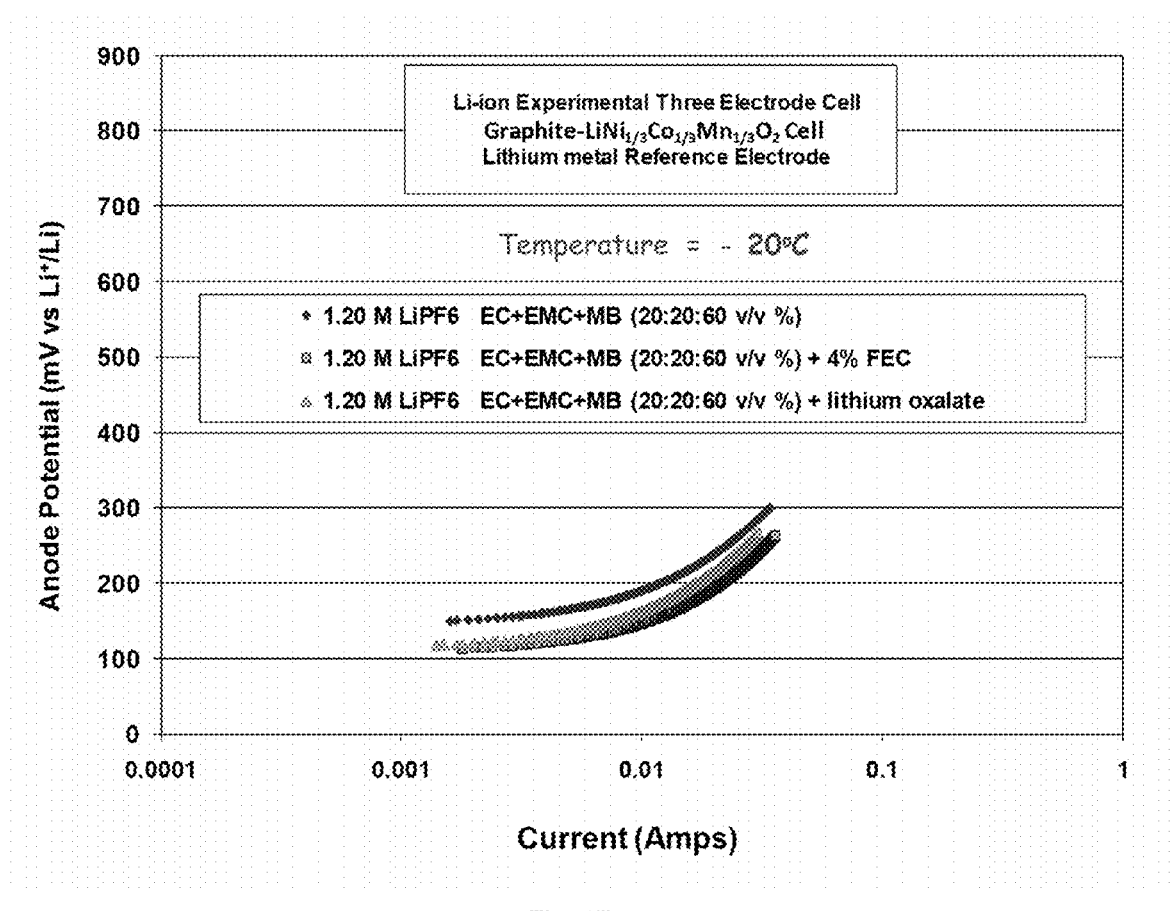
FIG. 17 shows Tafel polarization measurements of cells containing methyl butyrate-based electrolytes at −20° C.
Figure 18:
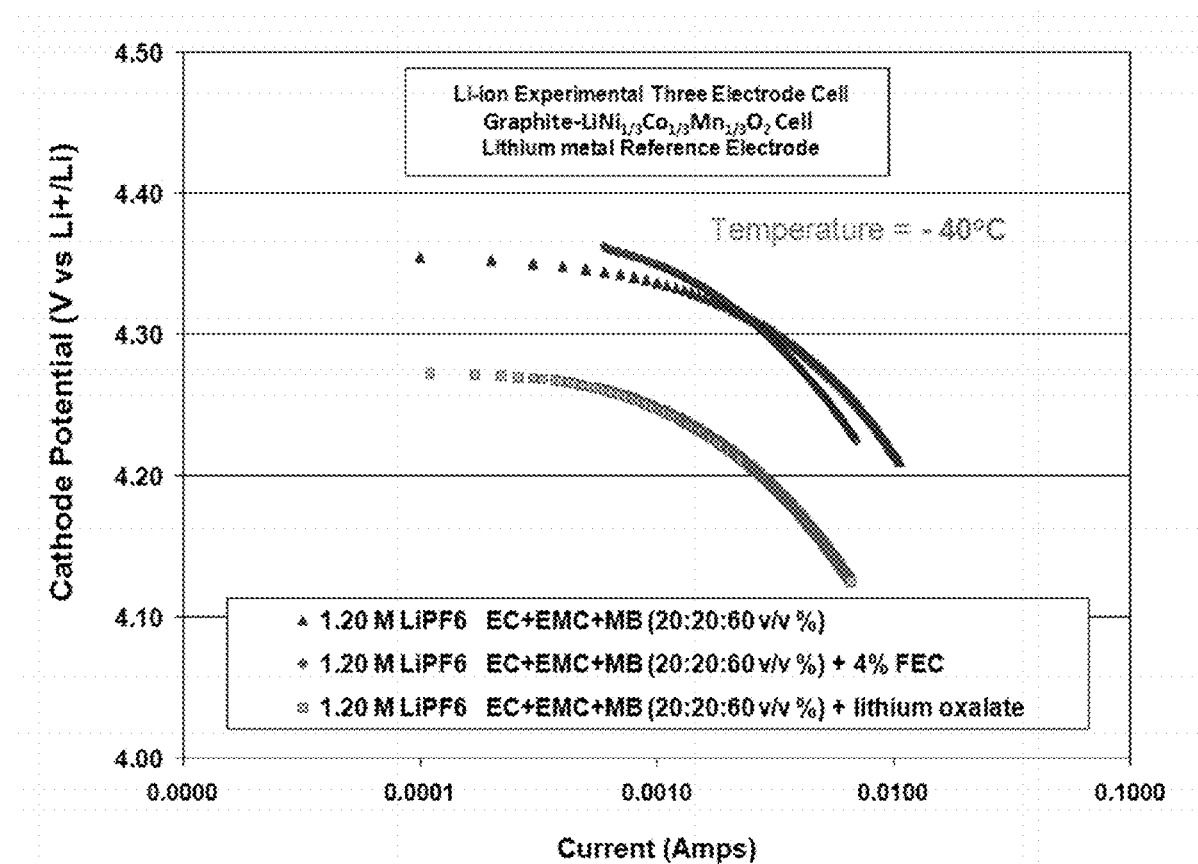
FIG. 18 shows Tafel polarization measurements of cells containing methyl butyrate-based electrolytes at −40° C.
Figure 19:
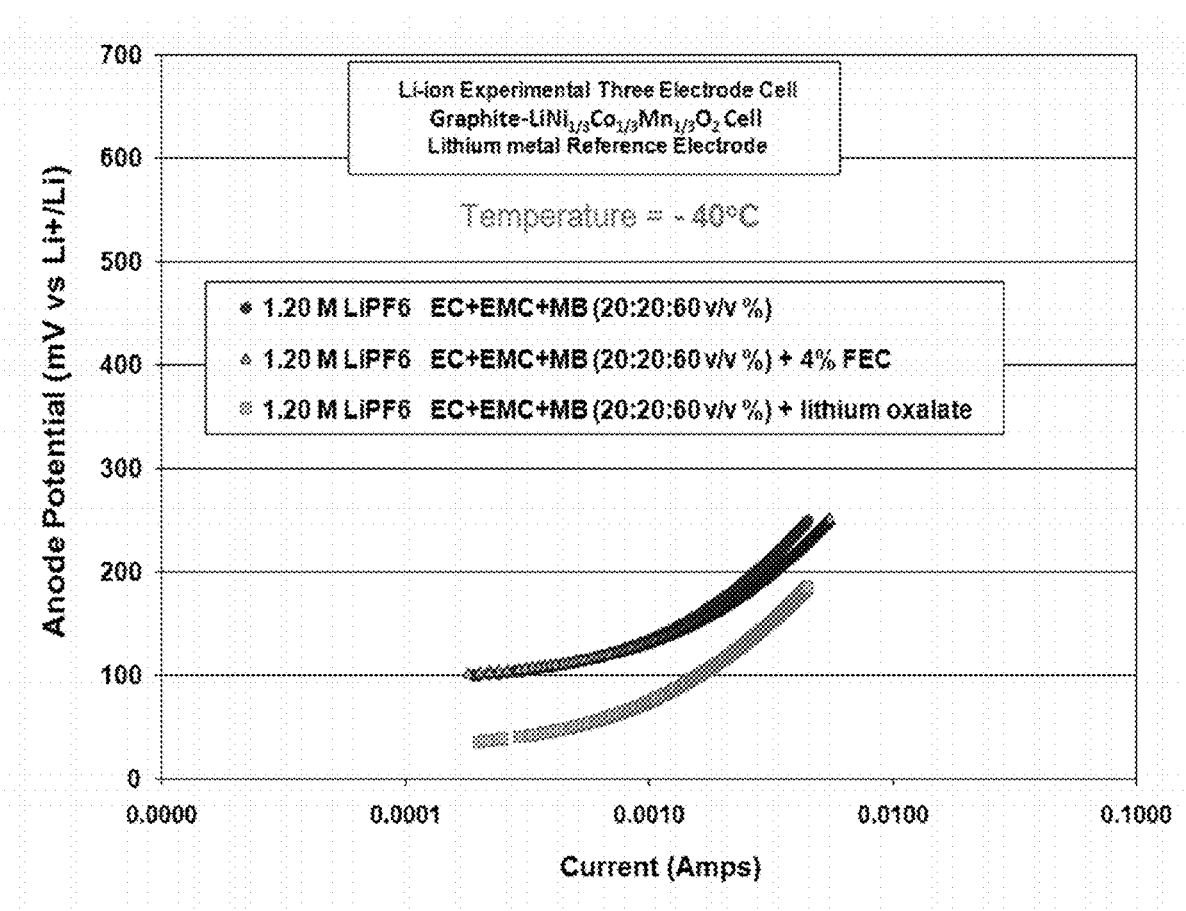
FIG. 19 shows Tafel polarization measurements of cells containing methyl butyrate-based electrolytes at −40° C.

FIGS. 14 through 19 show initial Tafel polarization measurements for the cathode and anode of graphite-LiNi0.33Co0.33Mn0.33O2 cells containing various MB-based electrolytes. FIGS. 14 and 15 show measurements at 23° C.; FIGS. 16 and 17 show measurements at −20° C.; FIGS. 18 and 19 show measurements at −40° C. At room temperature, 1.2 M $LiPF_6$ EC+EMC+MB (20:20:60 v/v %)+lithium oxalate provides better performance at the cathode ($LiNi_{0.33}Co_{0.33}Mn_{0.33}O_2$) than both the electrolyte containing an FEC additive and the baseline formulation containing no additives at room temperature. However, at −20° C. the situation at the cathode changes and both the FEC and lithium oxalate containing MB-based electrolytes outperform the baseline formulation. The baseline formulation outperforms both MB-based electrolytes at the anode (graphite) at room temperature, and this trend holds at −20° C. At −40° C., however, both the FEC and lithium oxalate MB-based electrolytes outperform the baseline formulation at the anode), but both are outperformed by the baseline formulation at the cathode.

Figure 20:
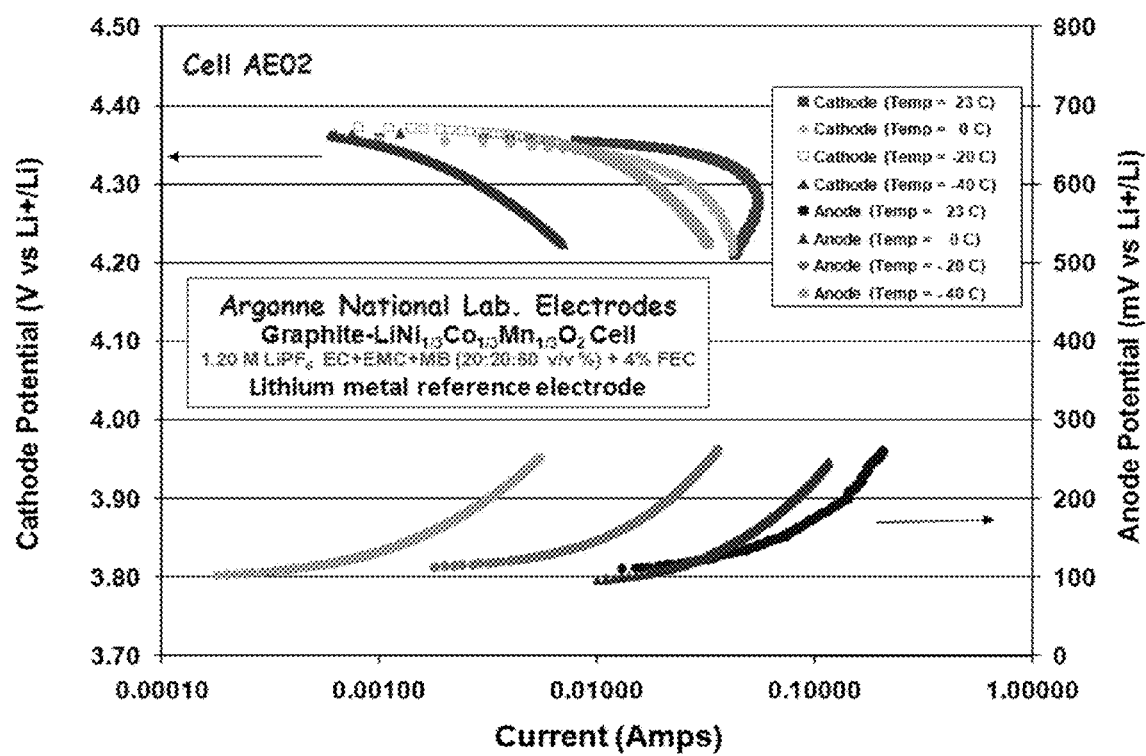
FIG. 20 shows a comparison of the Tafel polarization measurements of the anode and cathode at different temperatures for a cell containing methyl butyrate-based electrolyte including 4% FEC.

FIG. 20 compares Tafel polarization measurements at different temperatures for an electrolyte containing 4% FEC.

Figure 21:
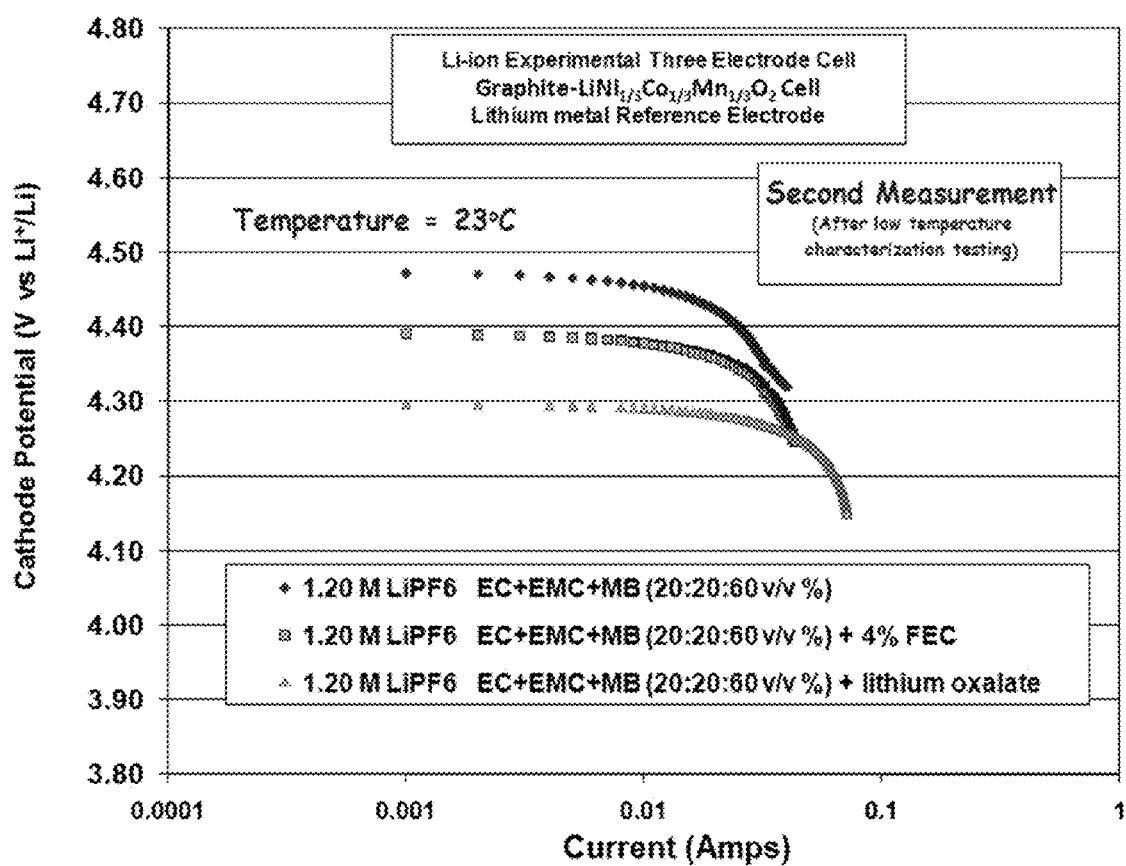
FIG. 21 shows Tafel polarization measurements of cells containing methyl butyrate-based electrolytes.
Figure 22:
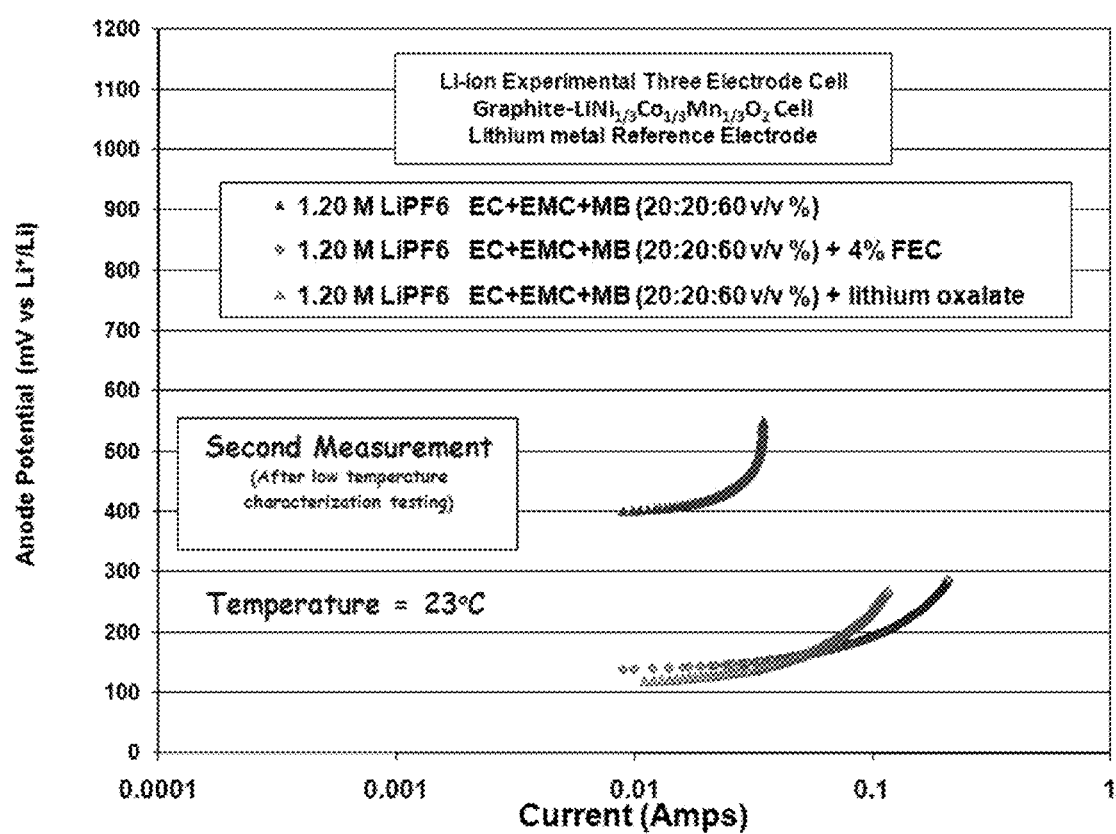
FIG. 22 shows Tafel polarization measurements of cells containing methyl butyrate-based electrolytes.

FIGS. 21 and 22 show room temperature Tafel polarization measurements after low temperature characterization. After low temperature characterization, the MB-based electrolyte containing the lithium oxalate additive continued to outperform either the FEC or baseline formulations at room temperature with respect to the cathode. In addition, the baseline formulation displayed much lower limiting current densities on graphite electrodes, and the addition of FEC greatly improved the stability of the system.

Figure 23:
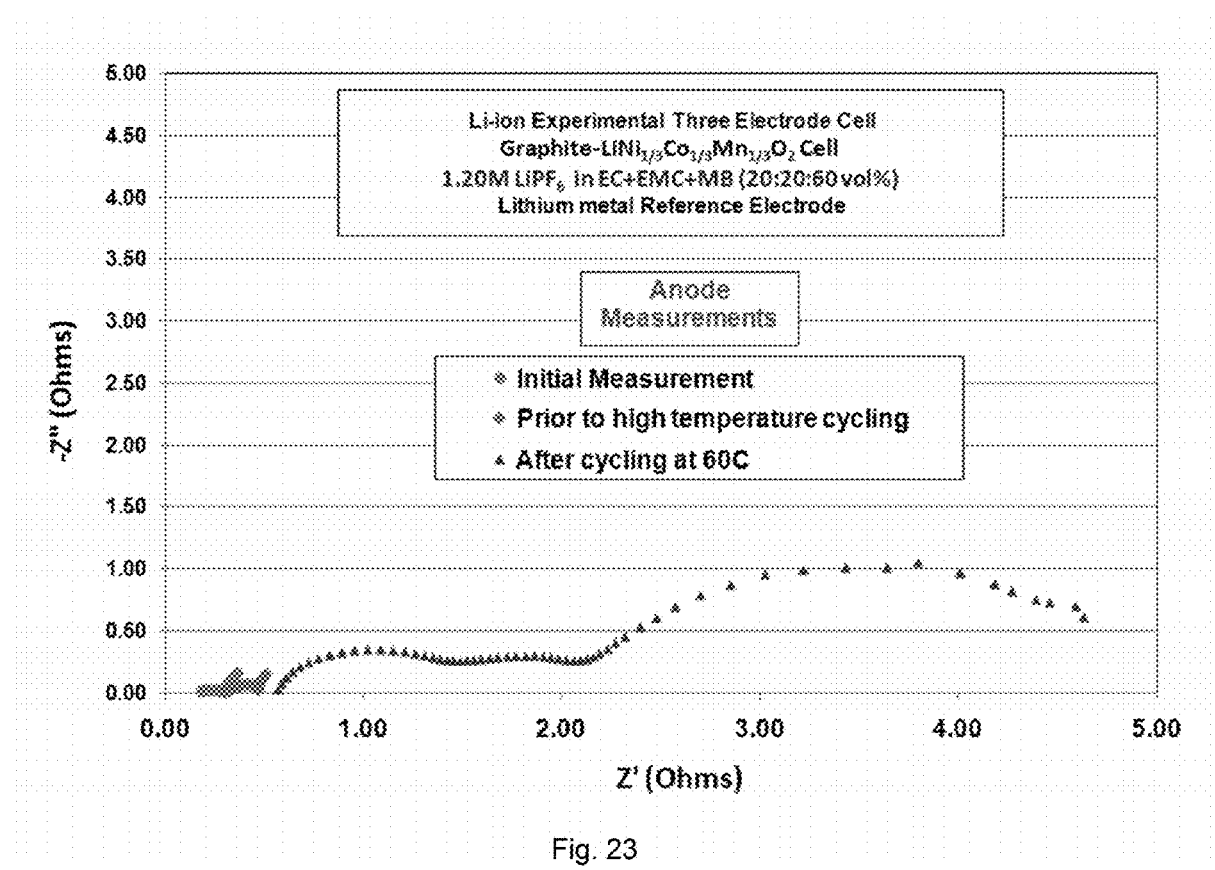
FIG. 23 shows anode EIS measurements of a cell containing a reference electrolyte composition after high temperature cycling.
Figure 24:
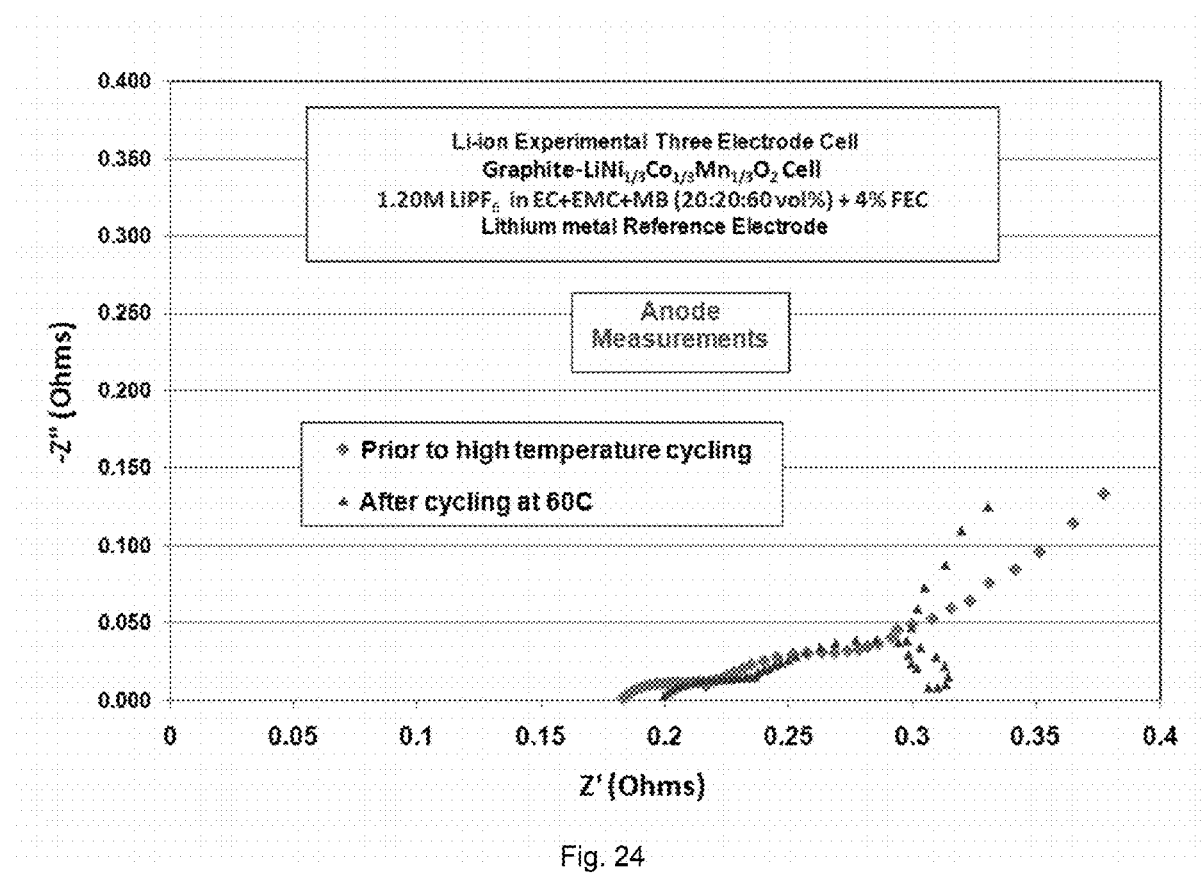
FIG. 24 shows anode EIS measurements of a cell containing a methyl butyrate-based electrolyte composition after high temperature cycling.
Figure 25:
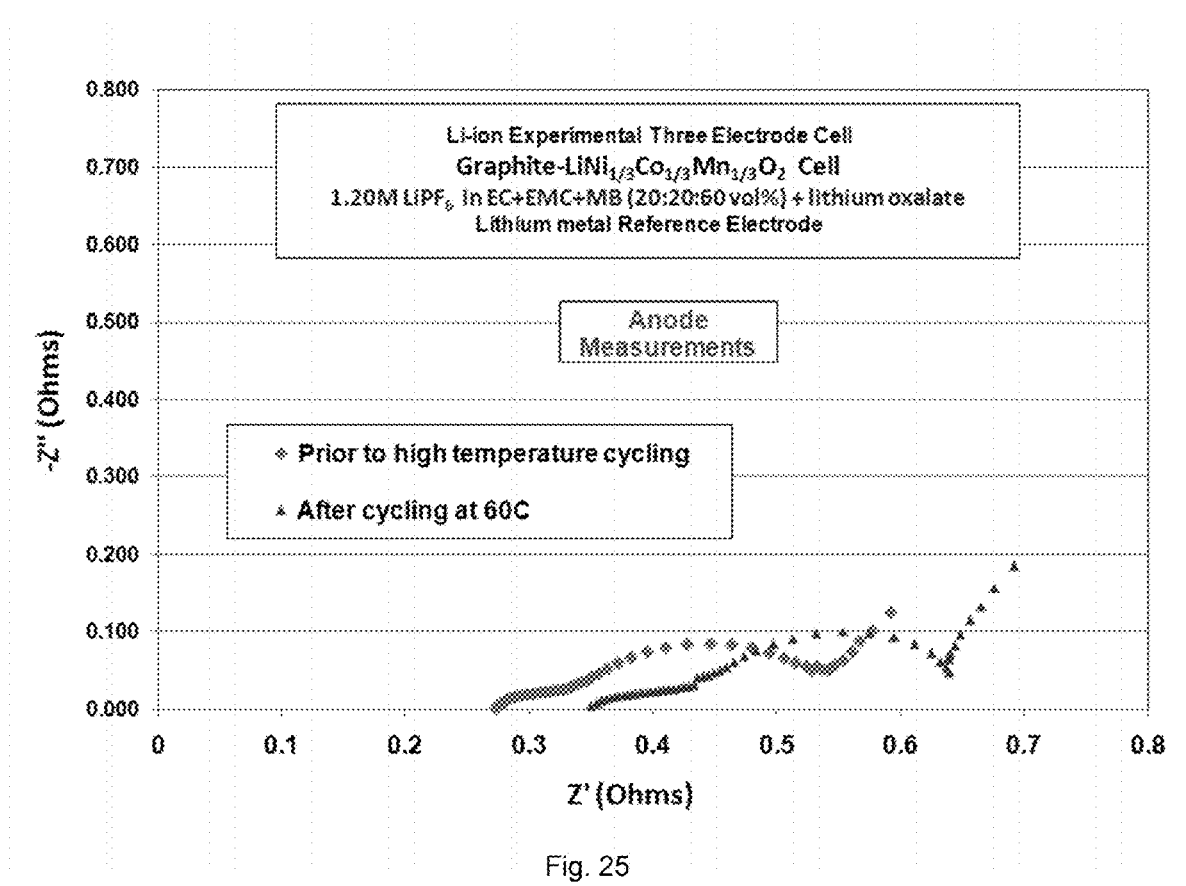
FIG. 25 shows EIS measurements of an anode containing a methyl butyrate-based electrolyte composition after high temperature cycling.

FIGS. 23 through 25 demonstrate that addition of either FEC or lithium oxalate to methyl butyrate-based solutions protects the nature of the SEI at the anode. Performance of the electrolytes containing additives was similar both before and after high temperature cycling. Thus, the use of mono-fluoroethylene carbonate (FEC) and lithium oxalate have been shown to improve the performance (both at low and high temperature) when incorporated into methyl butyrate-based electrolytes with the $LiNi_{1/3}Co_{1/3}Mn_{1/3}O_2$ system.).

$LiFePO_4$-Based Cells

In addition to the FEC and lithium oxalate systems discussed above, we have demonstrated good cycle life and improved low temperature of $LiFePO_4$-based cells using the following methyl butyrate-based electrolytes:
1) 1.2M $LiPF_6$ EC+EMC+MB (20:20:60)+4% FEC
2) 2M $LiPF_6$ EC+EMC+MB (20:20:60)+2% VC As shown in Table 8, these systems were capable of supporting >11 C discharge rates at −30° C., with over 90% of the room temperature capacity being delivered. The cells also performed well down to −60° C., with 80% of the room temperature capacity being delivered using a C/10 rate. Good cycle life performance was observed up to 50° C., and the cells displayed resilience to variable temperature cycling (i.e., charging and discharging at low temperature as well as high). Cells were A123 2.20 Ah cells.

TABLE 8

| Temp | Rate | Amps | Baseline Electrolyte | | | | 1.2M LiPF6 in EC + EMC + MB (20:20:60 v/v %) + 2% VC | | | | 1.2M LiPF6 in EC + EMC + MB (20:20:60 v/v %) + 4% FEC | | | |
|---|---|---|---|---|---|---|---|---|---|---|---|---|---|---|
| | | | Ah | Wh | Wh/kg | % | Ah | Wh | Wh/kg | % | Ah | Wh | Wh/kg | % |

A. Summary of the discharge characteristics of $LiFePO_4$-based cells containing various electrolytes.
Temperature Range 20° C. to −10° C.; Cells were discharged to 1.50 V.

| Temp | Rate | Amps | Ah | Wh | Wh/kg | % | Ah | Wh | Wh/kg | % | Ah | Wh | Wh/kg | % |
|---|---|---|---|---|---|---|---|---|---|---|---|---|---|---|
| 20° C. | C/5 | 0.40 | 2.242 | 7.284 | 102.59 | 100 | 2.380 | 7.712 | 108.31 | 100 | 2.317 | 7.505 | 105.70 | 100 |
| 20° C. | 11.4 C | 25.0 | 2.181 | 5.912 | 83.27 | 97.27 | 2.138 | 5.422 | 76.16 | 89.85 | 2.084 | 5.004 | 70.48 | 89.94 |
| | 10.2 C | 22.5 | 2.195 | 6.038 | 85.04 | 97.89 | 2.160 | 5.637 | 79.17 | 90.77 | 2.109 | 5.446 | 76.70 | 91.02 |
| | 9.1 C | 20.0 | 2.196 | 6.126 | 86.29 | 97.92 | 2.175 | 5.816 | 81.69 | 91.39 | 2.121 | 5.670 | 79.85 | 91.54 |
| | 8.0 C | 17.5 | 2.196 | 6.221 | 87.62 | 97.95 | 2.189 | 5.990 | 84.13 | 91.98 | 2.131 | 5.855 | 82.47 | 91.98 |
| | 6.8 C | 15.0 | 2.198 | 6.324 | 89.07 | 98.02 | 2.204 | 6.164 | 86.57 | 92.58 | 2.142 | 6.029 | 84.91 | 92.46 |
| | 5.7 C | 12.5 | 2.190 | 6.406 | 90.23 | 97.68 | 2.213 | 6.323 | 88.81 | 92.97 | 2.148 | 6.182 | 87.06 | 92.71 |
| | 4.5 C | 10.0 | 2.203 | 6.560 | 92.39 | 98.27 | 2.238 | 6.534 | 91.76 | 94.02 | 2.170 | 6.383 | 89.89 | 93.66 |
| | 3.4 C | 7.5 | 2.209 | 6.697 | 94.33 | 98.50 | 2.258 | 6.738 | 94.64 | 94.88 | 2.186 | 6.571 | 92.55 | 94.38 |
| | 2.3 C | 5.0 | 2.220 | 6.872 | 96.79 | 99.00 | 2.284 | 6.976 | 97.98 | 95.95 | 2.206 | 6.779 | 95.48 | 95.23 |
| 10° C. | 11.4 C | 25.0 | 2.207 | 5.755 | 81.06 | 98.42 | 2.175 | 5.353 | 75.18 | 91.37 | 2.126 | 4.956 | 69.80 | 91.75 |
| | 10.2 C | 22.5 | 2.200 | 5.810 | 81.83 | 98.12 | 2.187 | 5.528 | 77.63 | 91.88 | 2.139 | 5.378 | 75.74 | 92.33 |
| | 9.1 C | 20.0 | 2.209 | 5.904 | 83.15 | 98.52 | 2.221 | 5.740 | 80.62 | 93.30 | 2.156 | 5.607 | 78.98 | 93.08 |
| | 8.0 C | 17.5 | 2.206 | 5.984 | 84.29 | 98.40 | 2.215 | 5.866 | 82.39 | 93.08 | 2.162 | 5.781 | 81.43 | 93.30 |
| | 6.8 C | 15.0 | 2.209 | 6.085 | 85.70 | 98.54 | 2.208 | 5.980 | 83.99 | 92.77 | 2.174 | 5.963 | 83.99 | 93.85 |
| | 5.7 C | 12.5 | 2.199 | 6.153 | 86.66 | 98.05 | 2.240 | 6.202 | 87.11 | 94.10 | 2.176 | 6.108 | 86.02 | 93.94 |
| | 4.5 C | 10.0 | 2.213 | 6.313 | 88.92 | 98.71 | 2.264 | 6.413 | 90.06 | 95.11 | 2.199 | 6.314 | 88.93 | 94.92 |
| | 3.4 C | 7.5 | 2.217 | 6.455 | 90.91 | 98.88 | 2.283 | 6.613 | 92.88 | 95.93 | 2.215 | 6.499 | 91.53 | 95.61 |
| | 2.3 C | 5.0 | 2.226 | 6.669 | 93.93 | 99.30 | 2.305 | 6.861 | 96.37 | 96.86 | 2.231 | 6.715 | 94.58 | 96.32 |
| 20° C. | C/5 | 0.40 | 2.242 | 7.284 | 102.59 | 100 | 2.380 | 7.712 | 108.31 | 100 | 2.317 | 7.505 | 105.70 | 100 |
| 0° C. | 11.4 C | 25.0 | 2.190 | 5.431 | 76.49 | 97.67 | 2.174 | 5.094 | 71.55 | 91.33 | 2.147 | 4.806 | 67.68 | 92.69 |
| | 10.2 C | 22.5 | 2.197 | 5.512 | 77.63 | 97.98 | 2.199 | 5.323 | 74.77 | 92.40 | 2.167 | 5.252 | 73.97 | 93.56 |
| | 9.1 C | 20.0 | 2.202 | 5.587 | 78.68 | 98.23 | 2.217 | 5.496 | 77.19 | 93.14 | 2.180 | 5.461 | 76.91 | 94.11 |
| | 8.0 C | 17.5 | 2.205 | 5.657 | 79.67 | 98.34 | 2.232 | 5.655 | 79.43 | 93.78 | 2.190 | 5.633 | 79.34 | 94.52 |
| | 6.8 C | 15.0 | 2.208 | 5.736 | 80.79 | 98.48 | 2.250 | 5.823 | 81.78 | 94.54 | 2.202 | 5.806 | 81.78 | 95.04 |
| | 5.7 C | 12.5 | 2.202 | 5.794 | 81.61 | 98.21 | 2.258 | 5.962 | 83.74 | 94.88 | 2.205 | 5.948 | 83.77 | 95.20 |
| | 4.5 C | 10.0 | 2.207 | 5.905 | 83.17 | 98.42 | 2.276 | 6.149 | 86.36 | 95.61 | 2.220 | 6.132 | 86.37 | 95.83 |
| | 3.4 C | 7.5 | 2.208 | 6.040 | 85.07 | 98.47 | 2.293 | 6.352 | 89.21 | 96.33 | 2.235 | 6.324 | 89.07 | 96.46 |
| | 2.3 C | 5.0 | 2.221 | 6.290 | 88.59 | 99.05 | 2.310 | 6.597 | 92.66 | 97.07 | 2.247 | 6.538 | 92.09 | 97.00 |
| −10° C. | 11.4 C | 25.0 | 0.087 | 0.175 | 2.46 | 3.87 | 2.162 | 4.858 | 68.23 | 90.82 | 2.152 | 4.701 | 66.21 | 92.91 |
| | 10.2 C | 22.5 | 0.102 | 0.209 | 2.94 | 4.56 | 2.179 | 5.025 | 70.58 | 91.57 | 2.176 | 5.068 | 71.38 | 93.91 |
| | 9.1 C | 20.0 | 0.128 | 0.265 | 3.73 | 5.72 | 2.198 | 5.201 | 73.05 | 92.36 | 2.186 | 5.251 | 73.96 | 94.36 |
| | 8.0 C | 17.5 | 2.166 | 5.247 | 73.91 | 96.60 | 2.218 | 5.363 | 75.32 | 93.18 | 2.199 | 5.422 | 76.36 | 94.90 |
| | 6.8 C | 15.0 | 2.172 | 5.304 | 74.70 | 96.85 | 2.234 | 5.500 | 77.25 | 93.87 | 2.210 | 5.574 | 78.51 | 95.40 |
| | 5.7 C | 12.5 | 2.175 | 5.356 | 75.44 | 97.01 | 2.247 | 5.623 | 78.98 | 94.42 | 2.217 | 5.703 | 80.32 | 95.70 |
| | 4.5 C | 10.0 | 2.178 | 5.416 | 76.28 | 97.15 | 2.263 | 5.764 | 80.96 | 95.06 | 2.226 | 5.848 | 82.37 | 96.07 |
| | 3.4 C | 7.5 | 2.176 | 5.495 | 77.39 | 97.06 | 2.280 | 5.953 | 83.61 | 95.80 | 2.240 | 6.036 | 85.02 | 96.67 |
| | 2.3 C | 5.0 | 2.192 | 5.671 | 79.88 | 97.75 | 2.293 | 6.153 | 86.42 | 96.33 | 2.250 | 6.222 | 87.63 | 97.13 |

TABLE 8-continued

B. Summary of the discharge characteristics of LiFePO$_4$-based cells containing various electrolytes.
Temperature Range −20° C. to −50° C.; Cells were discharged to 0.50 V

| Temp | Rate | Amps | Ah | Wh | Wh/kg | % | Ah | Wh | Wh/kg | % | Ah | Wh | Wh/kg | % |
|---|---|---|---|---|---|---|---|---|---|---|---|---|---|---|
| 20° C. | C/5 | 0.40 | 2.242 | 7.284 | 102.59 | 100 | 2.380 | 7.712 | 108.31 | 100 | 2.317 | 7.505 | 105.70 | 100 |
| −20° C. | 11.4 C | 25.0 | 0.056 | 0.079 | 1.116 | 2.50 | 2.183 | 4.567 | 64.136 | 91.74 | 2.134 | 4.297 | 60.52 | 92.12 |
|  | 10.2 C | 22.5 | 0.063 | 0.092 | 1.297 | 2.79 | 2.189 | 4.707 | 66.108 | 91.97 | 2.141 | 4.683 | 65.96 | 92.40 |
|  | 9.1 C | 20.0 | 0.072 | 0.110 | 1.550 | 3.20 | 2.198 | 4.850 | 68.111 | 92.34 | 2.147 | 4.868 | 68.56 | 92.67 |
|  | 8.0 C | 17.5 | 0.084 | 0.134 | 1.880 | 3.73 | 2.207 | 4.981 | 69.961 | 92.74 | 2.153 | 5.023 | 70.74 | 92.93 |
|  | 6.8 C | 15.0 | 0.095 | 0.156 | 2.201 | 4.26 | 2.218 | 5.065 | 71.140 | 93.20 | 2.164 | 5.167 | 72.78 | 93.42 |
|  | 5.7 C | 12.5 | 2.137 | 4.783 | 67.360 | 95.30 | 2.236 | 5.198 | 73.006 | 93.93 | 2.173 | 5.289 | 74.50 | 93.79 |
| −30° C. | 11.4 C | 25.0 | 0.013 | 0.012 | 0.17 | 0.59 | 2.174 | 4.277 | 60.06 | 91.35 | 2.133 | 4.112 | 57.91 | 92.09 |
|  | 10.2 C | 22.5 | 0.013 | 0.012 | 0.18 | 0.60 | 2.178 | 4.364 | 61.30 | 91.52 | 2.142 | 4.424 | 62.30 | 92.44 |
|  | 9.1 C | 20.0 | 0.017 | 0.017 | 0.24 | 0.75 | 2.184 | 4.483 | 62.96 | 91.77 | 2.148 | 4.583 | 64.55 | 92.70 |
|  | 8.0 C | 17.5 | 0.021 | 0.023 | 0.33 | 0.93 | 2.190 | 4.585 | 64.39 | 92.01 | 2.152 | 4.717 | 66.43 | 92.88 |
|  | 6.8 C | 15.0 | 0.026 | 0.031 | 0.44 | 1.15 | 2.203 | 4.695 | 65.94 | 92.56 | 2.159 | 4.844 | 68.22 | 93.20 |
|  | 5.7 C | 12.5 | 0.033 | 0.043 | 0.61 | 1.45 | 2.186 | 4.684 | 65.78 | 91.84 | 2.131 | 4.822 | 67.91 | 92.00 |
|  | 4.5 C | 10.0 | 0.042 | 0.062 | 0.87 | 1.88 | 2.230 | 4.882 | 68.57 | 93.70 | 2.174 | 5.071 | 71.42 | 93.86 |
|  | 3.4 C | 7.5 | 0.057 | 0.092 | 1.30 | 2.56 | 2.253 | 4.969 | 69.79 | 94.66 | 2.189 | 5.181 | 72.98 | 94.49 |
|  | 2.3 C | 5.0 | 2.128 | 4.044 | 56.96 | 94.89 | 2.282 | 5.055 | 71.00 | 95.89 | 2.207 | 5.290 | 74.51 | 95.25 |
| 20° C. | C/5 | 0.40 | 2.242 | 7.284 | 102.59 | 100 | 2.380 | 7.712 | 108.31 | 100 | 2.317 | 7.505 | 105.70 | 100 |
| −40° C. | 11.4 C | 25.0 | 0.000 | 0.000 | 0.00 | 0.00 | 0.097 | 0.062 | 0.88 | 4.08 | 2.146 | 4.013 | 56.53 | 92.65 |
|  | 10.2 C | 22.5 | 0.000 | 0.000 | 0.00 | 0.00 | 2.184 | 4.075 | 57.23 | 91.76 | 2.154 | 4.197 | 59.11 | 92.96 |
|  | 9.1 C | 20.0 | 0.000 | 0.000 | 0.00 | 0.00 | 2.185 | 4.143 | 58.19 | 91.79 | 2.151 | 4.299 | 60.55 | 92.84 |
|  | 8.0 C | 17.5 | 0.000 | 0.000 | 0.00 | 0.00 | 2.184 | 4.207 | 59.09 | 91.77 | 2.149 | 4.399 | 61.96 | 92.78 |
|  | 6.8 C | 15.0 | 0.000 | 0.000 | 0.00 | 0.00 | 2.192 | 4.258 | 59.80 | 92.08 | 2.153 | 4.493 | 63.29 | 92.95 |
|  | 5.7 C | 12.5 | 0.002 | 0.001 | 0.02 | 0.07 | 2.191 | 4.298 | 60.37 | 92.07 | 2.137 | 4.539 | 63.93 | 92.22 |
|  | 5.0 C | 10.0 | 0.006 | 0.005 | 0.07 | 0.27 | 2.176 | 4.265 | 59.90 | 91.44 | 2.150 | 4.611 | 64.95 | 92.80 |
| −50° C. | 11.4 C | 25.0 | 0.000 | 0.000 | 0.00 | 0.00 | 0.000 | 0.000 | 0.00 | 0.01 | 0.001 | 0.001 | 0.01 | 0.04 |
|  | 10.2 C | 22.5 | 0.000 | 0.000 | 0.00 | 0.00 | 0.000 | 0.000 | 0.00 | 0.01 | 0.002 | 0.001 | 0.02 | 0.07 |
|  | 9.1 C | 20.0 | 0.000 | 0.000 | 0.00 | 0.01 | 0.001 | 0.000 | 0.01 | 0.03 | 0.003 | 0.002 | 0.03 | 0.13 |
|  | 8.0 C | 17.5 | 0.000 | 0.000 | 0.00 | 0.00 | 0.002 | 0.001 | 0.02 | 0.07 | 0.058 | 0.035 | 0.49 | 2.52 |
|  | 6.8 C | 15.0 | 0.000 | 0.000 | 0.00 | 0.00 | 0.003 | 0.002 | 0.03 | 0.14 | 0.090 | 0.063 | 0.89 | 3.88 |
|  | 5.7 C | 12.5 | 0.000 | 0.000 | 0.00 | 0.00 | 0.097 | 0.068 | 0.95 | 4.07 | 2.136 | 4.179 | 58.86 | 92.21 |
|  | 4.5 C | 10.0 | 0.000 | 0.000 | 0.00 | 0.00 | 2.184 | 3.832 | 53.82 | 91.77 | 2.160 | 4.243 | 59.76 | 93.22 |
|  | 3.4 C | 7.5 | 0.000 | 0.000 | 0.00 | 0.00 | 2.155 | 3.631 | 51.00 | 90.55 | 2.146 | 4.149 | 58.44 | 92.61 |
|  | 2.3 C | 5.0 | 0.000 | 0.000 | 0.00 | 0.00 | 2.135 | 3.412 | 47.92 | 89.70 | 2.160 | 4.123 | 58.07 | 93.25 |

C. Summary of the discharge characteristics of LiFePO$_4$-based cells containing various electrolytes.
Temperature Range −50° C. to −60° C.; Cells were discharged to 0.50 V

| Temp | Rate | Amps | Ah | Wh | Wh/kg | % | Ah | Wh | Wh/kg | % | Ah | Wh | Wh/kg | % |
|---|---|---|---|---|---|---|---|---|---|---|---|---|---|---|
|  |  |  | Cell ACC-01 Baseline Electrolyte | | | | Cell ACC-02 Baseline Electrolyte | | | | Cell AVC-01 1.2M LiPF6 in EC + EMC + MB (20:20:60 v/v %) + 2% VC | | | |
| 20° C. | C/5 | 0.40 | 2.184 | 7.079 | 99.70 | 100 | 2.129 | 6.882 | 96.93 | 100 | 2.367 | 7.666 | 107.67 | 100 |
| −50° C. | 2.0 C | 4.40 | 0.000 | 0.000 | 0.00 | 0.02 | 0.001 | 0.001 | 0.01 | 0.04 | 2.192 | 3.687 | 51.79 | 92.59 |
|  | 1.0 C | 2.20 | 0.007 | 0.007 | 0.10 | 0.32 | 0.007 | 0.006 | 0.09 | 0.31 | 2.099 | 3.338 | 46.88 | 88.67 |
|  | C/2 | 1.10 | 0.021 | 0.028 | 0.40 | 0.95 | 0.020 | 0.027 | 0.38 | 0.94 | 1.908 | 3.222 | 45.26 | 80.58 |
|  | C/5 | 0.440 | 0.053 | 0.091 | 1.28 | 2.42 | 0.053 | 0.091 | 1.28 | 2.48 | 1.944 | 3.661 | 51.41 | 82.12 |
|  | C/10 | 0.220 | 0.110 | 0.211 | 2.97 | 5.04 | 0.254 | 0.344 | 4.85 | 11.95 | 2.091 | 4.325 | 60.75 | 88.34 |
|  | C/20 | 0.110 | 0.198 | 0.406 | 5.71 | 9.06 | 0.889 | 1.202 | 16.93 | 41.75 | 2.227 | 4.961 | 69.67 | 94.06 |
| −60° C. | 2.0 C | 4.40 | 0.000 | 0.000 | 0.00 | 0.00 | 0.000 | 0.000 | 0.00 | 0.00 | 0.078 | 0.052 | 0.74 | 3.28 |
|  | 1.0 C | 2.20 | 0.000 | 0.000 | 0.00 | 0.00 | 0.000 | 0.000 | 0.00 | 0.00 | 1.768 | 2.198 | 30.87 | 74.67 |
|  | C/2 | 1.10 | 0.000 | 0.000 | 0.00 | 0.00 | 0.000 | 0.000 | 0.00 | 0.00 | 1.186 | 1.751 | 24.59 | 50.08 |
|  | C/5 | 0.440 | 0.000 | 0.000 | 0.00 | 0.00 | 0.000 | 0.000 | 0.00 | 0.00 | 1.298 | 2.089 | 29.34 | 54.81 |
|  | C/10 | 0.220 | 0.000 | 0.000 | 0.00 | 0.00 | 0.000 | 0.000 | 0.00 | 0.00 | 1.558 | 2.667 | 37.46 | 65.79 |
|  | C/20 | 0.110 | 0.000 | 0.000 | 0.00 | 0.00 | 0.000 | 0.000 | 0.00 | 0.00 | 1.646 | 3.046 | 42.78 | 69.53 |
|  |  |  | Cell ACC-02 1.2M LiPF6 in EC + EMC + MB (20:20:60 v/v %) + 2% VC | | | | Cell AFC-01 1.2M LiPF6 in EC + EMC + MB (20:20:60 v/v %) + 4% FEC | | | | Cell AFC-02 1.2M LiPF6 in EC + EMC + MB (20:20:60 v/v %) + 4% FEC | | | |
| 20° C. | C/5 | 0.40 | 2.361 | 7.645 | 107.37 | 100.00 | 2.323 | 7.511 | 105.79 | 100 | 2.3115 | 7.490 | 105.50 | 100 |
| −50° C. | 2.0 C | 4.40 | 2.261 | 4.356 | 61.18 | 95.76 | 2.155 | 3.992 | 56.22 | 92.77 | 2.062 | 3.373 | 47.51 | 89.19 |
|  | 1.0 C | 2.20 | 2.247 | 4.082 | 57.34 | 95.17 | 2.137 | 3.811 | 53.67 | 92.00 |  |  | 0.00 | 0.00 |
|  | C/2 | 1.10 | 2.143 | 3.811 | 53.52 | 90.80 | 2.084 | 3.839 | 54.07 | 89.73 | 1.874 | 3.375 | 47.54 | 81.07 |
|  | C/5 | 0.440 | 2.037 | 3.906 | 54.86 | 86.31 | 2.073 | 4.197 | 59.11 | 89.25 | 2.005 | 4.008 | 56.45 | 86.76 |
|  | C/10 | 0.220 | 2.115 | 4.406 | 61.89 | 89.58 | 2.140 | 4.712 | 66.36 | 92.15 | 2.121 | 4.632 | 65.24 | 91.77 |
|  | C/20 | 0.110 | 2.222 | 4.976 | 69.89 | 94.13 | 2.208 | 5.191 | 73.12 | 95.06 | 2.209 | 5.179 | 72.95 | 95.56 |
| −60° C. | 2.0 C | 4.40 | 2.222 | 3.501 | 49.17 | 94.11 | 0.638 | 1.005 | 14.15 | 27.47 | 1.881 | 2.353 | 33.14 | 81.36 |
|  | 1.0 C | 2.20 | 1.406 | 1.582 | 22.21 | 59.57 | 1.837 | 2.609 | 36.74 | 79.08 | 1.366 | 1.627 | 22.91 | 59.11 |
|  | C/2 | 1.10 | 0.906 | 1.283 | 18.02 | 38.39 | 1.643 | 2.422 | 34.12 | 70.72 | 0.916 | 1.429 | 20.13 | 39.63 |
|  | C/5 | 0.440 | 1.164 | 1.829 | 25.69 | 49.30 | 1.548 | 2.629 | 37.02 | 66.65 | 1.284 | 2.172 | 30.58 | 55.54 |
|  | C/10 | 0.220 | 1.472 | 2.530 | 35.53 | 62.37 | 1.847 | 3.379 | 47.59 | 79.52 | 1.696 | 3.054 | 43.02 | 73.39 |
|  | C/20 | 0.110 | 1.576 | 2.910 | 40.87 | 66.75 | 1.948 | 3.867 | 54.47 | 83.86 | 1.880 | 3.674 | 51.74 | 81.34 |

Although modestly higher capacity fade rates were observed with the MB-based electrolytes compared with the baseline, generally good cycle life characteristics (i.e., over 90% of the initial capacity after 2,000 cycles) and resilience to high temperature cycling were observed. Good resilience to low temperature charging was also observed with no apparent lithium plating.

Example 2

Methyl Propionate-Based Electrolyte Solutions Containing Additives

In the current study, we demonstrated improved performance of Li-ion cells with methyl propionate-based electrolytes, including:
1) 1.0 M $LiPF_6$ EC+EMC+MP (20:20:60 v/v %)
2) 1.0 M $LiPF_6$ EC+EMC+MP (20:20:60 v/v %)+2% FEC
3) 1.4 M $LiPF_6$ EC+EMC+MP (20:20:60 v/v %)+lithium oxalate
4) 1.0 M $LiPF_6$ EC+EMC+MP (20:20:60 v/v %)+2% VC
5) 1.0 M $LiPF_6$ EC+EMC+MP (20:20:60 v/v %)+0.10M LiBOB Lithium-ion cells, comprising MCMB carbon anodes and $LiNiCoAlO_2$ cathodes, were utilized to study the electrolytes (electrodes supplied by Quallion, LCC). These cells served to verify and demonstrate the reversibility, low temperature performance, and electrochemical aspects of each electrode as determined from a number of electrochemical characterization techniques.

Formation Characteristics

As illustrated in Table 9, good performance characteristics of the cells containing methyl propionate-based electrolytes with electrolyte additives were observed, as judged from the coulombic efficiency on the first cycle (being an indication of the inherent stability and the electrode film forming process) and the cumulative irreversible capacity losses. As displayed, all of the additives had a beneficial effect upon the performance, with the cell containing the mono-fluoroethylene carbonate as an additive observed to have the lowest irreversible capacity loss over the first five cycles and higher coulombic efficiency on the first cycle. These results suggest that very desirable solid electrolyte interphase (SEI) layers are being formed the electrode (especially on the carbon anode).

TABLE 9

Summary of the formation characteristics of MCMB-$LiNiCoAlO_2$ cells with various additive-containing electrolytes.

| Electrolyte Type | Charge Capacity (Ah) 1st Cycle | Discharge Capacity (Ah) 1st Cycle | Irreverisible Capacity (1st Cycle) | Coulombic Efficiency (1st Cycle) | Charge Capacity (Ah) 5th Cycle | Reversible Capacity (Ah) 5th Cycle | Cummulative Irreversible Capacity (1st-5th Cycle) | Coulombic Efficiency (5th Cycle) |
|---|---|---|---|---|---|---|---|---|
| 1.2M $LiPF_6$ EC + EMC + MP (20:20:60 v/v %) | 0.1649 | 0.1267 | 0.038 | 76.85 | 0.1300 | 0.1208 | 0.0764 | 92.90 |
| 1.2M $LiPF_6$ EC + EMC + MP (20:20:60 v/v %) + 4% FEC | 0.1619 | 0.1401 | 0.022 | 86.59 | 0.1310 | 0.1330 | 0.0165 | 101.50 |
| 1.2M $LiPF_6$ EC + EMC + MP (20:20:60 v/v %) + lithium oxalate | 0.1597 | 0.1257 | 0.034 | 78.71 | 0.1253 | 0.1205 | 0.0550 | 96.19 |
| 1.2M $LiPF_6$ EC + EMC + MP (20:20:60 v/v %) + 2% VC | 0.1636 | 0.1350 | 0.029 | 82.52 | 0.1330 | 0.1288 | 0.0472 | 96.91 |
| 1.2M $LiPF_6$ EC + EMC + MP (20:20:60 v/v %) + 0.10M LiBOB | 0.1623 | 0.1323 | 0.030 | 81.53 | 0.1334 | 0.1298 | 0.1958 | 97.29 |

Discharge Characteristics

After performing the formation cycling, the cells were subjected to systematic discharge rate characterization testing over a wide temperature range. These tests included charging the cells at ambient temperature and then soaking the cells for at least four hours prior to discharging at the desired temperatures. The results of these studies are summarized in Table 10.

TABLE 10

Summary of the discharge characteristics of MCMB-$LiNiCoAlO_2$ cells containing various electrolytes over a wide temperature range (−50 to +23° C.). Cells were charged at 20° C.

| | | Electrolyte Type | | | | | | | | |
|---|---|---|---|---|---|---|---|---|---|---|
| | | 1.2M LiPF6 EC + EMC + MP (20:20:60 v/v %) | | 1.2M LiPF6 EC + EMC + MP (20:20:60 v/v %) + 4% FEC | | 1.2M LiPF6 EC + EMC + MP (20:20:60 v/v %) + 2% lithium oxalate | | 1.2M LiPF6 EC + EMC + MP (20:20:60 v/v %) + 2% VC | | 1.2M LiPF6 EC + EMC + MP (20:20:60 v/v %) + 0.10M LiBOB | |
| Temperature | Current (mA) | Capacity (Ahr) | Percent (%) | Capacity (Ahr) | Percent (%) | Capacity (Ahr) | Percent (%) | Capacity (Ahr) | Percent (%) | Capacity (Ahr) | Percent (%) |
| 23° C. | 25 mA | 0.1208 | 100.00 | 0.1330 | 100.00 | 0.1205 | 100.00 | 0.1288 | 100.00 | 0.1298 | 100.75 |
| −20° C. | 25 mA | 0.0798 | 66.05 | 0.1029 | 77.37 | 0.0917 | 76.08 | 0.1052 | 81.67 | 0.0980 | 75.50 |
| | 50 mA | 0.0715 | 59.19 | 0.0968 | 72.75 | 0.0868 | 72.02 | 0.1003 | 77.85 | 0.0918 | 70.72 |
| | 100 mA | 0.0666 | 55.10 | 0.0914 | 68.74 | 0.0826 | 68.52 | 0.0977 | 75.85 | 0.0905 | 69.72 |

TABLE 10-continued

Summary of the discharge characteristics of MCMB-LiNiCoAlO$_2$ cells containing various electrolytes over a wide temperature range (−50 to +23° C.). Cells were charged at 20° C.

| | | Electrolyte Type | | | | | | | | |
|---|---|---|---|---|---|---|---|---|---|---|
| | | 1.2M LiPF6 EC + EMC + MP (20:20:60 v/v %) | | 1.2M LiPF6 EC + EMC + MP (20:20:60 v/v %) + 4% FEC | | 1.2M LiPF6 EC + EMC + MP (20:20:60 v/v %) + 2% lithium oxalate | | 1.2M LiPF6 EC + EMC + MP (20:20:60 v/v %) + 2% VC | | 1.2M LiPF6 EC + EMC + MP (20:20:60 v/v %) + 0.10M LiBOB | |
| Temperature | Current (mA) | Capacity (Ahr) | Percent (%) | Capacity (Ahr) | Percent (%) | Capacity (Ahr) | Percent (%) | Capacity (Ahr) | Percent (%) | Capacity (Ahr) | Percent (%) |
|---|---|---|---|---|---|---|---|---|---|---|---|
| | 150 mA | 0.0654 | 54.14 | 0.0891 | 66.95 | 0.0806 | 66.87 | 0.0964 | 74.82 | 0.0912 | 70.23 |
| −30° C. | 25 mA | 0.0617 | 51.09 | 0.0938 | 70.55 | 0.0809 | 67.17 | 0.0969 | 75.20 | 0.0859 | 66.20 |
| | 50 mA | 0.0544 | 44.99 | 0.0872 | 65.57 | 0.0745 | 61.83 | 0.0917 | 71.14 | 0.0801 | 61.70 |
| | 100 mA | 0.0466 | 38.53 | 0.0801 | 60.25 | 0.0691 | 57.32 | 0.0858 | 66.62 | 0.0742 | 57.14 |
| | 150 mA | 0.0413 | 34.20 | 0.0773 | 58.12 | 0.0660 | 54.77 | 0.0833 | 64.62 | 0.0717 | 55.21 |
| −40° C. | 25 mA | 0.0477 | 39.46 | 0.0818 | 61.51 | 0.0692 | 57.42 | 0.0862 | 66.88 | 0.0748 | 57.58 |
| | 50 mA | 0.0356 | 29.46 | 0.0729 | 54.82 | 0.0610 | 50.59 | 0.0793 | 61.52 | 0.0669 | 51.56 |
| | 100 mA | 0.0181 | 14.97 | 0.0608 | 45.73 | 0.0468 | 38.84 | 0.0691 | 53.63 | 0.0553 | 42.62 |
| | 150 mA | 0.0109 | 9.06 | 0.0433 | 32.56 | 0.0290 | 24.03 | 0.0594 | 46.08 | 0.0379 | 29.17 |
| −50° C. | 25 mA | 0.0211 | 17.49 | 0.0587 | 44.14 | 0.0404 | 33.53 | 0.0645 | 50.02 | 0.0473 | 36.42 |
| | 50 mA | 0.0107 | 8.89 | 0.0299 | 22.47 | 0.0207 | 17.14 | 0.0410 | 31.84 | 0.0248 | 19.08 |
| | 100 mA | 0.0054 | 4.51 | 0.0152 | 11.46 | 0.0109 | 9.07 | 0.0190 | 14.75 | 0.0124 | 9.55 |

Figure 26:
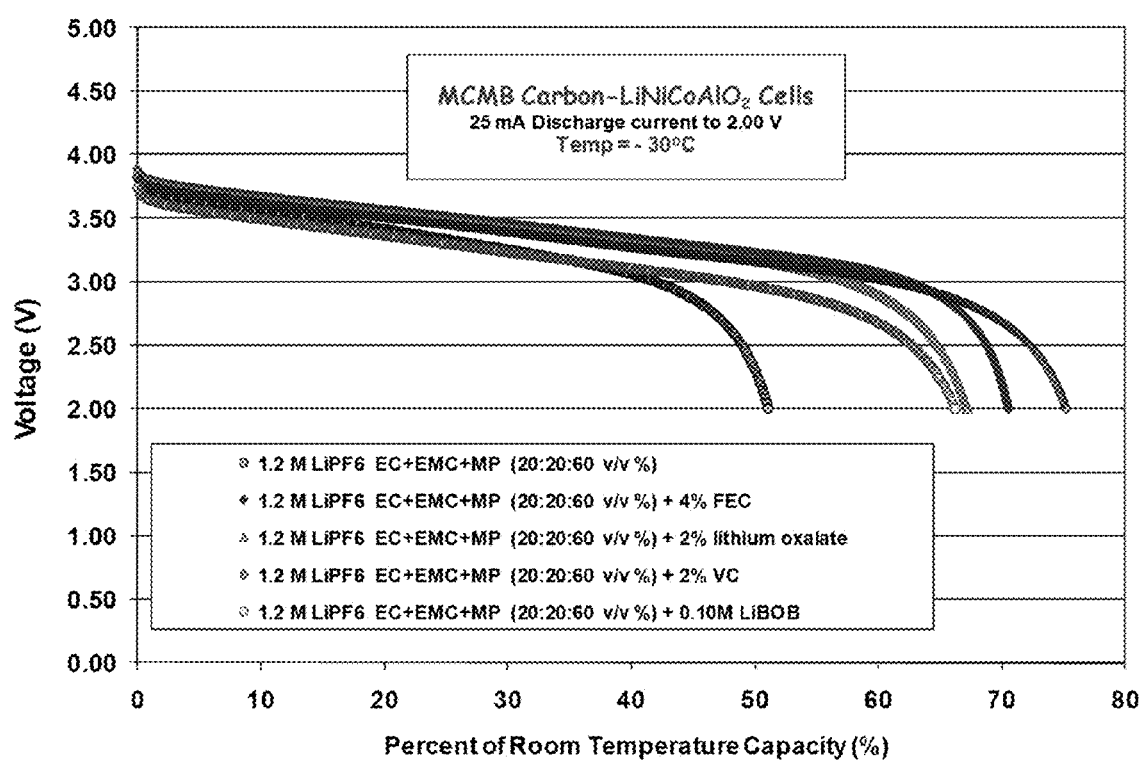
FIG. 26 shows the discharge capacity (Ah) of MCMB-LiNiCoAlO$_2$ lithium-ion cells containing various methyl propionate-based electrolytes at −30° C. using a C/5 discharge rate.

Since the rationale of adding the electrolyte additives was to improve the high temperature resilience, it is significant that the discharge rate capability was significantly improved for many of the formulations investigated. For example, as displayed in FIG. 26, when the cells were discharged at ~C/5 discharge rate at −30° C. all of the cells containing the electrolyte additives were observed to outperform the baseline methyl propionate blend, with the formulations containing VC and FEC yielding the best performance.

Figure 27:
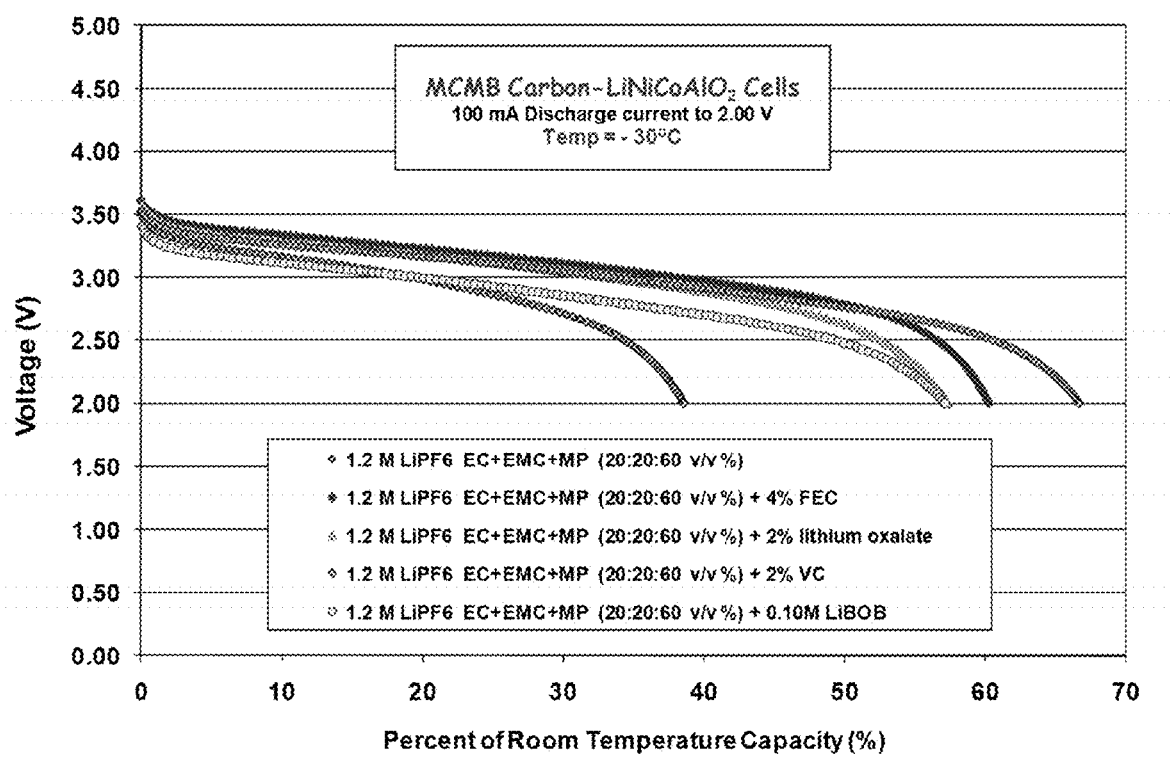
FIG. 27 shows the discharge capacity (Ah) of MCMB-LiNiCoAlO$_2$ lithium-ion cells containing various methyl propionate-based electrolytes at −30° C.

This trend was also observed when the cells were evaluated at higher rates at low temperature. As shown in FIG. 27, when the cells were evaluated using a 100 mA discharge current (corresponding to a ~0.8 C rate) at −30° C., a similar trend was observed compared with that at the lower rate. Again, the cells containing the VC and FEC additives outperformed the baseline solution most dramatically. These results suggest that the lithium intercalation/de-intercalation kinetics are more favorable with the cells containing the electrolyte additives, presumably due to preferable SEI formation characteristics. In order to decipher the influence of the electrolyte additives upon the kinetics of the respective electrodes, detailed electrochemical characterization of the cells was performed, as described below.

Figure 28:
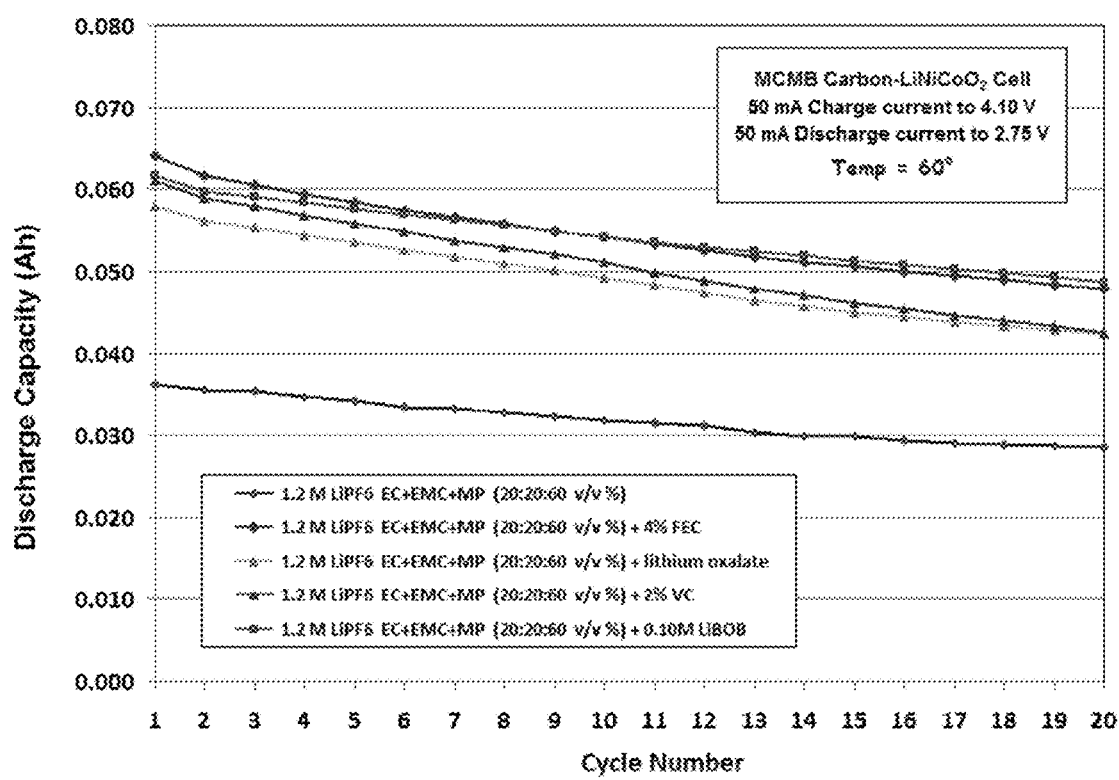
FIG. 28 shows the cycling characteristics of experimental MCMB-LiNiCoAlO$_2$ lithium-ion cells containing various methyl propionate-based electrolytes at high temperatures (60° C.).

After performing the rate characterization testing, a cycling test was performed on the cells at high temperature to determine their high temperature resilience. This included performing 20 cycles at 60° C., followed by electrochemical characterization. As illustrated in FIG. 28, the cells containing the LiBOB and FEC additives displayed the best initial capacity and capacity retention after being subjected to cycling at 60° C. One of the major objectives of performing the electrochemical characterization upon completing the cycling at high temperature was to determine the manner in which the various additives influenced the degradation rates at both the anodes and the cathodes.

Electrochemical Characteristics

It is believed that the improved rate capability at low temperatures of Li-ion cells that utilized these ester-based solutions is primarily due to improved mass transfer characteristics in the electrolyte (higher ionic conductivity) and facile kinetics of lithium intercalation/de-intercalation at the interface due to favorable film formation behavior at the electrode surfaces. To enhance this understanding, as well as the impact that the electrolyte additives have upon these factors, we have assessed the electrochemical characteristics of the systems using a number of techniques, including Tafel polarization measurements, Electrochemical Impedance Spectroscopy (EIS), and linear micro-polarization measurements.

Figure 29:
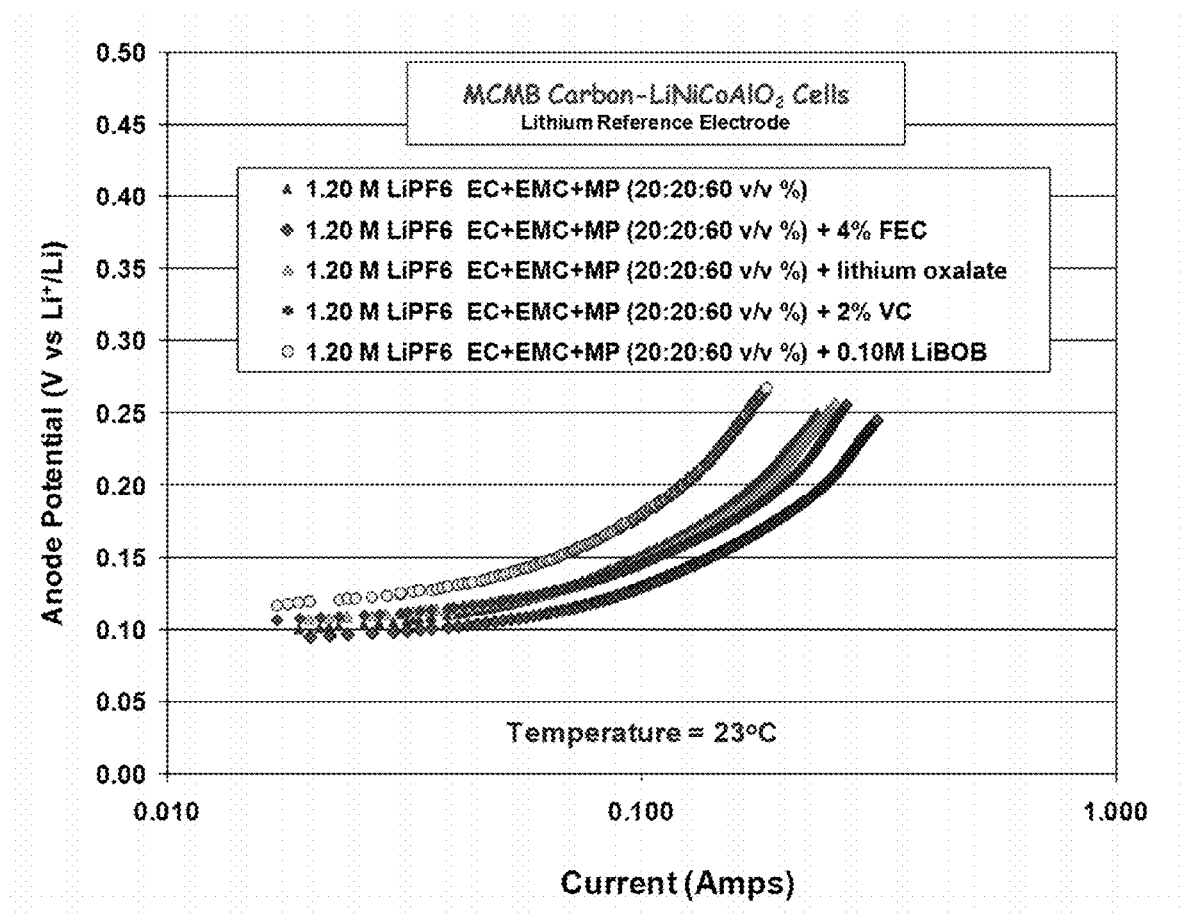
FIG. 29 shows Tafel polarization measurement of MCMB electrodes from MCMB-LiNiCoAlO$_2$ cells containing various methyl propionate-based electrolytes.

To determine the lithiation/de-lithiation kinetics of the anodes and the cathodes of the various systems, Tafel polarization measurements of the MCMB-Li$_x$Ni$_y$Co$_{1-y}$AlO$_2$ cells were performed. The measurements were conducted on the cells while they were in a full state of charge (SOC) (OCV=>4.07V) before and after each storage period. In all of these Tafel plots, there are distinct charge-transfer controlled regimes, where the overpotential increases linearly with log (I). The effect of mass transfer seems to be relatively insignificant which allows one to obtain kinetic parameters, such as the exchange current and the transfer coefficients. As illustrated in FIG. 29, improved lithium de-intercalation kinetics (i.e. higher limiting currents) were observed for the anodes in contact with the electrolytes possessing the FEC, and to a lesser extent the VC, electrolyte additives compared to the baseline formulation, suggesting that a desirable surface film has formed in these cases.

Figure 30:
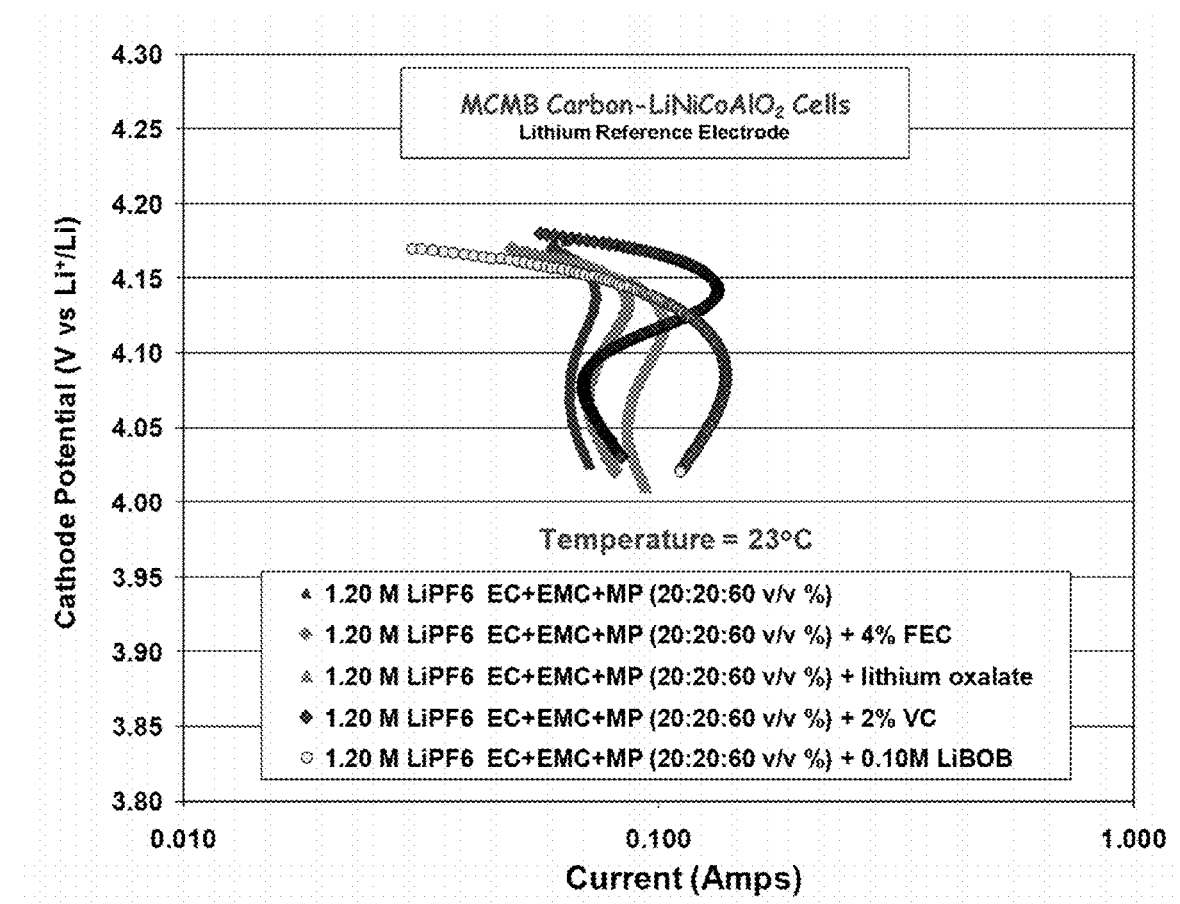
FIG. 30 shows Tafel polarization measurement of LiNiCoO$_2$ electrodes from MCMB-LiNiCoO$_2$ cells containing various methyl propionate-based electrolytes.

As illustrated in FIG. 30, in which the Tafel polarization measurements have been performed on the LiNiCoAlO$_2$ cathodes at room temperature, all of the cells containing electrolyte additives appeared to display enhanced lithium kinetics (i.e., higher limiting current densities) compared to the baseline formulation. It was observed that the addition of LiBOB had the most beneficial effect upon the nature of the SEI layer on the cathode and the corresponding lithium kinetics.

Figure 31:
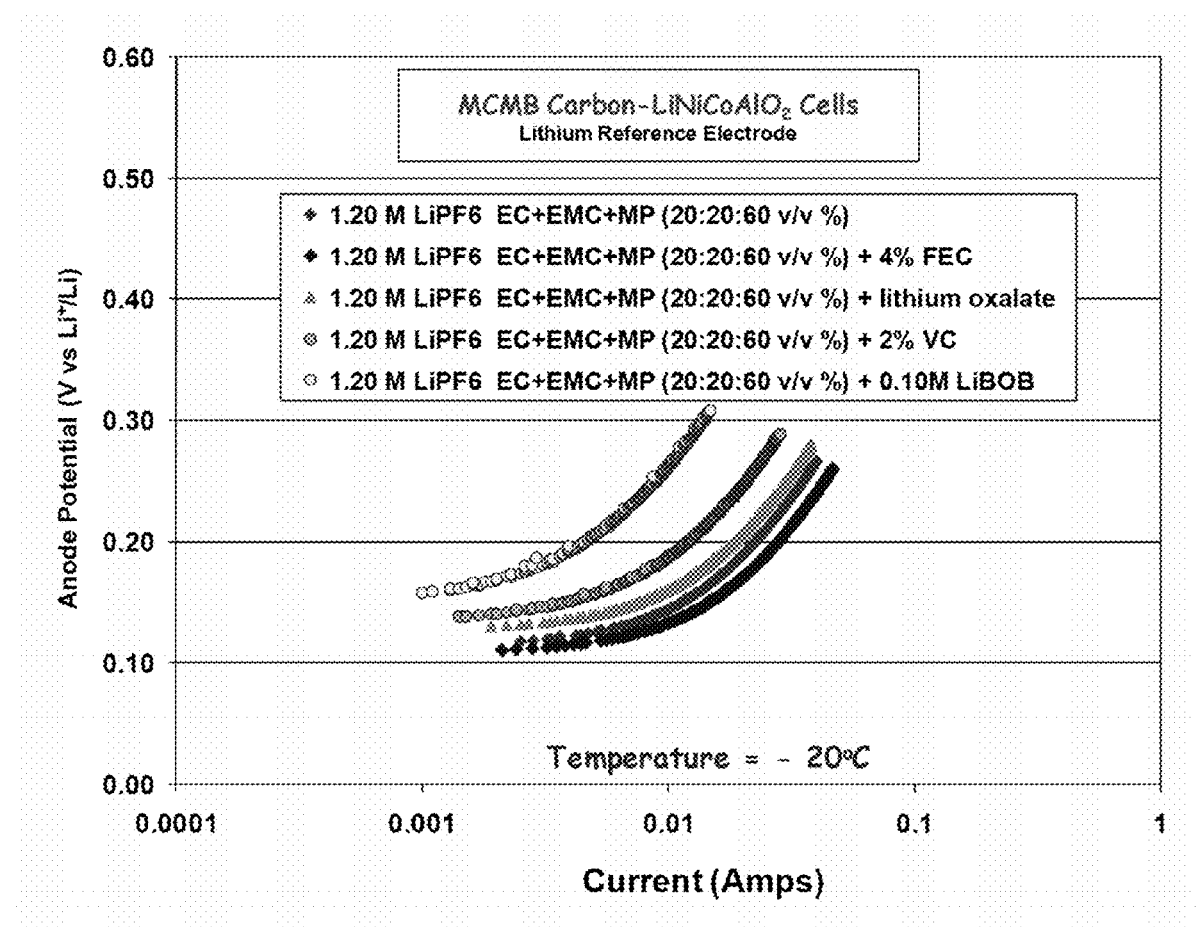
FIG. 31 shows Tafel polarization measurement of MCMB electrodes from MCMB-LiNiCoAlO$_2$ cells containing various methyl propionate-based electrolytes at −20° C.
Figure 32:
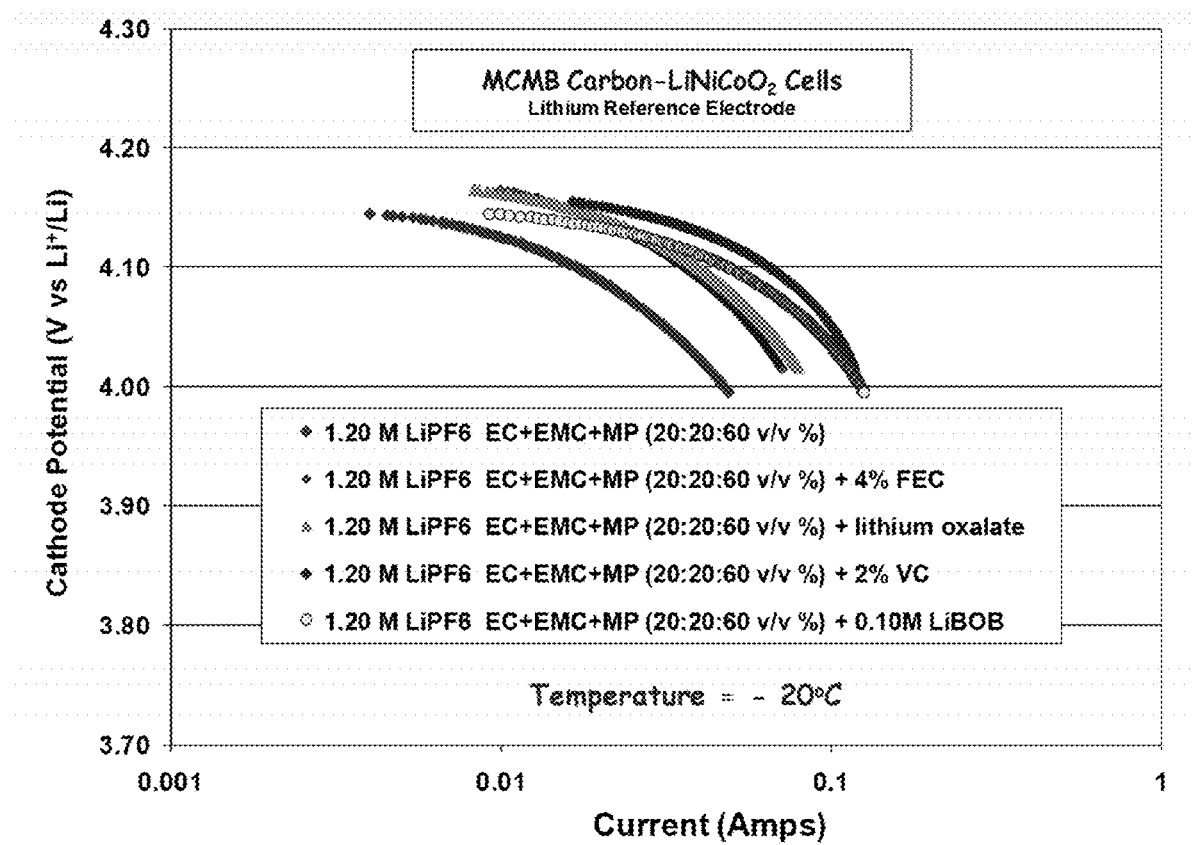
FIG. 32 shows Tafel polarization measurement of LiNiCoO$_2$ electrodes from MCMB-LiNiCoAlO$_2$ cells containing various methyl propionate-based electrolytes.

Generally, the trends with regard to the observed lithium kinetics and how they depend upon electrolyte type tend to track well with temperature. For example, when Tafel measurements were performed on the MCMB anodes at low temperature, as displayed in FIG. 31, the cells containing the FEC were again observed to deliver improved performance over the baseline formulation. In addition, when the LiNiCoAlO$_2$ cathodes were measured at −20° C., as shown in FIG. 32, a similar trend was observed compared to that displayed at 20° C., with the cell containing the LiBOB delivering the best performance. However, the level of performance enhancement was not quite as dramatic as observed at ambient temperatures, suggesting that the rate at which the kinetics change as a function of temperature is not uniform across the samples investigated.

Lithium-Li($Li_{0.17}Ni_{0.25}Mn_{0.58}$)$O_2$ Systems

Figure 33:
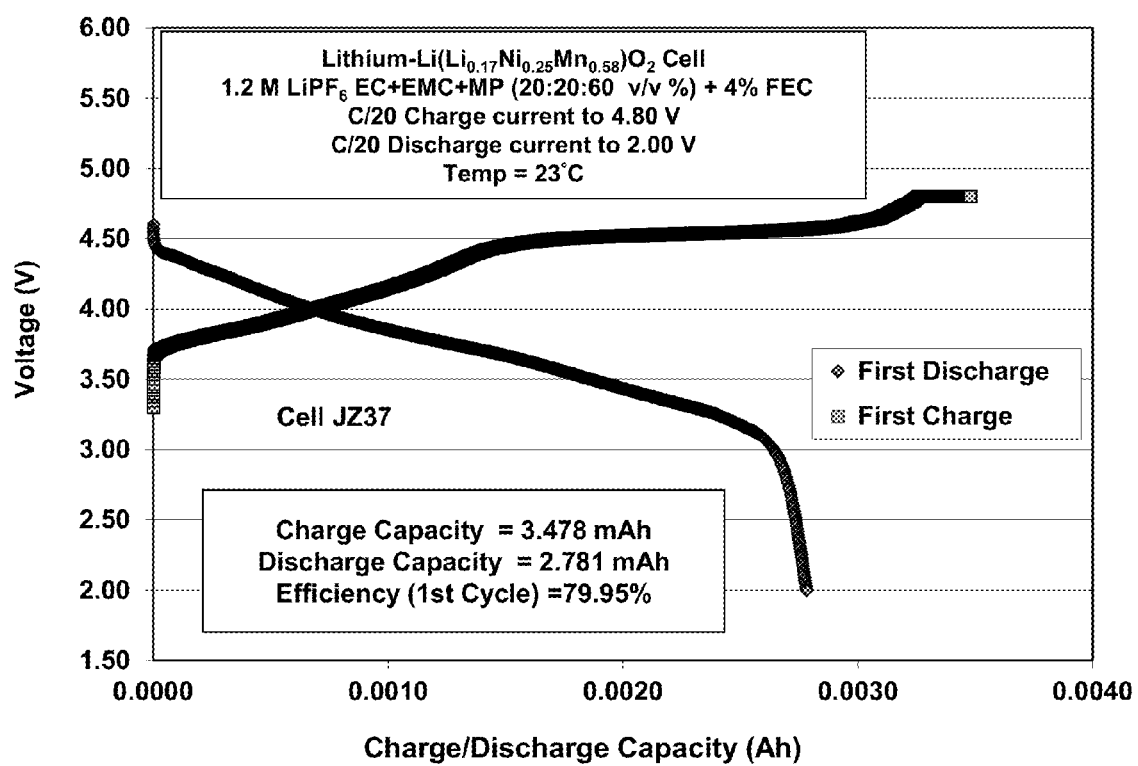
FIG. 33 shows the discharge and charge capacity of a Li—Li(Li$_{0.17}$Ni$_{0.25}$Mn$_{0.58}$)O$_2$ cell containing a methyl propionate-based electrolyte with a mono-fluoroethylene carbonate (FEC) additive.
Figure 34:
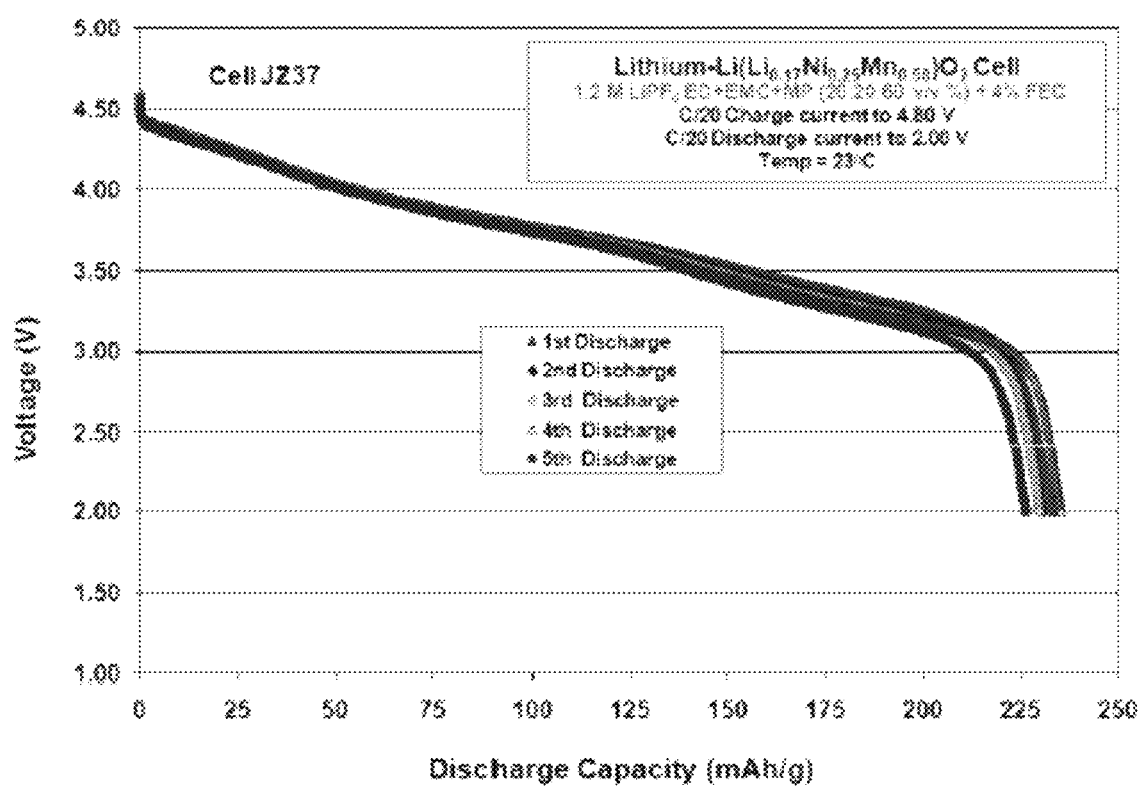
FIG. 34 shows the discharge capacity of Li(Li$_{0.17}$Ni$_{0.25}$Mn$_{0.58}$)O$_2$ electrodes from Li—Li(Li$_{0.17}$Ni$_{0.25}$Mn$_{0.58}$)O$_2$ cells containing a methyl propionate-based electrolyte with a mono-fluoroethylene carbonate (FEC) additive.

Methyl propionate-based electrolytes were further tested in lithium-Li($Li_{0.17}Ni_{0.25}Mn_{0.58}$)$O_2$ systems. As shown in FIGS. 33 and 34, an electrolyte containing 1.2 M $LiPF_6$ EC+EMC+MP (20:20:60 v/v %)+4% FEC was approximately 75% efficient during its first room temperature cycle, and suffered only minimal losses after multiple discharge cycles.

Example 3

Methyl Propionate-Based and Ethyl Butyrate-Based Electrolyte Solutions Without Additives In the current study, the electrolyte was selected to have a salt concentration of 1.20M and an ester content of 60% by volume. More specifically, the electrolytes 1.20M $LiPF_6$ in EC+EMC+MP (20:20:60 v/v %) and 1.20M $LiPF_6$ in EC+EMC+EB (20:20:60 v/v %) were demonstrated to operate effectively over a wide temperature range in MCMB-LiNiCoAlO$_2$ and $Li_4Ti_5O_{12}$—LiNiCoAlO$_2$ prototype cells. These electrolytes were compared with low temperature electrolytes developed in-house by Quallion, LCC, referred to as "A1", "A2", "A3", and a baseline all-carbonate based electrolyte adopted by DOE for their automotive battery development programs. Thus, the following electrolytes were evaluated in biomedical/aerospace-quality 0.25Ah lithium-ion cells, manufactured by Quallion, LLC, consisting of carbon (or $Li_4Ti_5O_{12}$) anodes and LiNiCoAlO$_2$(NCA) cathodes:

1) 1.2 M $LiPF_6$ in EC+EMC (30:70 v/v %) (DoE, Baseline)
2) 1.2 M $LiPF_6$ EC+EMC+MP (20:20:60 v/v %)
3) 1.2 M $LiPF_6$ EC+EMC+MP (20:20:60 v/v %)
4) Quallion Low Temperature "A1"
5) Quallion Low Temperature "A2"
6) Quallion Low Temperature "A3"

A number of cells of each electrolyte type and cell chemistry (either MCMB-LiNiCoAlO$_2$ or $Li_4Ti_5O_{12}$—LiNiCoAlO$_2$) were manufactured and four cells of each permutation were used for performance assessment (36 cells total). These cells served to verify and demonstrate the reversibility, cycle life performance, low temperature performance, rate capability, and impedance characteristics.

A comprehensive test plan was established to determine the viability of the electrolytes to meet a number of performance metrics. The test plan consisted of implementing a number of performance tests, including the following: 1) initial characterization of all cells at 20, 0, and −20° C., 2) discharge characterization testing as a function of temperature and rate, and 3) variable temperature cycling over a wide temperature range.

Initial Characterization Testing

Figure 35:
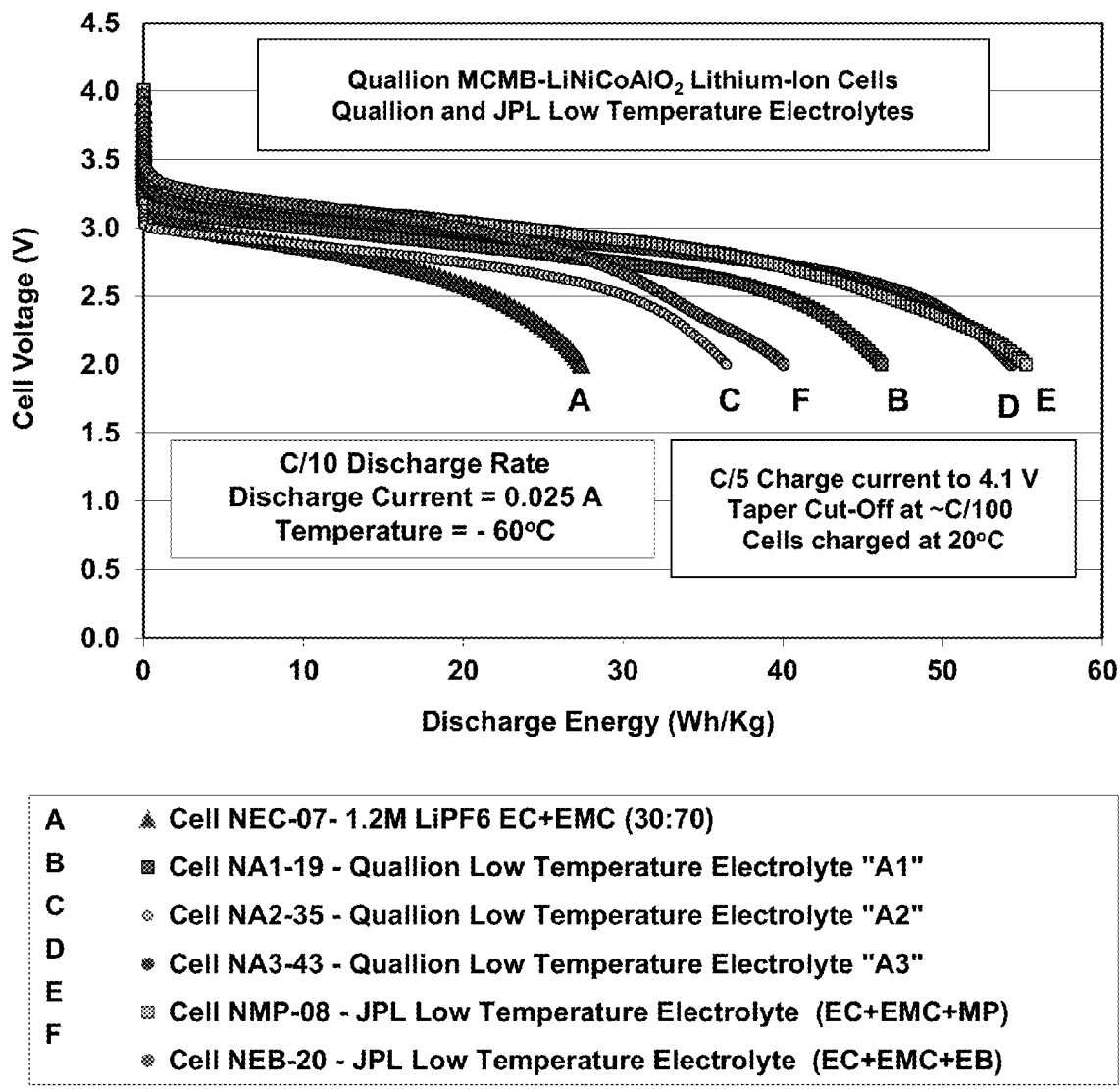
FIG. 35 shows the discharge capacity (Ah) of Quallion MCMB-LiNiCoAlO$_2$ Li-ion cells, containing various low temperature electrolytes, when discharged at −60° C. using a C/10 rate (cells charged at room temperature).

All cells were subjected to capacity and impedance characterization testing to determine the overall health of the cell. Regardless of electrolyte type, all cells generally displayed comparable capacity and excellent reproducibility from cell to cell. As shown in FIG. 35, all of the MCMB-LiNiCoAlO$_2$ cells were observed to deliver between 0.294 Ah to 0.312 Ah, and ranged between 99 to 111 Wh/kg, when evaluated at 20° C. In addition, Table 11 shows that all of the cells displayed comparable impedance, with the cells containing the 1.2M $LiPF_6$ in EC+EMC+MP (20:20:60 v/v %) electrolyte yielding the lowest average impedance (ave=95.8 mOhm) at 100% SOC, whereas the cells containing the Quallion "A3" low temperature electrolyte delivered the highest impedance (ave=115.1 mOhm).

When the cells were characterized at −20° C., all cells containing the advanced wide operating temperature range electrolyte generally performed very comparably with the baseline formulation, as illustrated in Table 12.

TABLE 11

Results of capacity and impedance characterization at 20° C.

| Cell Number | Cell ID | Cell Weight (Grams) | Cell Weight (kg) | Initial Voltage | Initial Capacity (Ah) | Initial Watt-Hours | Discharge Energy (Wh/kg) | Calculated Impedance (mOhms) (100% SOC) | Calculated Impedance (mOhms) (80% SOC) | Calculated Impedance (mOhms) (60% SOC) | Calculated Impedance (mOhms) (40% SOC) | Electrolyte Type |
|---|---|---|---|---|---|---|---|---|---|---|---|---|
| K08B604-02 | NEC-02 | 10.07 | 0.0101 | 3.852 | 0.303 | 1.102 | 109.42 | 106.81 | 108.64 | 106.20 | 106.20 | EC + EMC |
| K08B604-07 | NEC-07 | 10.15 | 0.0102 | 3.763 | 0.312 | 1.139 | 112.20 | 92.77 | 95.83 | 97.66 | 96.44 | EC + EMC |
| K08B604-09 | NEC-09 | 10.18 | 0.0102 | 3.756 | 0.307 | 1.122 | 110.24 | 103.76 | 107.42 | 107.42 | 106.20 | EC + EMC |
| K08B604-11 | NEC-11 | 10.17 | 0.0102 | 3.761 | 0.310 | 1.133 | 111.42 | 99.49 | 103.15 | 106.20 | 102.54 | EC + EMC |
| K08B604-18 | NA1-18 | 10.21 | 0.0102 | 3.767 | 0.310 | 1.129 | 110.64 | 123.29 | 128.18 | 128.79 | 133.06 | Quallion A1 |
| K08B604-19 | NA1-19 | 10.18 | 0.0102 | 3.768 | 0.304 | 1.108 | 108.78 | 103.15 | 110.48 | 109.86 | 112.92 | Quallion A1 |
| K08B604-20 | NA1-20 | 10.18 | 0.0102 | 3.767 | 0.305 | 1.111 | 109.10 | 107.42 | 111.09 | 113.53 | 116.58 | Quallion A1 |
| K08B604-21 | NA1-21 | 10.16 | 0.0102 | 3.767 | 0.302 | 1.103 | 108.58 | 109.86 | 114.75 | 115.97 | 119.63 | Quallion A1 |
| K08B604-33 | NA2-33 | 10.04 | 0.0100 | 3.767 | 0.300 | 1.093 | 108.96 | 108.64 | 114.14 | 114.14 | 117.19 | Quallion A2 |
| K08B604-35 | NA2-35 | 10.05 | 0.0100 | 3.763 | 0.309 | 1.128 | 112.21 | 101.32 | 106.20 | 103.76 | 108.03 | Quallion A2 |
| K08B604-42 | NA3-42 | 9.92 | 0.0099 | 3.762 | 0.315 | 1.141 | 115.09 | 138.55 | 133.06 | 133.67 | 139.16 | Quallion A3 |
| K08B604-43 | NA3-43 | 10.01 | 0.0100 | 3.760 | 0.310 | 1.128 | 112.72 | 101.93 | 108.03 | 106.20 | 109.86 | Quallion A3 |
| K08B604-44 | NA3-44 | 9.98 | 0.0100 | 3.762 | 0.305 | 1.113 | 111.54 | 102.54 | 106.81 | 106.81 | 111.70 | Quallion A3 |
| K08B604-45 | NA3-46 | 9.98 | 0.0100 | 3.755 | 0.294 | 1.071 | 107.31 | 108.64 | 112.31 | 114.14 | 115.36 | Quallion A3 |
| K08C466-07 | NMP-07 | 10.04 | 0.0100 | 3.751 | 0.293 | 1.071 | 106.73 | 98.27 | 101.32 | 98.88 | 103.15 | JPL (EC + EMC + MP) |
| K08C466-08 | NMP-08 | 10.11 | 0.0101 | 3.754 | 0.307 | 1.120 | 110.76 | 94.61 | 98.88 | 100.71 | 98.88 | JPL (EC + EMC + MP) |
| K08C466-09 | NMP-09 | 10.04 | 0.0100 | 3.752 | 0.297 | 1.086 | 108.11 | 95.22 | 98.27 | 97.66 | 102.54 | JPL (EC + EMC + MP) |
| K08C466-10 | NMP-10 | 10.14 | 0.0101 | 3.746 | 0.307 | 1.123 | 110.67 | 95.22 | 101.93 | 98.27 | 101.32 | JPL (EC + EMC + MP) |

TABLE 11-continued

Results of capacity and impedance characterization at 20° C.

| Cell Number | Cell ID | Cell Weight (Grams) | Cell Weight (kg) | Initial Voltage | Initial Capacity (Ah) | Initial Watt-Hours | Discharge Energy (Wh/kg) | Calculated Impedance (mOhms) (100% SOC) | Calculated Impedance (mOhms) (80% SOC) | Calculated Impedance (mOhms) (60% SOC) | Calculated Impedance (mOhms) (40% SOC) | Electrolyte Type |
|---|---|---|---|---|---|---|---|---|---|---|---|---|
| K08C466-19 | NEB-19 | 10.03 | 0.0100 | 3.758 | 0.286 | 1.047 | 104.33 | 105.59 | 108.03 | 104.98 | 109.25 | JPL (EC + EMC + EB) |
| K08C466-20 | NEB-20 | 10.54 | 0.0105 | 3.758 | 0.287 | 1.048 | 99.41 | 103.76 | 105.59 | 104.98 | 105.59 | JPL (EC + EMC + EB) |
| K08C466-22 | NEB-22 | 10.15 | 0.0101 | 3.756 | 0.304 | 1.110 | 109.38 | 101.93 | 106.20 | 106.20 | 106.20 | JPL (EC + EMC + EB) |
| | Average | 10.11 | 0.0101 | 3.764 | 0.303 | 1.106 | 109.41 | 104.89 | 108.59 | 108.38 | 110.56 | |

TABLE 12

Results of capacity and impedance characterization at −20° C.

| Cell Number | Cell ID | Cell Weight (Grams) | Cell Weight (kg) | Initial Capacity at 20° C. (Ah) | Capacity at −20° C. (Ah) (Charge at RT) | Capacity at −20° C. (Ah) (Charge at −20° C.) | Watt-Hours at −20° C. | Wh/Kg at −20° C. | Percent of RT Capacity (%) (Charge at RT) |
|---|---|---|---|---|---|---|---|---|---|
| K08B604-02 | NEC-02 | 10.1 | 0.0101 | 0.3026 | 0.2503 | 0.2421 | 0.871 | 86.47 | 82.72 |
| K08B604-07 | NEC-07 | 10.2 | 0.0102 | 0.3121 | 0.2536 | 0.2385 | 0.855 | 84.19 | 81.25 |
| K08B604-09 | NEC-09 | 10.2 | 0.0102 | 0.3070 | 0.2501 | 0.2382 | 0.855 | 83.97 | 81.47 |
| K08B604-11 | NEC-11 | 10.2 | 0.0102 | 0.3102 | 0.2524 | 0.2411 | 0.866 | 85.12 | 81.36 |
| K08B604-18 | NA1-18 | 10.2 | 0.0102 | 0.3099 | 0.2585 | 0.2433 | 0.849 | 83.14 | 83.42 |
| K08B604-19 | NA1-19 | 10.2 | 0.0102 | 0.3040 | 0.2553 | 0.2312 | 0.805 | 79.06 | 83.99 |
| K08B604-20 | NA1-20 | 10.2 | 0.0102 | 0.3047 | 0.2587 | 0.2367 | 0.827 | 81.22 | 84.90 |
| K08B604-21 | NA1-21 | 10.2 | 0.0102 | 0.3025 | 0.2559 | 0.2323 | 0.811 | 79.82 | 84.62 |
| K08B604-33 | NA2-33 | 10.0 | 0.0100 | 0.3000 | 0.2577 | 0.2392 | 0.838 | 83.50 | 85.88 |
| K08B604-35 | NA2-35 | 10.0 | 0.0100 | 0.3093 | 0.2566 | 0.2379 | 0.833 | 82.85 | 82.98 |
| K08B604-42 | NA3-42 | 9.9 | 0.0099 | 0.3150 | 0.2653 | 0.2416 | 0.864 | 87.10 | 84.20 |
| K08B604-43 | NA3-43 | 10.0 | 0.0100 | 0.3097 | 0.2592 | 0.2348 | 0.819 | 81.83 | 83.70 |
| K08B604-44 | NA3-44 | 10.0 | 0.0100 | 0.3053 | 0.2564 | 0.2336 | 0.815 | 81.62 | 83.96 |
| K08B604-45 | NA3-46 | 10.0 | 0.0100 | 0.2941 | 0.2498 | 0.2272 | 0.793 | 79.46 | 84.96 |
| K08C466-07 | NMP-07 | 10.0 | 0.0100 | 0.2931 | 0.2476 | 0.2388 | 0.856 | 85.25 | 84.48 |
| K08C466-08 | NMP-08 | 10.1 | 0.0101 | 0.3068 | 0.2560 | 0.2431 | 0.870 | 86.04 | 83.47 |
| K08C466-09 | NMP-09 | 10.0 | 0.0100 | 0.2972 | 0.2493 | 0.2393 | 0.858 | 85.44 | 83.87 |
| K08C466-10 | NMP-10 | 10.1 | 0.0101 | 0.3072 | 0.2580 | 0.2469 | 0.886 | 87.38 | 83.99 |
| K08C466-19 | NEB-19 | 10.0 | 0.0100 | 0.2863 | 0.2374 | 0.2274 | 0.817 | 81.43 | 82.93 |
| K08C466-20 | NEB-20 | 10.5 | 0.0105 | 0.2868 | 0.2364 | 0.2253 | 0.809 | 76.77 | 82.42 |
| K08C466-22 | NEB-22 | 10.1 | 0.0101 | 0.3037 | 0.2495 | 0.2378 | 0.853 | 84.03 | 82.15 |
| | Average | 10.11 | 0.0101 | 0.3032 | 0.2530 | 0.2370 | 0.840 | 83.13 | 83.46 |

| Cell Number | Cell ID | Percent of RT Capacity (%) (Charge at −20° C.) | Calculated Impedance (mOhms) (100% SOC) | Calculated Impedance (mOhms) (80% SOC) | Calculated Impedance (mOhms) (60% SOC) | Calculated Impedance (mOhms) (40% SOC) | Electrolyte Type |
|---|---|---|---|---|---|---|---|
| K08B604-02 | NEC-02 | 80.03 | 709.85 | 659.80 | 646.37 | 669.57 | EC + EMC |
| K08B604-07 | NEC-07 | 76.41 | 711.07 | 732.43 | 737.32 | 761.73 | EC + EMC |
| K08B604-09 | NEC-09 | 77.58 | 751.35 | 760.51 | 761.12 | 786.14 | EC + EMC |
| K08B604-11 | NEC-11 | 77.71 | 730.60 | 740.98 | 744.03 | 766.61 | EC + EMC |
| K08B604-18 | NA1-18 | 78.53 | 719.01 | 1075.46 | 1093.16 | 1119.40 | Quallion A1 |
| K08B604-19 | NA1-19 | 76.06 | 667.73 | 1185.93 | 1214.01 | 1249.41 | Quallion A1 |
| K08B604-20 | NA1-20 | 77.68 | 656.75 | 1097.43 | 1119.40 | 1138.32 | Quallion A1 |
| K08B604-21 | NA1-21 | 76.80 | 644.54 | 1127.34 | 1152.36 | 1183.49 | Quallion A1 |
| K08B604-33 | NA2-33 | 79.72 | 694.59 | 931.41 | 946.67 | 975.97 | Quallion A2 |
| K08B604-35 | NA2-35 | 76.94 | 361.33 | 959.49 | 1052.87 | 1275.04 | Quallion A2 |
| K08B604-42 | NA3-42 | 76.69 | 611.58 | 1224.99 | 1252.46 | 1351.34 | Quallion A3 |
| K08B604-43 | NA3-43 | 75.81 | 628.67 | 1140.76 | 1167.62 | 1203.63 | Quallion A3 |
| K08B604-44 | NA3-44 | 76.51 | 633.55 | 1152.36 | 1178.61 | 1212.18 | Quallion A3 |
| K08B604-45 | NA3-46 | 77.26 | 590.22 | 1074.24 | 1100.48 | 1134.66 | Quallion A3 |
| K08C466-07 | NMP-07 | 81.47 | 712.90 | 700.08 | 698.25 | 734.26 | JPL (EC + EMC + MP) |
| K08C466-08 | NMP-08 | 79.24 | 739.15 | 746.47 | 752.57 | 795.91 | JPL (EC + EMC + MP) |
| K08C466-09 | NMP-09 | 80.52 | 733.04 | 726.94 | 733.04 | 774.55 | JPL (EC + EMC + MP) |
| K08C466-10 | NMP-10 | 80.39 | 713.51 | 715.96 | 720.84 | 756.85 | JPL (EC + EMC + MP) |
| K08C466-19 | NEB-19 | 79.43 | 688.49 | 678.11 | 665.90 | 686.05 | JPL (EC + EMC + EB) |
| K08C466-20 | NEB-20 | 78.56 | 698.25 | 696.42 | 701.92 | 732.43 | JPL (EC + EMC + EB) |
| K08C466-22 | NEB-22 | 78.29 | 728.16 | 737.32 | 736.71 | 766.00 | JPL (EC + EMC + EB) |
| | Average | 78.17 | 672.59 | 898.31 | 913.13 | 955.88 | |

Discharge Characterization Testing (Room Temperature Charge)

A number of cells were subjected to comprehensive rate characterization over a wide range of temperatures (−60 to +20° C.), using a range of discharge rates (C/20 to 5 C rates). In these tests, all of the cells were charged at ambient temperatures and discharged at the respective temperature of interest. As shown in FIG. 35, when the cells were evaluated at a modest discharge rate (C/10 rate, or 0.025 A) at −60° C., all of the cells containing the advanced low temperature electrolytes outperformed the baseline electrolyte system (expressed in terms of the discharge energy provided). As shown, the electrolyte containing 1.20M LiPF$_6$ in EC+EMC+MP (20:20:60 v/v %) provided the best performance followed by the cell containing one of the Quallion low temperature electrolytes (A3), both delivering over 50 Wh/kg at −60° C. In contrast, the baseline formulation delivered less than half of the energy under similar conditions.

Figure 36:
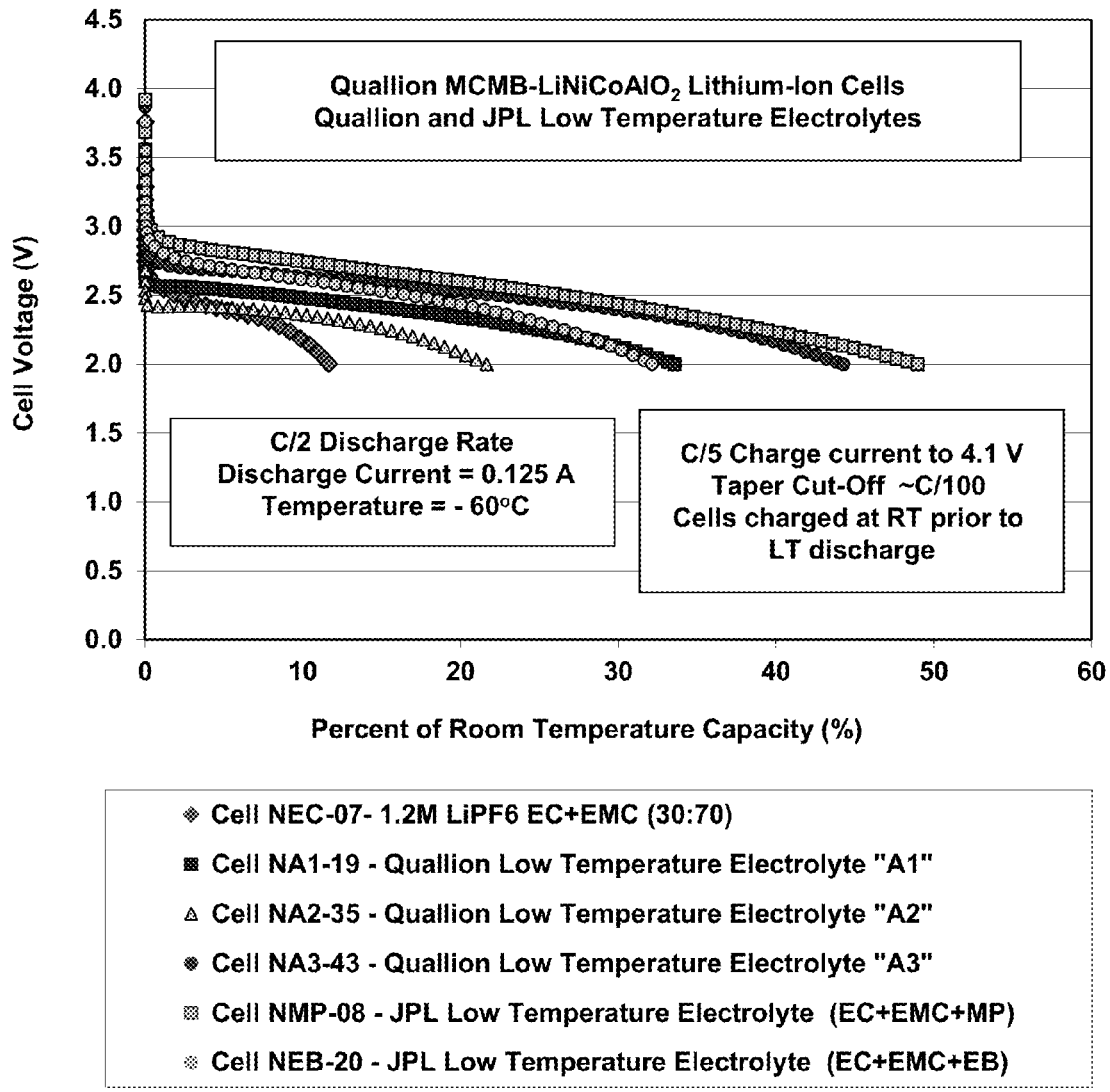
FIG. 36 shows the discharge capacity (Ah) of Quallion MCMB-LiNiCoAlO$_2$ Li-ion cells, containing various low temperature electrolytes, when discharged at −60° C. using a C/2 rate (cells charged at room temperature).

As illustrated in FIG. 36, the cells were also able to support C/2 discharge rates at −60° C., when the cells are discharged to 2.0V. The same trends with regard to electrolyte type that were observed at the lower rates at this temperature were also observed with the higher rate discharge. However, the magnitude of the performance enhancement seen with the cells containing the low temperature electrolyte was more dramatic. For example, the cell containing 1.20M LiPF$_6$ in EC+EMC+MP (20:20:60 v/v %) provided nearly 50% of the room temperature capacity under these conditions, whereas the baseline all-carbonate based solution only delivered approximately one fifth of that amount, or ~10%.

Figure 37:
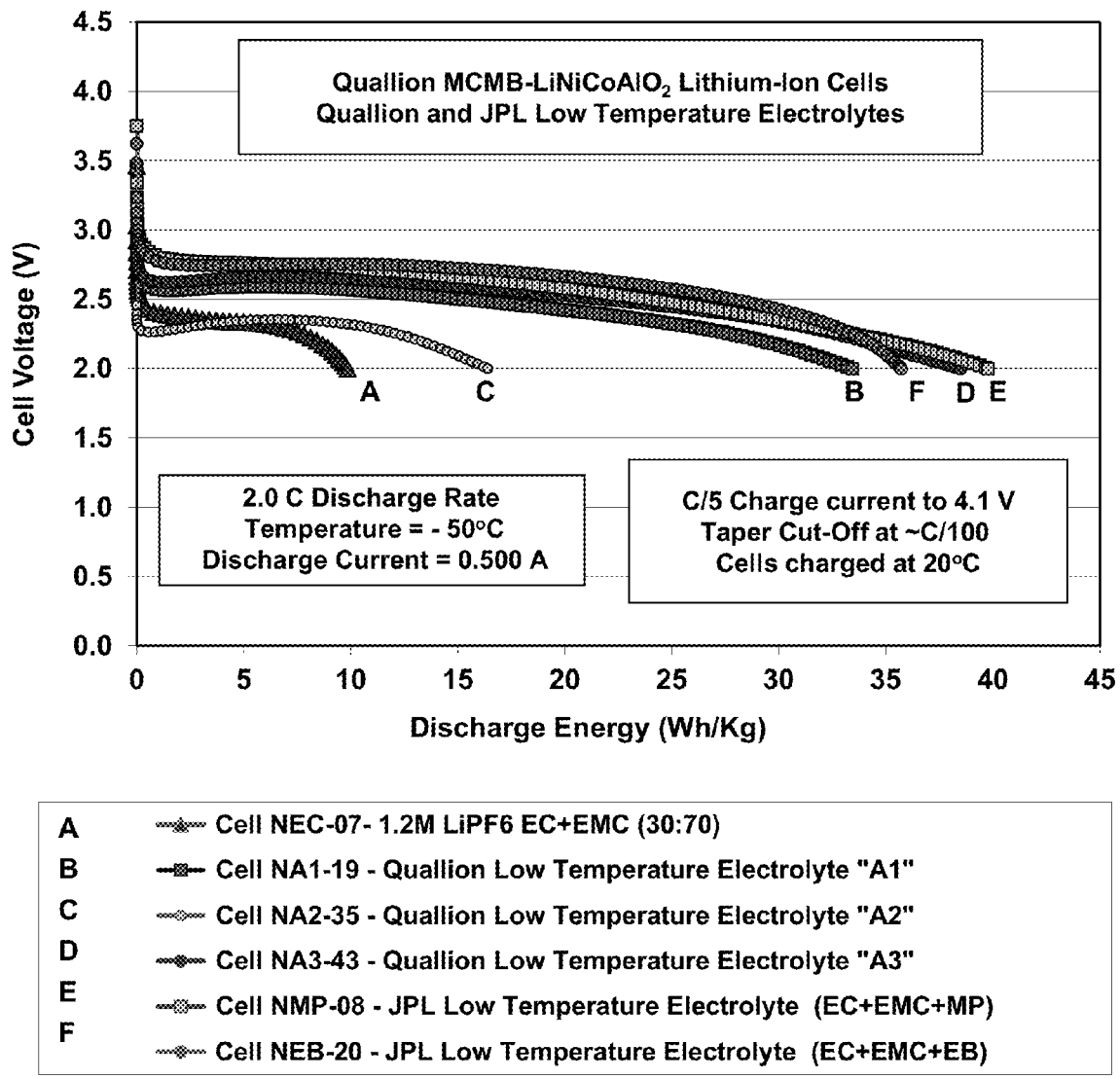
FIG. 37 shows the discharge capacity (Ah) of Quallion MCMB-LiNiCoAlO$_2$ Li-ion cells, containing various low temperature electrolytes, when discharged at −50° C. using a 2.0 C rate (cells charged at room temperature).
Figure 38:
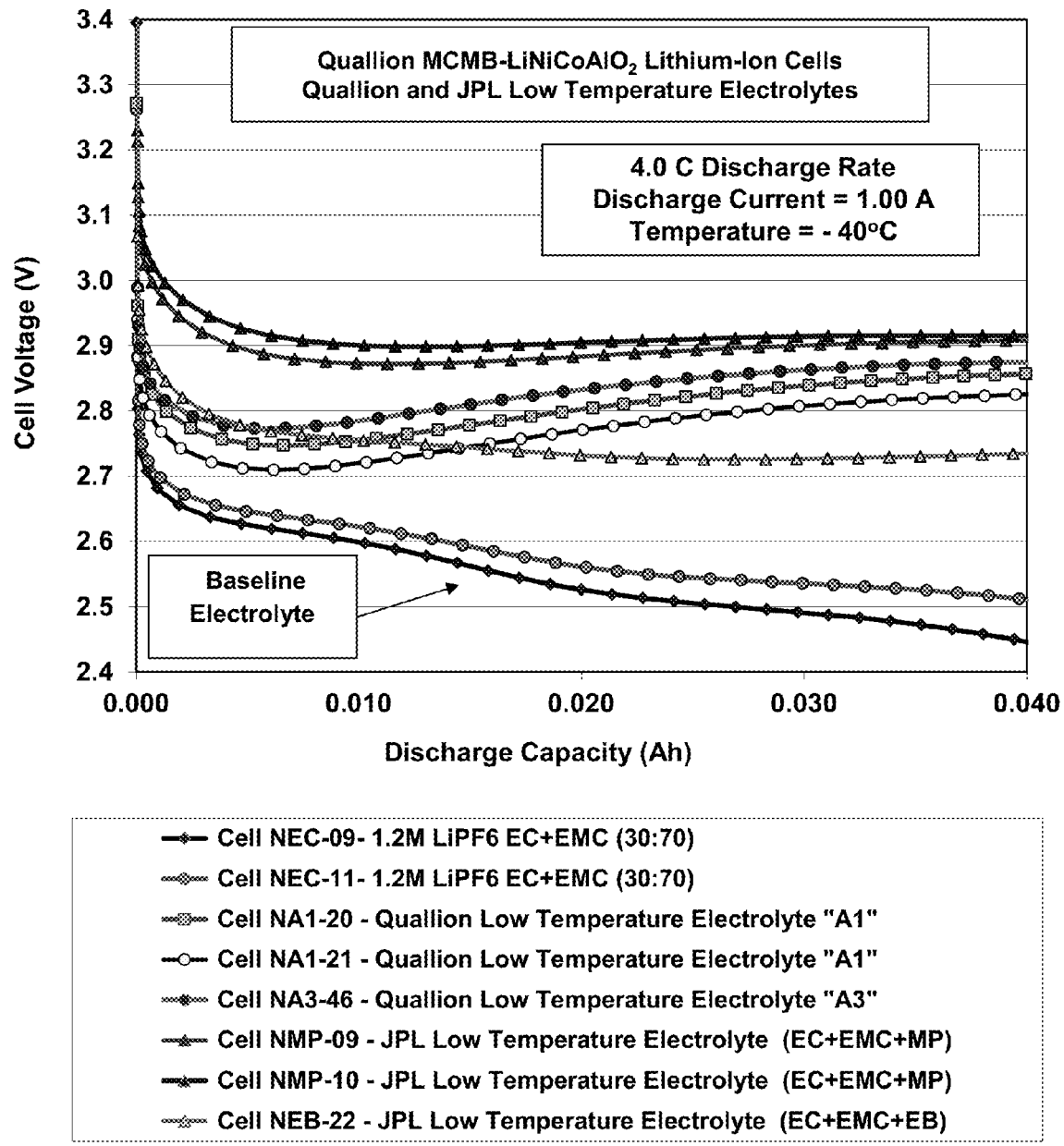
FIG. 38 shows the discharge capacity (Ah) of Quallion MCMB-LiNiCoAlO$_2$ Li-ion cells, containing various low temperature electrolytes, when discharged at −40° C. using a 4.0 C rate (cells charged at room temperature).

The cells also displayed excellent performance when they were evaluated at more aggressive discharge rates. As illustrated in FIG. 37, many of the cells were capable of supporting a 2 C discharge rate at −50° C., with the cell containing 1.20M LiPF$_6$ in EC+EMC+MP (20:20:60 v/v %) providing nearly 40 Wh/kg under these conditions, whereas the baseline formulation only delivered one fourth of that amount (i.e. 10 Wh/kg). It should be noted that in addition to providing high capacity and specific energy under conditions of high rate discharge at low temperatures, the cells containing the electrolytes of the present invention displayed less discharge polarization (i.e., less voltage drop). This observation is significant when considering applications which require high power capability at low temperatures, many of which have minimum operating voltage requirements. This behavior is illustrated in FIG. 38, in which the voltage profiles for a number of cells subjected to high rate discharge are displayed (i.e., 4.0 C rate, or 1.00 A discharge, at −40° C.).

Figure 39:
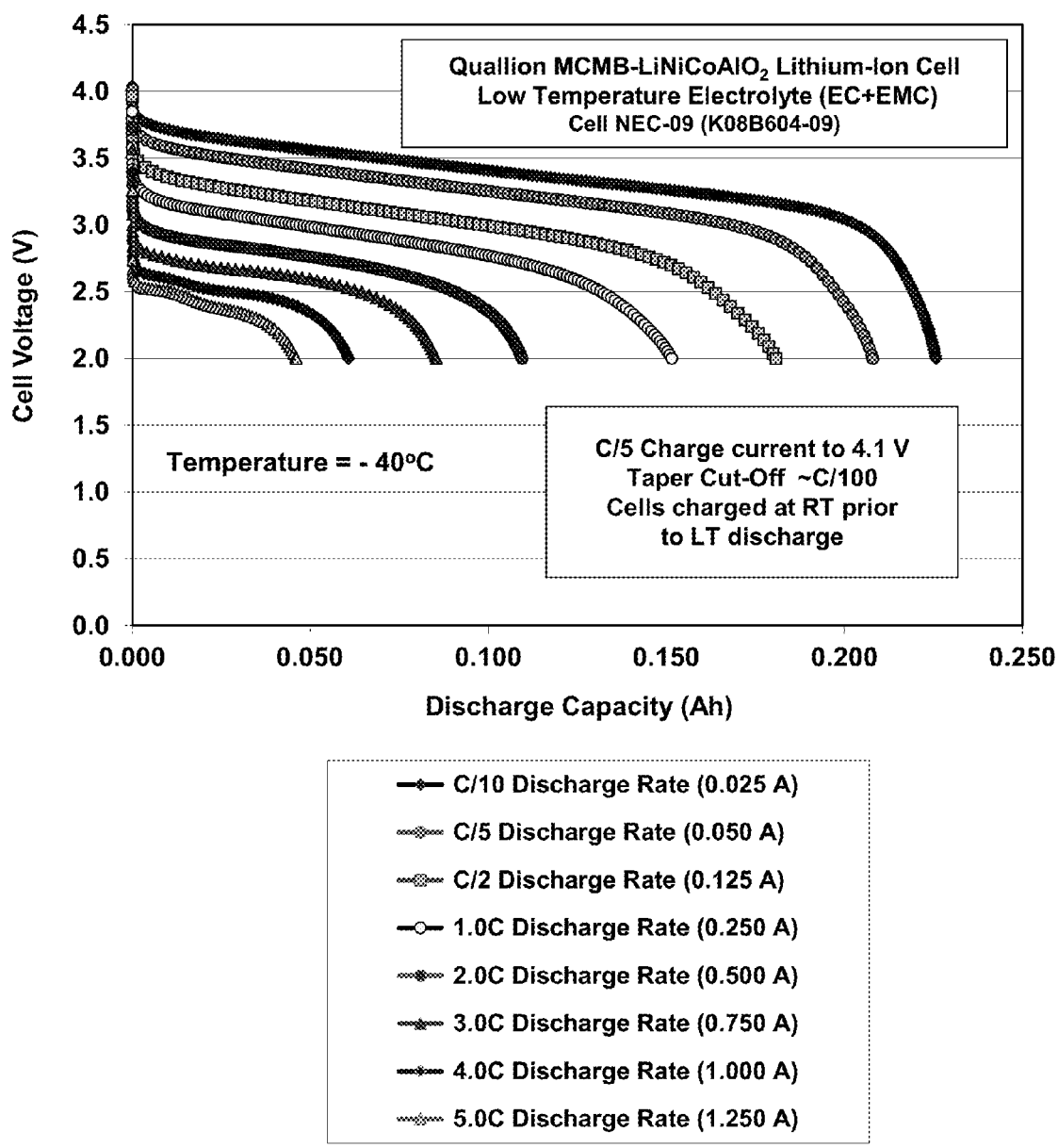
FIG. 39 shows the discharge capacity (Ah) of Quallion MCMB-LiNiCoAlO$_2$ Li-ion cells, containing the baseline all-carbonate electrolyte, when discharged at −40° C. using various rates (cells charged at room temperature).
Figure 40:
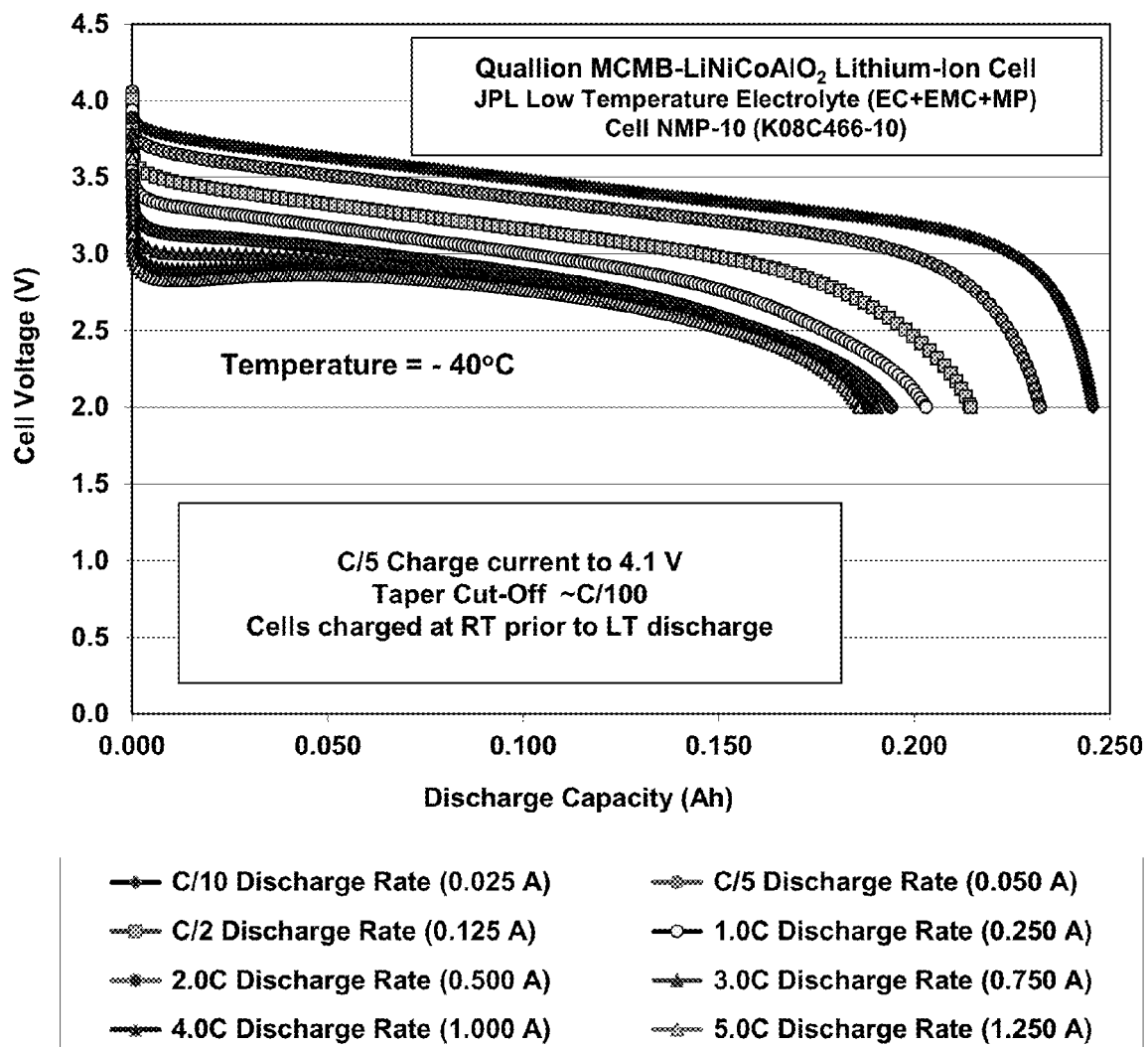
FIG. 40 shows the discharge capacity (Ah) of Quallion MCMB-LiNiCoAlO$_2$ Li-ion cells, containing the methyl propionate-based electrolyte, when discharged at −40° C. using various rates (cells charged at room temperature).

The high rate performance of a number of cells at −40° C. containing the electrolytes of the present invention is summarized in Table 13. As illustrated, the methyl propionate-based electrolyte system, as well as Quallion's "A1" and "A3" formulations, enable cells to perform well at high rates (up to 5 C), in contrast to the baseline DOE formulation. This is highlighted by FIGS. 39 and 40, in which the discharge capacity at various rates at −40° C. is displayed for the baseline all-carbonate based solution and the methyl propionate-based solution, respectively.

TABLE 13

Summary of the discharge performance over a range of rates. Cells were charged at room temperature prior to discharge.
Quallion 0.25 Ah Lithium-Ion Cells
Summary of Discharge Characterization

| Temp (° C.) | Rate | Current (A) | Capacity (Ah) | Watt-Hours (Wh) | Energy (Wh/Kg) | % of $T_R$ | Capacity (Ah) | Watt-Hours (Wh) | Energy (Wh/Kg) | % of $T_R$ |
|---|---|---|---|---|---|---|---|---|---|---|
| | | | NEC-09 1.2M LiPF$_6$ in EC + EMC (30:70) | | | | NEC-11 1.2M LiPF$_6$ in EC + EMC (30:70) | | | |
| 20° C. (Initial) | C/5 | 0.050 | 0.3070 | 1.122 | 110.24 | 100 | 0.3102 | 1.133 | 111.32 | 100 |
| −40° C. | 5.0 C | 1.250 | 0.0460 | 0.109 | 10.75 | 14.99 | 0.0528 | 0.127 | 12.46 | 17.03 |
| | 4.5 C | 1.125 | 0.0544 | 0.132 | 12.96 | 17.72 | 0.0629 | 0.154 | 15.16 | 20.29 |
| | 4.0 C | 1.000 | 0.0607 | 0.149 | 14.67 | 19.77 | 0.0691 | 0.172 | 16.88 | 22.27 |
| | 3.5 C | 0.875 | 0.0706 | 0.178 | 17.48 | 22.99 | 0.0820 | 0.209 | 20.55 | 26.44 |
| | 3.0 C | 0.750 | 0.0854 | 0.220 | 21.62 | 27.80 | 0.0972 | 0.253 | 24.86 | 31.33 |
| | 2.5 C | 0.625 | 0.0941 | 0.247 | 24.29 | 30.66 | 0.1063 | 0.281 | 27.67 | 34.27 |
| | 2.0 C | 0.500 | 0.1094 | 0.294 | 28.92 | 35.63 | 0.1209 | 0.327 | 32.16 | 38.98 |
| | 1.5 C | 0.375 | 0.1259 | 0.346 | 33.97 | 41.00 | 0.1351 | 0.373 | 36.63 | 43.56 |
| | 1.0 C | 0.250 | 0.1515 | 0.429 | 42.10 | 49.35 | 0.1567 | 0.445 | 43.75 | 50.50 |
| | C/2 | 0.125 | 0.1808 | 0.538 | 52.81 | 58.89 | 0.1829 | 0.546 | 53.71 | 58.97 |
| | C/5 | 0.050 | 0.2080 | 0.664 | 65.18 | 67.74 | 0.2103 | 0.673 | 66.19 | 67.80 |
| | C/10 | 0.025 | 0.2257 | 0.752 | 73.88 | 73.52 | 0.2289 | 0.765 | 75.18 | 73.80 |
| −50° C. | C/10 | 0.025 | 0.1746 | 0.529 | 51.95 | 56.87 | 0.1800 | 0.548 | 53.85 | 58.04 |
| | | | NA1-20 Quallion Low Temperature Electrolyte "A1" | | | | NA1-21 Quallion Low Temperature Electrolyte "A1" | | | |
| 20° C. (Initial) | C/5 | 0.050 | 0.3047 | 1.111 | 109.1 | 100 | 0.3025 | 1.103 | 108.576 | 100 |
| −40° C. | 5.0 C | 1.250 | 0.1913 | 0.515 | 50.61 | 62.78 | 0.1861 | 0.495 | 48.79 | 61.51 |
| | 4.5 C | 1.125 | 0.1916 | 0.518 | 50.89 | 62.88 | 0.1861 | 0.497 | 48.95 | 61.51 |
| | 4.0 C | 1.000 | 0.1910 | 0.517 | 50.77 | 62.67 | 0.1852 | 0.495 | 48.73 | 61.22 |
| | 3.5 C | 0.875 | 0.1900 | 0.515 | 50.57 | 62.36 | 0.1851 | 0.497 | 48.91 | 61.20 |
| | 3.0 C | 0.750 | 0.1908 | 0.520 | 51.09 | 62.62 | 0.1859 | 0.501 | 49.38 | 61.45 |
| | 2.5 C | 0.625 | 0.1909 | 0.522 | 51.26 | 62.63 | 0.1861 | 0.504 | 49.65 | 61.53 |
| | 2.0 C | 0.500 | 0.1926 | 0.532 | 52.27 | 63.22 | 0.1884 | 0.516 | 50.80 | 62.28 |
| | 1.5 C | 0.375 | 0.1953 | 0.545 | 53.50 | 64.09 | 0.1918 | 0.530 | 52.23 | 63.40 |
| | 1.0 C | 0.250 | 0.2016 | 0.575 | 56.51 | 66.17 | 0.1985 | 0.562 | 55.38 | 65.64 |
| | C/2 | 0.125 | 0.2144 | 0.636 | 62.47 | 70.37 | 0.2117 | 0.624 | 61.43 | 69.98 |

TABLE 13-continued

Summary of the discharge performance over a range of rates. Cells were charged at room temperature prior to discharge.
Quallion 0.25 Ah Lithium-Ion Cells
Summary of Discharge Characterization

| Temp (° C.) | Rate | Current (A) | Capacity (Ah) | Watt-Hours (Wh) | Energy (Wh/Kg) | % of $T_R$ | Capacity (Ah) | Watt-Hours (Wh) | Energy (Wh/Kg) | % of $T_R$ |
|---|---|---|---|---|---|---|---|---|---|---|
| | C/5 | 0.050 | 0.2325 | 0.728 | 71.51 | 76.29 | 0.2295 | 0.715 | 70.38 | 75.87 |
| | C/10 | 0.025 | 0.2472 | 0.803 | 78.81 | 81.11 | 0.2420 | 0.782 | 77.00 | 80.02 |
| −50° C. | C/10 | 0.025 | 0.2275 | 0.695 | 68.28 | 74.65 | 0.2204 | 0.667 | 65.69 | 72.87 |
| | | | NA3-46 | | | | NEB-22 | | | |
| | | | Quallion Low Temperature Electrolyte "A3" | | | | JPL Low Temperature Electrolyte (EC + EMC + EM) | | | |
| 20° C. (Initial) | C/5 | 0.050 | 0.2941 | 1.071 | 107.28 | 100 | 0.3037 | 1.110 | 109.38 | 100 |
| −40° C. | 5.0 C | 1.250 | 0.1893 | 0.511 | 51.20 | 64.37 | 0.1375 | 0.348 | 34.25 | 45.26 |
| | 4.5 C | 1.125 | 0.1886 | 0.511 | 51.16 | 64.15 | 0.1452 | 0.377 | 37.15 | 47.81 |
| | 4.0 C | 1.000 | 0.1873 | 0.507 | 50.81 | 63.70 | 0.1495 | 0.393 | 38.74 | 49.20 |
| | 3.5 C | 0.875 | 0.1864 | 0.507 | 50.79 | 63.40 | 0.1575 | 0.423 | 41.68 | 51.86 |
| | 3.0 C | 0.750 | 0.1881 | 0.515 | 51.55 | 63.97 | 0.1624 | 0.442 | 43.56 | 53.46 |
| | 2.5 C | 0.625 | 0.1883 | 0.517 | 51.83 | 64.05 | 0.1656 | 0.455 | 44.84 | 54.51 |
| | 2.0 C | 0.500 | 0.1908 | 0.529 | 53.05 | 64.87 | 0.1699 | 0.474 | 46.74 | 55.94 |
| | 1.5 C | 0.375 | 0.1938 | 0.543 | 54.43 | 65.92 | 0.1741 | 0.493 | 48.55 | 57.32 |
| | 1.0 C | 0.250 | 0.2011 | 0.577 | 57.79 | 68.39 | 0.1808 | 0.524 | 51.63 | 59.52 |
| | C/2 | 0.125 | 0.2123 | 0.631 | 63.27 | 72.19 | 0.1947 | 0.590 | 58.10 | 64.11 |
| | C/5 | 0.050 | 0.2256 | 0.706 | 70.77 | 76.73 | 0.2160 | 0.695 | 68.49 | 71.12 |
| | C/10 | 0.025 | 0.2304 | 0.745 | 74.70 | 78.35 | 0.2309 | 0.773 | 76.13 | 76.03 |
| −50° C. | C/10 | 0.025 | 0.2108 | 0.644 | 64.51 | 71.69 | 0.2016 | 0.621 | 61.22 | 66.37 |
| | | | NMP-09 | | | | NMP-10 | | | |
| | | | JPL Low Temperature Electrolyte (EM + EMC + MP) | | | | JPL Low Temperature Electrolyte (EC + EMC + MP) | | | |
| 20° C. (Initial) | C/5 | 0.050 | 0.2972 | 1.086 | 108.11 | 100 | 0.3072 | 1.123 | 110.67 | 100 |
| −40° C. | 5.0 C | 1.250 | 0.1857 | 0.504 | 50.23 | 62.48 | 0.1859 | 0.501 | 49.43 | 60.52 |
| | 4.5 C | 1.125 | 0.1865 | 0.509 | 50.66 | 62.74 | 0.1877 | 0.510 | 50.23 | 61.10 |
| | 4.0 C | 1.000 | 0.1862 | 0.508 | 50.60 | 62.63 | 0.1879 | 0.511 | 50.39 | 61.18 |
| | 3.5 C | 0.875 | 0.1871 | 0.513 | 51.11 | 62.95 | 0.1892 | 0.518 | 51.02 | 61.60 |
| | 3.0 C | 0.750 | 0.1879 | 0.519 | 51.70 | 63.20 | 0.1904 | 0.525 | 51.75 | 61.98 |
| | 2.5 C | 0.625 | 0.1882 | 0.522 | 52.00 | 63.32 | 0.1914 | 0.531 | 52.32 | 62.30 |
| | 2.0 C | 0.500 | 0.1902 | 0.534 | 53.15 | 63.98 | 0.1940 | 0.545 | 53.71 | 63.17 |
| | 1.5 C | 0.375 | 0.1921 | 0.545 | 54.27 | 64.65 | 0.1969 | 0.560 | 55.22 | 64.11 |
| | 1.0 C | 0.250 | 0.1979 | 0.577 | 57.46 | 66.58 | 0.2029 | 0.594 | 58.53 | 66.06 |
| | C/2 | 0.125 | 0.2074 | 0.633 | 63.03 | 69.78 | 0.2143 | 0.659 | 64.94 | 69.77 |
| | C/5 | 0.050 | 0.2236 | 0.726 | 72.25 | 75.23 | 0.2320 | 0.758 | 74.74 | 75.54 |
| | C/10 | 0.025 | 0.2373 | 0.799 | 79.58 | 79.82 | 0.2455 | 0.831 | 81.94 | 79.93 |
| −50° C. | C/10 | 0.025 | 0.2211 | 0.691 | 68.77 | 74.39 | 0.2294 | 0.724 | 71.39 | 74.70 |

Cycle Life Performance

To further evaluate the influence of electrolyte type upon cell performance, a cycling test was undertaken in which MCMB-LiNiCoAlO$_2$ cells were cycled alternately over a wide temperature range, i.e., performing 20 cycles at 40° C. followed by 20 cycles at −20° C., and then back to +40° C., etc. This methodology was repeated a number of times, and then expanded to even more extreme temperatures (i.e., up to 60° C. and down to −40° C.) to assess the range of the technology. This is an aggressive performance test in which the warmer temperature can lead to large impedance increases, and subsequently poorer low temperature capability. In addition, cycling continuously (including charging) at lower temperature can give rise to other performance limiting phenomena, such as lithium plating on the anode which can lead to impedance growth and capacity loss.

Figure 41:
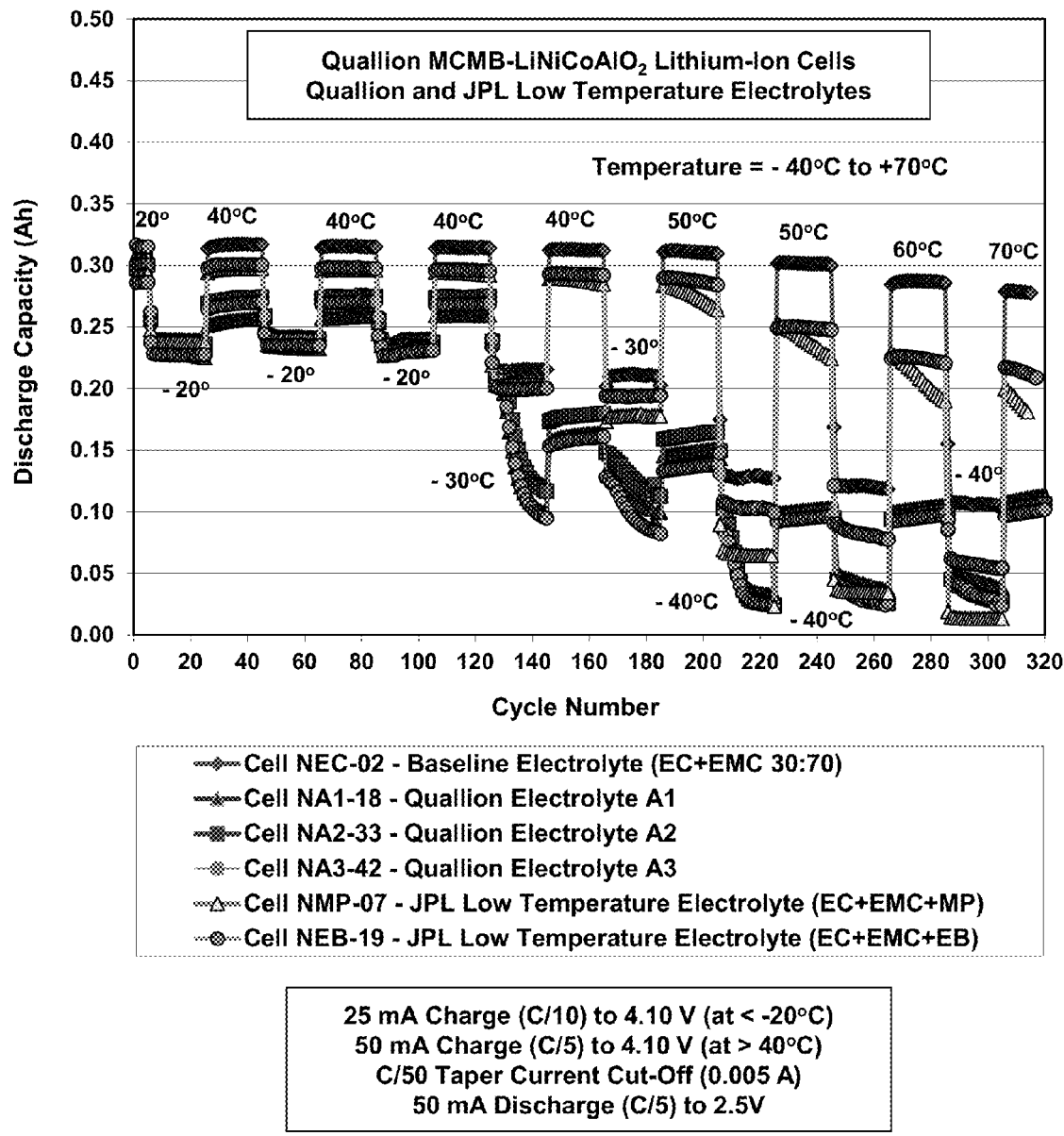
FIG. 41 shows variable temperature cycling of MCMB-LiNiCoAlO$_2$ Li-ion cells, containing various electrolytes, cycled over a wide temperature range (−20° to +70° C.).

As shown in FIG. 41, of the cells containing the advanced low temperature electrolytes of the present invention, those containing the methyl propionate and ethyl butyrate-based systems performed much better than the Quallion-based systems. As shown, the first 20 cycles performed at −30° C. led to significant irreversible performance decline in the cells containing the Quallion-based electrolytes (A1, A2, and A3). This has been determined to be due to the fact that lithium plating was believed to have occurred on the anode when charging at low temperature, leading to irreversible capacity loss as evident by all subsequent cycling. In contrast, the present low temperature electrolyte systems do not display such phenomena and exhibit good capacity retention upon going to warmer temperatures. However, of all of the electrolytes, the baseline all-carbonate based formulation yielded the best overall performance, including resilience to high temperature extremes and minimal lithium plating under these conditions (C/10 charging when cycled at lower temperatures, and C/5 discharging at all temperatures).

In addition to evaluating the variable temperature cycling performance of MCMB-LiNiCoAlO$_2$ cells over a wide temperature range, we have also tested similar cells in which another type of anode material was used, namely lithium titanate, Li$_4$Ti$_5$O$_{12}$. This material is often referred to as a "zero strain" material and has been demonstrated to have good cycle life characteristics (K. M. Colbow, J. R. Dahn, and R. R. Haering, *J. Power Sources*, 26, 397 (1989)). The anode material possesses a flat operating voltage of ~1.5V vs. Li$^+$/Li and is, thus, believed to not form a "solid electrolyte interface" due to electrolyte reduction. For these reasons, it has been identified to have potential to enable efficient operation at low temperatures, without the likelihood of lithium plating occurring, or other life limiting degradation processes which occur typically at carbon anodes (J. L. Allen, T. R. Jow, and J. Wolfenstine, *J. Power Sources*, 159, 1340-1345 (2006)). Thus, although the energy density of the cells can be significantly reduced, the introduction of such a material can be attractive for many applications, especially where long life is need under extreme conditions.

Figure 42:
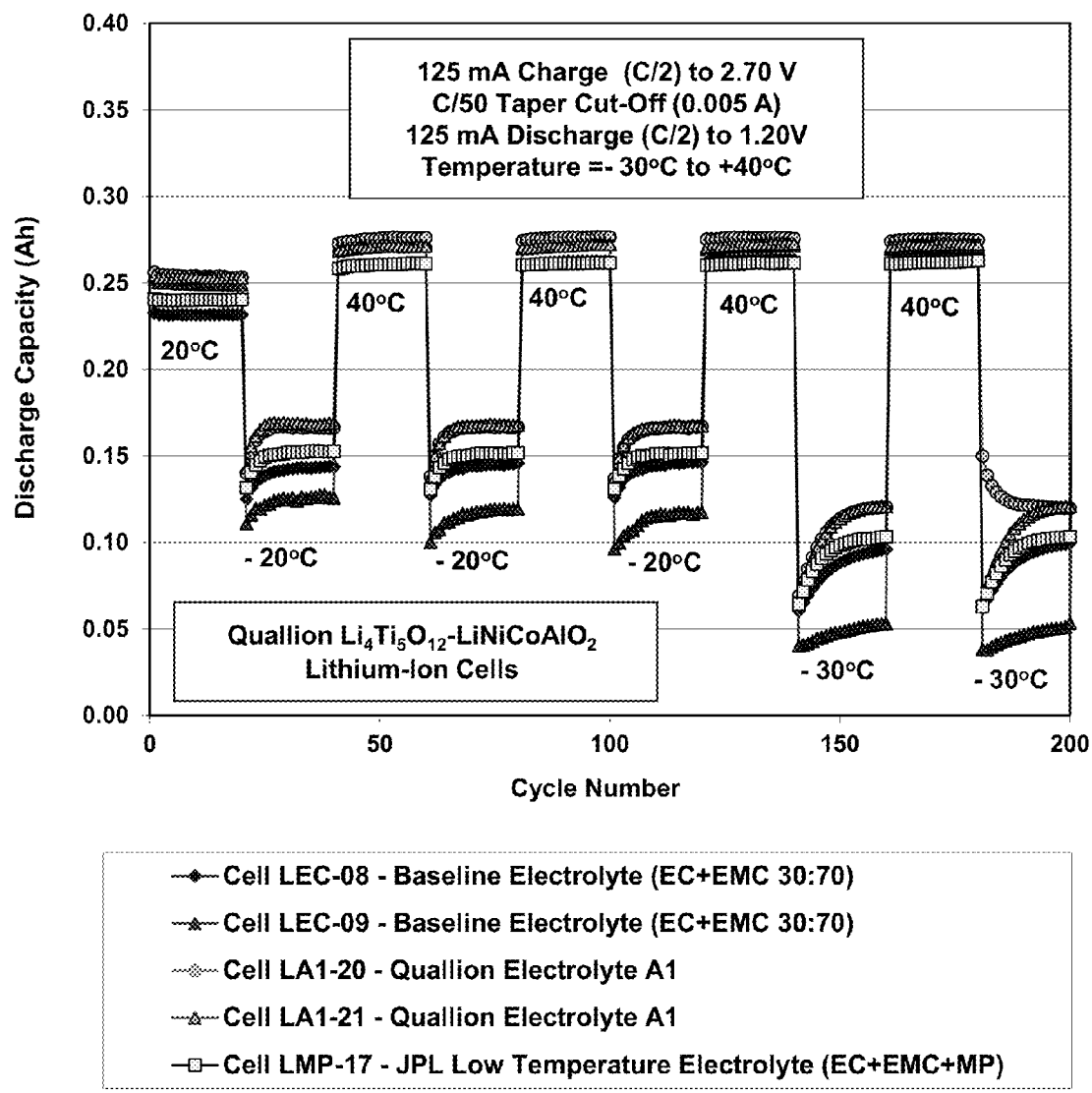
FIG. 42 shows variable temperature cycling of Li$_4$Ti$_5$O$_{12}$—LiNiCoAlO$_2$ Li-ion cells, containing various electrolytes, cycled over a wide temperature range (−20° to +70° C.).

As shown in FIG. 42, when lithium titanate-based cells containing a number of electrolytes under evaluation were subjected to similar variable temperature cycling over a wide temperature range, much more stable performance was observed in all cases. Of note is the fact that the cells containing the Quallion based electrolyte "A1" did not display irreversible capacity loss upon being cycled at lower temperatures, in contrast to the MCMB carbon anode based systems. It should also be noted that the charge and discharge rates for these tests were C/2 for all temperatures, representing an aggressive charge condition where dramatic lithium plating would certainly occur with the carbon based analogues. Thus, it appears as though lithium titanate is an anode material of choice for applications which require long life, and when coupled with the appropriate advanced electrolytes can provide good cycle life and power capabilities over a wide temperature range. In addition to performing cycling tests, we have also obtained excellent discharge characteristics with this system with the methyl propionate-based system and the Quallion "A1" electrolytes.

SUMMARY AND CONCLUSIONS

We have demonstrated two electrolytes, namely 1.20M $LiPF_6$ in EC+EMC+MP (20:20:60 v/v %) and 1.20M $LiPF_6$ in EC+EMC+EB (20:20:60 v/v %), to operate effectively over a wide temperature range in MCMB-$LiNiCoAlO_2$ and $Li_4Ti_5O_{12}$—$LiNiCoAlO_2$ prototype cells. These electrolytes have enabled high rate performance at low temperature (i.e., up to 2.0 C rates at −50° C. and 5.0 C rates at −40° C.) and good cycling performance over a wide temperature range (i.e., from −40° C. to +70° C.).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomer and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

We claim:

1. An electrolyte for use in an electrochemical cell, the electrolyte comprising a mixture of:
   15-30% by volume cyclic carbonate, wherein the cyclic carbonate is a combination of mono-fluoroethylene carbonate (FEC) and EC wherein the FEC is present in an amount from 0.5 to 10% by volume;
   15-30% by volume non-cyclic carbonate, wherein the non-cyclic carbonate is selected from ethyl methyl carbonate (EMC), dimethyl carbonate (DMC), diethyl carbonate (DEC), methyl propyl carbonate (MPC) and combinations thereof;
   40-70% by volume non-fluorinated linear ester, wherein the non-fluorinated linear ester is selected from: methyl propionate, ethyl propionate, methyl butyrate, ethyl butyrate, propyl butyrate, butyl butyrate, and combinations thereof; and
   a lithium salt in a concentration from 0.5 M to 1.5 M.

2. The electrolyte of claim 1, wherein the non-cyclic carbonate is ethyl methyl carbonate (EMC), the lithium salt includes $LiPF_6$ in a concentration from 0.8 to 1.20 M and the non-fluorinated linear ester is selected from methyl propionate, methyl butyrate and combinations thereof.

3. The electrolyte of claim 1, wherein at least two non-fluorinated linear esters are present, a first non-fluorinated linear ester having a low viscosity and selected from the group consisting of methyl propionate, ethyl propionate, methyl butyrate and ethyl butyrate and a second non-fluorinated linear ester having a high viscosity and selected from the group consisting of propyl butyrate and butyl butyrate.

4. The electrolyte of claim 1 further comprising an additive selected from lithium oxalate, lithium bis(oxalato)borate (LiBOB), vinylene carbonate (VC), lithium difluoro(oxolato)borate (LiDFOB) and combinations thereof.

5. The electrolyte of claim 1 further comprising an additive selected from lithium bis(oxalato)borate (LiBOB), lithium difluoro(oxolato) borate (LiDFOB) and combinations thereof in a concentration of 0.05 to 0.25 M.

6. The electrolyte of claim 1 wherein the FEC is present in an amount from 2 to 10% by volume.

7. The electrolyte of claim 1 wherein the FEC is present in an amount from 0.5 to 5% by volume.

8. An electrochemical cell comprising:
   an anode;
   a cathode; and
   the electrolyte of claim 1 provided between the anode and the cathode.

9. The electrochemical cell of claim 8, wherein the cathode comprises a material selected from $LiCoO_2$, $LiMn_2O_4$, $LiMPO_4$ (M=Fe, Co, Mn), $LiNiCoAlO_2$, $LiNi_{0.33}Co_{0.33}Mn_{0.33}O_2$, $LiNiCoO_2$, $LiNi_{0.8}Co_{0.2}O_2$, $Li(Li_{0.17}Ni_{0.25}Mn_{0.58})O_2$, layered-layered composite LiNiCoMnO_2 or $LiNi_{0.5}Mn_{1.5}O_4$.

10. The electrochemical cell of claim 8, wherein the anode comprises a material selected from natural graphite, synthetic graphite, hard carbon, mesocarbon microbeads (MCMB), silicon-carbon composites, lithium titanate ($Li_4Ti_5O_{12}$), lithium metal and combinations thereof.

11. The electrochemical cell of claim 8 wherein the anode is a carbon-based anode and the cathode is selected from $LiFePO_4$, $LiNiCoO_2$, $LiNiCoAlO_2$, and a layered-layered composite of $LiNiCoMnO_2$, $LiNi_{0.5}Mn_{1.5}O_4$ or $LiNi_{0.33}Co_{0.33}Mn_{0.33}O_2$.

12. A method of making an electrochemical cell comprising the steps of:
   providing a cathode;
   providing an anode; and
   providing the electrolyte of claim 1 between the cathode and the anode.

13. A method of generating an electrical current, the method comprising the steps of:
   providing an electrochemical cell according to claim 8, the cell being in a charged state; and
   discharging the electrochemical cell.

* * * * *